US012640867B2

(12) United States Patent (10) Patent No.: US 12,640,867 B2

Ji et al. (45) Date of Patent: May 26, 2026

(54) SOUNDING METHOD AND APPARATUS IN WIRELESS COMMUNICATION SYSTEM

(71) Applicant: SAMSUNG ELECTRONICS CO., LTD., Suwon-si (KR)

(72) Inventors: Hyoungju Ji, Suwon-si (KR); Hoondong Noh, Suwon-si (KR); Taehyoung Kim, Suwon-si (KR); Jinhyun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 496 days.

(21) Appl. No.: 17/997,036

(22) PCT Filed: Apr. 27, 2021

(86) PCT No.: PCT/KR2021/005296

§ 371 (c)(1),
(2) Date: Oct. 25, 2022

(87) PCT Pub. No.: WO2021/221428

PCT Pub. Date: Nov. 4, 2021

(65) Prior Publication Data

US 2023/0188280 A1 Jun. 15, 2023

(30) Foreign Application Priority Data

Apr. 27, 2020 (KR) ........................ 10-2020-0050831

(51) Int. Cl.
H04L 5/00 (2006.01)
H04B 7/06 (2006.01)
(52) U.S. Cl.
CPC ......... H04L 5/0048 (2013.01); H04B 7/0608 (2013.01)

(58) Field of Classification Search
None
See application file for complete search history.

(56) References Cited

U.S. PATENT DOCUMENTS

| | | | |
|---|---|---|---|
| 10,205,618 B2 | 2/2019 | Wang et al. | |
| 10,455,457 B2 | 10/2019 | Sadek et al. | |

(Continued)

FOREIGN PATENT DOCUMENTS

| | | | |
|---|---|---|---|
| EP | 4084385 A1 | 11/2022 | |
| WO | 2017122959 A1 | 7/2017 | |

(Continued)

OTHER PUBLICATIONS

Nokia Shanghai Bell, NTT Docomo Inc, Clarifying consequences if not supported, Apr. 9, 2020, 3GPP R2-2002990 (Year: 2020).*

(Continued)

*Primary Examiner* — Luna Weissberger

(57) ABSTRACT

The present disclosure relates to: a communication technique for merging IoT technology with a 5G communication system for supporting higher data transmission rates than 4G systems; and a system therefor. The present disclosure can be applied to intelligent services (e.g., smart homes, smart buildings, smart cities, smart cars or connected cars, healthcare, digital education, retail businesses, security and safety related services, etc.) on the basis of 5G communication technology and IoT-related technologies. The invention of the present disclosure proposes a method and an apparatus for transmitting and receiving a reference signal for efficient resource use in a wireless communication system.

14 Claims, 34 Drawing Sheets

(56)  References Cited

U.S. PATENT DOCUMENTS

| | | | |
|---|---|---|---|
| 2019/0253214 A1 | 8/2019 | Liu et al. | |
| 2020/0099490 A1 | 3/2020 | Sridharan et al. | |
| 2020/0112349 A1 | 4/2020 | Yang et al. | |
| 2020/0252241 A1 | 8/2020 | Park et al. | |
| 2021/0194737 A1 | 6/2021 | Gao et al. | |
| 2023/0033260 A1* | 2/2023 | Rupasinghe | H04L 5/0051 |
| 2023/0047048 A1* | 2/2023 | Liu | H04B 7/0417 |
| 2024/0022379 A1* | 1/2024 | Wang | H04L 5/0064 |

FOREIGN PATENT DOCUMENTS

| | | |
|---|---|---|
| WO | 2019/066560 A1 | 4/2019 |
| WO | 2019160775 A1 | 8/2019 |
| WO | 2019170089 A1 | 9/2019 |
| WO | 2019/218108 A1 | 11/2019 |
| WO | 2020/061467 A2 | 3/2020 |
| WO | 2021159452 A1 | 8/2021 |

OTHER PUBLICATIONS

International Search Report and Written Opinion of the International Searching Authority dated Jul. 27, 2021, in connection with International Application No. PCT/KR2021/005296, 8 pages.

Oppo et al., "Enable gNB to configure downgrading configuration of SRS for antenna switching", R1-1911456, 3GPP TSG RAN WG1 Meeting #98bis, Chongqing, China, Oct. 14-20, 2019, 6 pages.

Vivo, "Further discussion on SRS enhancements", R1-1901649, 3GPP TSG RAN WG1 Meeting #96, Athens, Greece, Feb. 25-Mar. 1, 2019, 4 pages.

Supplementary European Search Report dated Jun. 23, 2023, in connection with European Patent Application No. 21795501.2, 11 pages.

Notification of the First Office Action issued Nov. 21, 2024, in connection with Chinese Patent Application No. 202180031511.8, 16 pages.

"RAN4 #92 Meeting report," R4-1910701, 3GPP TSG-RAN WG4 Meeting #92bis, Chongqing, China, Oct. 14-18, 2019, 958 pages.

Huawei et al., "Discussion on reciprocity based CSI acquisition to reduce CSI overhead," R1-1809121, 3GPP TSG WG1 Meeting #94, Gothenburg, Sweden, Aug. 20-24, 2018, 6 pages.

Nokia et al., "Clarifying consequences if not supported," R2-2002990, 3GPP TSG-RAN WG2 Meeting #109bis-e, Apr. 20-30, 2020, 19 pages.

Office Action dated Jul. 15, 2025, in connection with Korean Application No. 10-2020-0050831, 8 pages.

Notification of the Decision to Grant a Patent Right for Patent for Invention dated Sep. 2, 2025, in connection with Chinese Application No. 202180031511.8, 7 pages.

* cited by examiner

FIG. 9

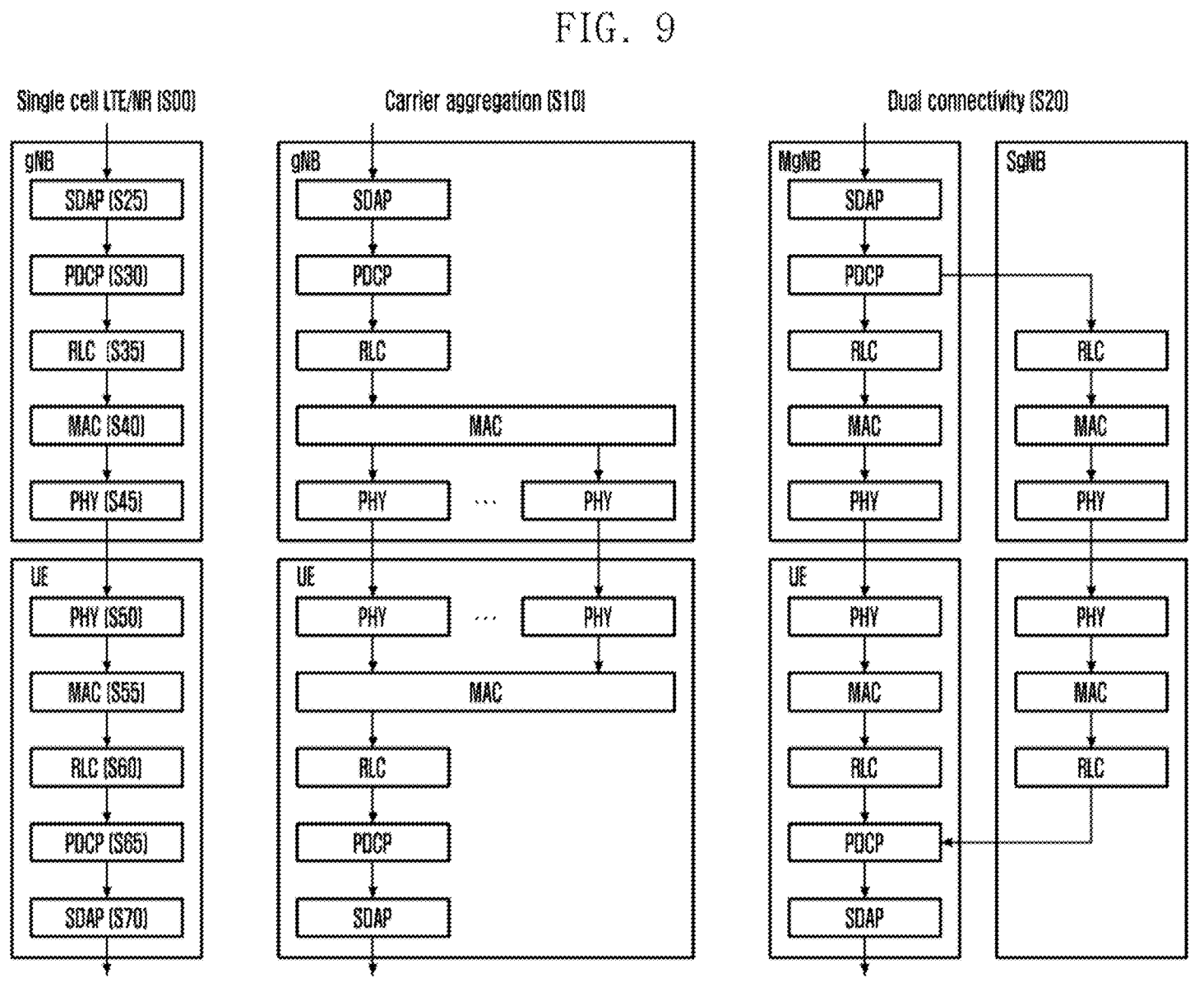

Dual connectivity (S20)

SgNB

RLC → MAC → PHY → PHY → MAC → RLC

MgNB

SDAP → PDCP → RLC → MAC → PHY → PHY → MAC → RLC → PDCP → SDAP

UE

Carrier aggregation (S10)

gNB

SDAP → PDCP → RLC → MAC → PHY

PHY

... ...

PHY

MAC → PHY → RLC → PDCP → SDAP

UE

Single cell (LTE/NR (S00))

gNB

SDAP (S25) → PDCP (S30) → RLC (S35) → MAC (S40) → PHY (S45)

PHY (S50) → MAC (S55) → RLC (S60) → PDCP (S65) → SDAP (S70)

UE

SOUNDING METHOD AND APPARATUS IN WIRELESS COMMUNICATION SYSTEM

CROSS-REFERENCE TO RELATED APPLICATIONS

This application is a 371 of International Application No. PCT/KR2021/005296 filed on Apr. 27, 2021, which claims priority to Korean Patent Application No 10-2020-0050831 filed on Apr. 27, 2020, the disclosures of which are herein incorporated by reference in their entirety.

BACKGROUND

1. Field

The disclosure relates to a method and apparatus for transmitting and receiving an uplink sounding reference signal in a wireless communication system.

2. Description of Related Art

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post LTE system. In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system. Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (COMP), and interference cancellation are being developed. Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

Innovation of Internet from a human-centered connection network in which a human generates and consumes information to an Internet of Things (IoT) network that gives and receives and processes information to and from distributed constituent elements such as things has occurred. Internet of Everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network are being made. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of convergence of 5G technology and IoT technology.

SUMMARY

The disclosure provides a method and apparatus for efficiently transmitting and receiving an uplink sounding reference signal for various services in a mobile communication system.

According to an embodiment of the disclosure, a method of operating a terminal of a communication system may include transmitting, to a base station, a terminal capability information including information on at least one sounding reference signal (SRS) antenna switching configuration that may be supported by the terminal; receiving, from the base station, at least one SRS resource configuration information determined corresponding to the at least one SRS antenna switching configuration; and transmitting, to the base station, an SRS based on the at least one SRS resource configuration information.

According to an embodiment, in case that the SRS antenna switching constitution is 1T6R, the SRS resource configuration information may include maximum four resource sets, and six resources corresponding to each antenna port may be distributed to the maximum four resource sets.

According to an embodiment, in case that the SRS antenna switching constitution is 1T8R, the SRS resource configuration information may include maximum four resource sets, and eight resources corresponding to each antenna port may be distributed to the maximum four resource sets.

According to an embodiment, in case that the SRS antenna switching constitution is 2T6R, the SRS resource configuration information may include maximum three resource sets, and three resources corresponding to each of two antenna ports may be distributed to the maximum three resource sets.

According to an embodiment, in case that the SRS antenna switching constitution is 2T8R, the SRS resource configuration information may include maximum four resource sets, and four resources corresponding to each of two antenna ports may be distributed to the maximum four resource sets.

According to an embodiment, in case that the SRS antenna switching constitution is 4T8R, the SRS resource configuration information may include maximum two resource sets, and two resources corresponding to each of four antenna ports may be distributed to the maximum two resource sets.

According to an embodiment of the disclosure, a method of operating a base station of a communication system may include receiving, from a terminal, terminal capability information including information on at least one sounding reference signal (SRS) antenna switching configuration that may be supported by the terminal; transmitting, to the terminal, at least one SRS resource configuration information determined corresponding to the at least one SRS antenna switching constitution; and receiving, from the terminal, an SRS based on the at least one SRS resource configuration information.

According to an embodiment of the disclosure, a terminal of a communication system may include a transceiver; and a controller configured to control to transmit, to a base station, terminal capability information including information on at least one sounding reference signal (SRS) antenna switching constitution that may be supported by the terminal, to receive, from the base station, at least one SRS resource configuration information determined corresponding to the at least one SRS antenna switching constitution, and to transmit, to the base station, an SRS based on at least one SRS resource configuration information.

According to an embodiment of the disclosure, a base station of a communication system may include a transceiver; and a controller configured to control to receive, from a terminal, terminal capability information including information on at least one sounding reference signal (SRS) antenna switching constitution that may be supported by the terminal, to transmit, to the terminal, at least one SRS resource configuration information determined corresponding to at least one SRS antenna switching constitution, and to receive, from the terminal, an SRS based on the at least one SRS configuration information.

The disclosed embodiment provides a method and apparatus for transmitting and receiving a sounding reference signal for efficient uplink or downlink transmission and reception in a mobile communication system.

BRIEF DESCRIPTION OF THE DRAWINGS

FIG. 9 is a diagram illustrating a wireless protocol structure of a base station and a terminal upon performing single cell, carrier aggregation, and dual connectivity according to an embodiment of the disclosure.

DETAILED DESCRIPTION

Figure 1:
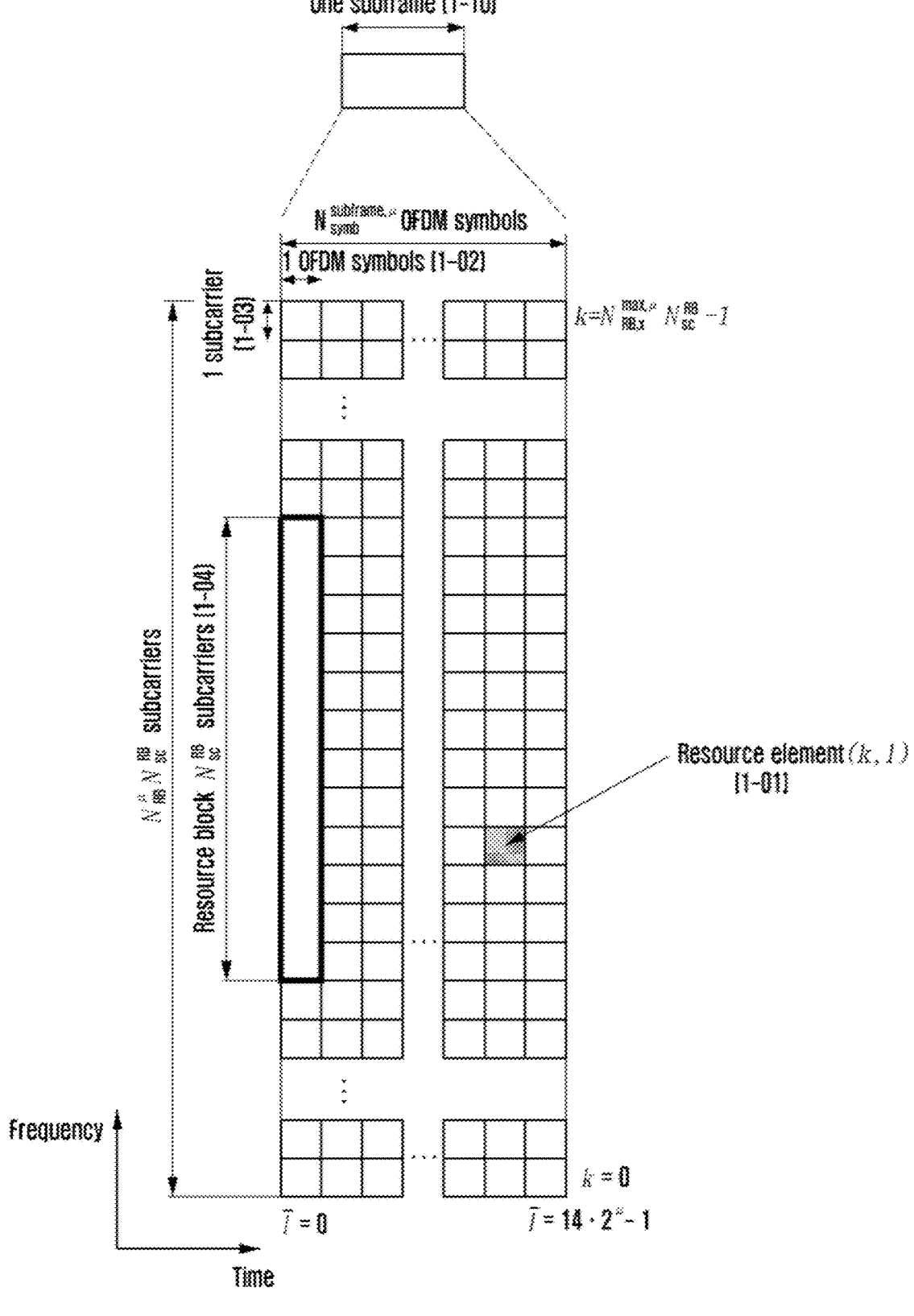
FIG. 1 is a diagram illustrating a basic structure of a time-frequency domain of a communication system according to an embodiment of the disclosure.

Hereinafter, embodiments of the disclosure will be described in detail with reference to the accompanying drawings.

In describing the embodiments, descriptions of technical contents that are well known in the technical field to which the disclosure pertains and that are not directly related to the disclosure will be omitted. This is to more clearly convey the gist of the disclosure without obscuring the gist of the disclosure by omitting unnecessary description.

For the same reason, some components are exaggerated, omitted, or schematically illustrated in the accompanying drawings. Further, the size of each component does not fully reflect the actual size. In each drawing, the same reference numerals are given to the same or corresponding components.

Advantages and features of the disclosure, and a method of achieving them will become apparent with reference to the embodiments described below in detail in conjunction with the accompanying drawings. However, the disclosure is not limited to the embodiments disclosed below, but may be implemented in various different forms, and only embodiments of the disclosure enable the disclosure to be complete, and are provided to fully inform the scope of the disclosure to those of ordinary skill in the art to which the disclosure pertains, and the disclosure is only defined by the scope of the claims. Like reference numerals refer to like components throughout the specification. Further, in the description of the disclosure, in case that it is determined that a detailed description of a related function or constitution may unnecessarily obscure the gist of the disclosure, a detailed description thereof will be omitted. Terms described below are terms defined in consideration of functions in the disclosure, which may vary according to intentions or customs of users and operators. Therefore, the definition should be made based on the content throughout this specification.

Hereinafter, a base station is a subject performing resource allocation of a terminal, and may be at least one of a gNode B, an eNode B, a node B, a base station (BS), a radio access unit, a base station controller, or a node on a network. The terminal may include a user equipment (UE), a mobile station (MS), a cellular phone, a smart phone, a computer, or a multimedia system capable of performing a communication function. In the disclosure, a downlink (DL) is a wireless transmission path of a signal transmitted from a base station to a terminal, and an uplink (UL) is a wireless transmission path of a signal transmitted from a terminal to a base station. Hereinafter, although LTE or LTE-A system may be described as an example, embodiments of the disclosure may be applied to other communication systems having a similar technical background or channel type. For example, embodiments of the disclosure may include 5G mobile communication technology (5G system, which may be used interchangeably with new radio, NR) developed after LTE-A, and the following 5G system may be a concept including existing LTE, LTE-A and other similar services. Further, the disclosure may be applied to other communication systems through some modifications within a range that does not significantly deviate from the scope of the disclosure by the determination of a person having skilled technical knowledge.

In this case, it will be understood that each block of flowcharts and combinations of the flowcharts may be performed by computer program instructions. Because these computer program instructions may be mounted in a processor of a general purpose computer, a special purpose computer, or other programmable data processing equipment, instructions performed by a processor of a computer or other programmable data processing equipment generate a means that performs functions described in the flowchart block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the flowchart block(s). Because the computer program instructions may be mounted on a computer or other programmable data processing equipment, a series of operational steps are performed on the computer or other programmable data processing equipment to generate a computer-executed process; thus, instructions for performing a computer or other programmable data processing equipment may provide steps for performing functions described in the flowchart block(s).

Further, each block may represent a module, a segment, or a portion of a code including one or more executable instructions for executing a specified logical function(s). Further, it should be noted that in some alternative implementations, functions recited in the blocks may occur out of order. For example, two blocks illustrated one after another may in fact be performed substantially simultaneously, or the blocks may be sometimes performed in the reverse order according to the corresponding function.

In this case, a term '-unit' used in this embodiment means software or hardware components such as a field programmable gate array (FPGA) or an application specific integrated circuit (ASIC), and '-unit' performs certain roles. However, '-unit' is not limited to software or hardware. '-unit' may be constituted to reside in an addressable storage medium or may be constituted to reproduce one or more processors. Therefore, as an example, '-unit' includes components such as software components, object-oriented software components, class components, and task components, processes, functions, properties, procedures, subroutines, segments of program code, drivers, firmware, microcode, circuit, data, databases, data structures, tables, arrays, and variables. Functions provided in the components and '-units' may be combined into a smaller number of components and '-units' or may be further separated into additional components and '-units'. Further, components and '-units' may be implemented to reproduce one or more CPUs in a device or secure multimedia card. Further, in an embodiment, '-unit' may include one or more processors.

Hereinafter, embodiments of the disclosure will be described in detail with reference to the accompanying drawings. Hereinafter, for a method and apparatus proposed in the embodiment of the disclosure, an embodiment of the disclosure will be described as an example of a service for improving coverage, but it is not limited to each embodiment and may be utilized for a data channel, a control channel, and a reference signal transmission and reception method corresponding to other additional services using a combination of all or some embodiments of one or more embodiments proposed in the disclosure. Accordingly, an embodiment of the disclosure may be applied through some modifications within a range that does not significantly deviate from the scope of the disclosure by the determination of a person having skilled technical knowledge.

Further, in describing the disclosure, in case that it is determined that a detailed description of a related function or configuration may unnecessarily obscure the gist of the disclosure, a detailed description thereof will be omitted. Terms described below are terms defined in consideration of functions in the disclosure, which may vary according to intentions or customs of users and operators. Therefore, the definition should be made based on the contents throughout this specification.

A wireless communication system has evolved from providing voice-oriented services in the early days to a broadband wireless communication system that provides high-speed and high-quality packet data services as in communication standards such as high speed packet access (HSPA), long term evolution (LTE) or evolved universal terrestrial radio access (E-UTRA), LTE-Advanced (LTE-A), and LTE-Pro of 3GPP, high rate packet data (HRPD) and ultra mobile broadband (UMB) of 3GPP2, and IEEE 802.16e.

An LTE system, which is a representative example of the broadband wireless communication system, employs an orthogonal frequency division multiplexing (OFDM) scheme in a downlink (DL) and a single carrier frequency division multiple access (SC-FDMA) scheme in an uplink. The uplink means a radio link in which a user equipment (UE) or a mobile station (MS) transmits data or control signals to an eNode B (eNB) or a base station (BS), and the downlink means a radio link in which a base station transmits data or control signals to a terminal. Further, the above-mentioned multiple access method enables data or control information of each user to distinguish by allocating and operating data or control information so that time-frequency resources to carry data or control information for each user in general do not overlap each other, that is, so that orthogonality is established.

A 5G communication system, which is a communication system after LTE, should support services that simultaneously satisfy various requirements so that various requirements of users and service providers may be freely reflected. Services considered for the 5G communication system include enhanced mobile broadband (eMBB), massive machine type communication (mMTC), ultra reliability low latency communication (URLLC), and the like.

The eMBB aims to provide a more improved data rate than a data rate supported by existing LTE, LTE-A, or LTE-Pro. For example, in the 5G communication system, the eMBB should be able to provide a peak data rate of 20 Gbps in a downlink and a peak data rate of 10 Gbps in an uplink from the viewpoint of one base station. Further, the 5G communication system should provide an increased user perceived data rate of a terminal while providing a peak data rate. In order to satisfy such requirements, it may be required to improve various transmission and reception technologies, including more advanced multi input and multi output (MIMO) transmission technology. Further, the LTE system transmits a signal using a transmission bandwidth of maximum 20 MHz in the 2 GHz band, whereas the 5G communication system can satisfy a data rate required by the 5G communication system by using a frequency bandwidth wider than 20 MHz in a frequency band of 3 to 6 GHz or 6 GHz or more.

Further, when the base station supports a frequency of a broadband width, bandwidth part (BWP) technology, in which the base station divides into several frequency bands that can be supported by each terminal within the entire carrier frequency band, has been highlighted as important. That is, when the base station supports a BWP, in case that a BW capability of a specific terminal is small, a small frequency band may be supported to the terminal through the BWP, and energy consumption of the terminal may be reduced while reducing the frequency band by changing the BWP. In addition, while supporting a different frame structure for each of several BWPs, there is an effect that may support various services without latency to one terminal through BWP change. The BWP technology may be applied to a control channel or a data channel corresponding to one-to-one between a predetermined terminal and a base station. Further, for a control channel and a data channel for transmitting a common signal, for example, a synchronization signal, a physical broadcast channel (PBCH), and system information, in which the base station transmits to a plurality of terminals in the system, by transmitting only in a BWP that configures the control channel and the data channel, the BWP may be applied for energy reduction of the base station.

At the same time, mMTC is being considered to support application services such as Internet of Thing (IoT) in the 5G communication system. In order to efficiently provide IoT, mMTC requires access support for large-scale terminals within a cell, improvement of coverage of terminals, an improved battery time, and cost reduction of terminals. Because the IoT is attached to various sensors and various devices to provide communication functions, it should be able to support a large number of terminals (e.g., 1,000,000 terminals/km2) within a cell. Further, because a terminal supporting mMTC is highly likely to be positioned in a shaded area that a cell cannot cover, such as the basement of a building, due to the nature of the service, the terminal requires wider coverage compared to other services provided by the 5G communication system. The terminal supporting mMTC should be configured with a low cost terminal, and because it is difficult to frequently exchange a battery of the terminal, a very long battery life time such as 10 to 15 years is required.

Finally, URLLC is a cellular-based wireless communication service used for mission-critical. For example, a service used for remote control of a robot or machinery, industrial automation, unmanned aerial vehicle, remote health care, emergency alert, and the like may be considered. Therefore, communication provided by URLLC should provide very low latency and very high reliability. For example, a service supporting URLLC should satisfy air interface latency smaller than 0.5 milliseconds and should simultaneously satisfy the requirement of a packet error rate of 10-5 or less. Therefore, for a service supporting URLLC, the 5G system should provide a transmit time interval (TTI) smaller than that of other services, and should allocate a wide resource in a frequency band in order to simultaneously secure reliability of a communication link.

Three services, i.e., eMBB, URLLC, and mMTC of the 5G communication system (hereinafter, it may be used interchangeably with a 5G system) may be multiplexed and transmitted in a single system. In this case, in order to satisfy different requirements of each service, different transmission and reception techniques and transmission and reception parameters may be used between services.

Hereinafter, a frame structure of a 5G system will be described in more detail with reference to the drawings.

FIG. 1 is a diagram illustrating a basic structure of a time-frequency domain, which is a radio resource domain of a 5G system according to an embodiment of the disclosure.

In FIG. 1, a horizontal axis represents a time domain, and a vertical axis represents a frequency domain. A basic unit of resources in the time and frequency domain is a resource element (RE) 1-01 and may be defined as one orthogonal frequency division multiplexing (OFDM) symbol (or discrete Fourier transform spread OFDM (DFT-s-OFDM) symbol) 1-02 on a time axis and one subcarrier 1-03 on a frequency axis. In the frequency domain, the $$N_{SC}^{RB}$$

(e.g., 12) number of continuous REs may constitute one resource block (RB) 1-04. Further, in the time domain, the $$N_{symb}^{subframe}$$

number of continuous OFDM symbols may constitute one subframe 1-10.

Figure 2:
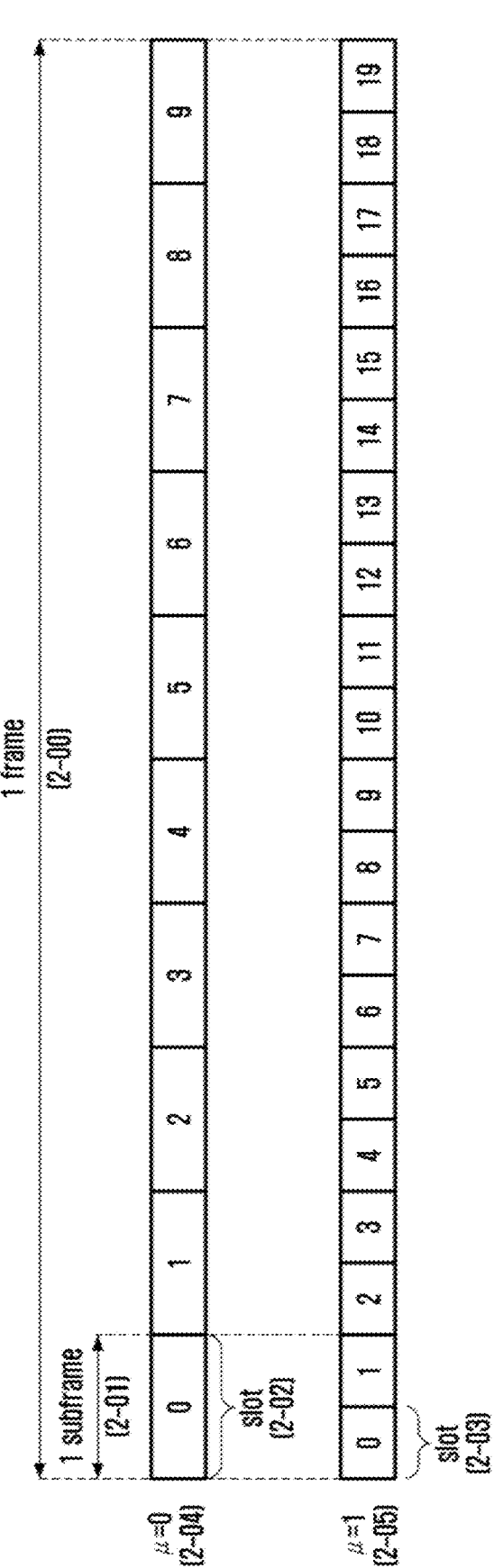
FIG. 2 is a diagram illustrating an example of a slot structure of a communication system according to an embodiment of the disclosure.

FIG. 2 is a diagram illustrating an example of a slot structure of a 5G communication system.

FIG. 2 illustrates an example of a structure of a frame 2-00, a subframe 2-01, and a slot 2-02. One frame 2-00 may be defined as 10 ms. One subframe 2-01 may be defined as 1 ms; thus, one frame 2-00 may be configured with total 10 subframes 2-01. Further, one slots 2-02 and 2-03 may be defined as 14 OFDM symbols (i.e., the number $$N_{symb}^{slot}$$

of symbols per slot=14). One subframe 2-01 may be configured with one or a plurality of slots 2-02 and 2-03, and the number of the slots 2-02 and 2-03 per subframe 2-01 may vary according to μ 2-04 and 2-05, which are configuration values for subcarrier spacing.

In an example of FIG. 2, a slot structure in case of μ=0 (2-04) and μ=1 (2-05) as a subcarrier spacing configuration value is illustrated. In case of μ=0 (2-04), one subframe 2-01 may be constituted with one slot 2-02, and in case of u=1 (2-05), one subframe 2-01 may be constituted with two slots 2-03. That is, the number $$N_{slot}^{subframe,\mu}$$

of slots per subframe may vary according to a configuration value for the subcarrier spacing; thus, the number $$N_{slot}^{frame,\mu}$$

of slots per frame may vary.

$$N_{slot}^{subframe,\mu}$$

and $$N_{slot}^{frame,\mu}$$

according to each subcarrier spacing configuring u may be defined as Table 1.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In a 5G wireless communication system, for initial access, a synchronization signal block (which may be used interchangeably with an SSB, an SS block, and an SS/PBCH block) may be transmitted, and the synchronization signal block may be configured with a primary synchronization signal (PSS), a secondary synchronization signal (SSS), and a physical broadcast channel (PBCH). In an initial access step in which the UE first accesses the system, the UE may first acquire a downlink time and frequency domain synchronization from a synchronization signal through cell search, and acquire cell ID. The synchronization signal may include a PSS and an SSS.

The UE may receive a PBCH transmitting a master information block (MIB) from the base station to obtain a basic parameter value and system information related to transmission and reception, such as system bandwidth or related control information. Based on the information, the UE may decode a physical downlink control channel (PDCCH) and a physical downlink shared channel (PDSCH) to acquire a system information block (SIB). Thereafter, the UE exchanges an identity with the base station through a random access step, and initially accesses the network through steps such as registration and authentication.

The synchronization signal is a reference signal for cell search, and may be transmitted by applying subcarrier spacing appropriate for a channel environment, such as phase noise, for each frequency band. The 5G base station may transmit a plurality of synchronization signal blocks according to the number of analog beams to be operated. The PSS and SSS may be mapped and transmitted over 12 RBs and the PBCH may be mapped and transmitted over 24 RBs.

Hereinafter, a bandwidth part (BWP) configuration in a 5G communication system will be described in detail with reference to the drawings.

Figure 3:
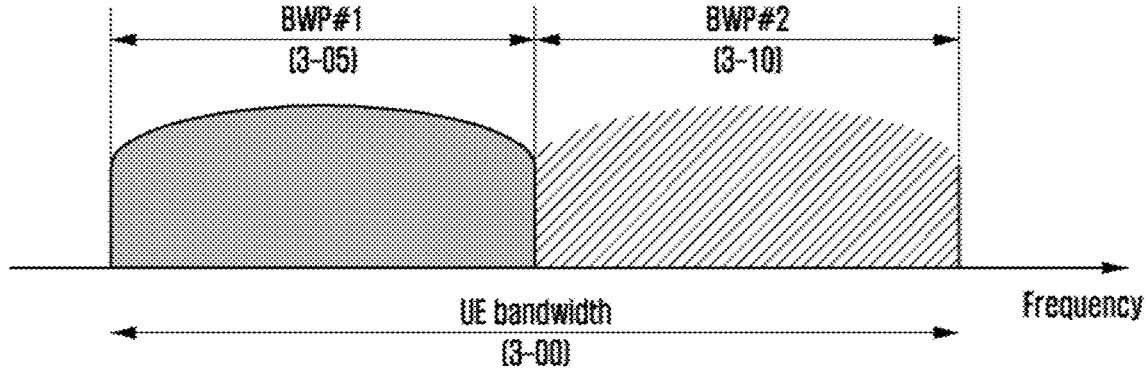
FIG. 3 is a diagram illustrating an example of a configuration of a bandwidth part in a communication system according to an embodiment of the disclosure.

FIG. 3 is a diagram illustrating an example of a configuration of a bandwidth part in a communication system according to an embodiment of the disclosure.

FIG. 3 illustrates an example in which a UE bandwidth 3-00 is configured with two bandwidth parts, that is, a bandwidth part #1 (BWP #1) 3-05 and a bandwidth part #2 (BWP #2) 3-10. The base station may configure one or a plurality of bandwidth parts to the UE and configure the following information in each bandwidth part.

TABLE 2

BWP ::= SEQUENCE {
bwp-Id BWP-Id,
(bandwidth part identity)
locationAndBandwidth INTEGER (1..65536),
(bandwidth part location)
subcarrierSpacing ENUMERATED {n0, n1, n2, n3, n4, n5},
(subcarrier spacing)

TABLE 2-continued cyclicPrefix ENUMERATED { extended }
(cyclic prefix)
}

The disclosure is not limited to the above example, and in addition to the configuration information, various parameters related to the bandwidth part may be configured to the UE. The information may be transmitted by the base station to the UE through higher layer signaling, for example, radio resource control (RRC) signaling. At least one bandwidth part of the configured one or plurality of bandwidth parts may be activated. Whether to activate the configured bandwidth part may be semi-statically transmitted from the base station to the UE through RRC signaling or may be dynamically transmitted through downlink control information (DCI).

According to some embodiments, the UE before radio resource control (RRC) connection may receive a configuration of an initial bandwidth part (initial BWP) for initial access from the base station through a master information block (MIB). More specifically, in an initial access step, the UE may receive configuration information on a search space and a control resource set (CORESET) in which a physical downlink control channel (PDCCH) for receiving system information (may correspond to remaining system information (RMSI) or system information block 1 (SIB1)) required for initial access through the MIB may be transmitted. Each of the control area and the search space configured by the MIB may be regarded as an identity (ID) 0. The base station may notify the UE of frequency allocation information, time allocation information, and configuration information such as numerology for the control area #0 through the MIB. Further, the base station may notify the UE of a monitoring period on a control area #0 and configuration information on an occasion, that is, configuration information on a search space #0 through the MIB. The UE may regard a frequency domain configured as the control area #0 acquired from the MIB as an initial bandwidth part for initial access. In this case, the identity (ID) of the initial bandwidth part may be regarded as 0.

A configuration for the bandwidth part supported by the 5G system may be used for various purposes.

According to some embodiments, in case that a bandwidth supported by the UE is smaller than a system bandwidth, it may be supported through the bandwidth part configuration. For example, by configuring a frequency position (configuration information 2) of the bandwidth part to the UE, the UE may transmit and receive data at a specific frequency position within the system bandwidth.

Further, according to some embodiments, for the purpose of supporting different numerologies, the base station may configure a plurality of bandwidth parts to the UE. For example, in order to support both data transmission and reception using subcarrier spacing of 15 kHz and subcarrier spacing of 30 kHz to a certain UE, two bandwidth parts may be configured to subcarrier spacing of 15 kHz and 30 kHz, respectively. Different bandwidth parts may be frequency division multiplexed, and in case that data is to be transmitted and received at specific subcarrier spacing, a bandwidth part configured to the corresponding subcarrier spacing may be activated.

Further, according to some embodiments, for the purpose of reducing power consumption of the UE, the base station may configure a bandwidth part having different sizes of bandwidths to the UE. For example, in case that the UE supports a very large bandwidth, for example, a bandwidth of 100 MHz and always transmits and receives data using the corresponding bandwidth, very large power consumption may occur. In particular, in a situation in which there is no traffic, to monitor an unnecessary downlink control channel with a large bandwidth of 100 MHz may be very inefficient in terms of power consumption. For the purpose of reducing power consumption of the UE, the base station may configure a relatively small bandwidth part, for example, a bandwidth part of 20 MHz to the UE. In a situation in which there is no traffic, the UE may perform a monitoring operation in the bandwidth part of 20 MHz, and in case that data is generated, the UE may transmit and receive data with a bandwidth part of 100 MHz according to the instruction of the base station.

In a method of configuring the bandwidth part, UEs before RRC connection may receive configuration information on the initial bandwidth part through a master information block (MIB) in the initial access step. More specifically, the UE may receive a configuration of a control area (control resource set (CORESET) or may be used interchangeably with the control resource set) for a downlink control channel through which downlink control information (DCI) scheduling a system information block (SIB) may be transmitted from the MIB of the physical broadcast channel (PBCH). The bandwidth of the control area configured as the MIB may be regarded as an initial bandwidth part, and the UE may receive a physical downlink shared channel (PDSCH) through which the SIB is transmitted through the configured initial bandwidth part. In addition to the purpose of receiving the SIB, the initial bandwidth part may be utilized for other system information (OSI), paging, and random access.

In case that one or more bandwidth parts are configured to the UE, the base station may instruct the UE to change the bandwidth part using a bandwidth part indicator field in DCI. As an example, in case that a currently activated bandwidth part of the UE in FIG. 3 is a bandwidth part #1, 3-05, the base station may instruct a bandwidth part #2, 3-10 as a bandwidth part indicator in DCI to the UE, and the UE may change the bandwidth part to the bandwidth part #2, 3-10 indicated by the bandwidth part indicator in the received DCI.

As described above, because a DCI-based bandwidth part change may be indicated by DCI scheduling a PDSCH or a physical uplink shared channel (PUSCH), in case that the UE receives a bandwidth part change request, the UE should be able to receive or transmit the PDSCH or PUSCH scheduled by the DCI without difficulty in the changed bandwidth part. To this end, the standard defines the requirements for a delay time TBWP required upon changing the bandwidth part, and may be defined, for example, as follows.

TABLE 3

| H | NR Slot length (ms) | BWP switch delay Tbwp (slots) | |
| | | Type 1[Note 1] | Type 2[Note 1] |
| --- | --- | --- | --- |
| 0 | 1 | 1 | 3 |
| 1 | 0.5 | 2 | 5 |
| 2 | 0.25 | 3 | 9 |
| 3 | 0.125 | 6 | 17 |

Note
1: Depends on UE capability.
Note
2: If the BWP switch involves changing of SCS, the BWP switch delay is determined by the larger one between the SCS before BWP switch and the SCS after BWP switch.

The requirement for the bandwidth part change delay time supports a type 1 or a type 2 according to a capability of the UE. The UE may report a supportable bandwidth part delay time type to the base station.

Figure 4:
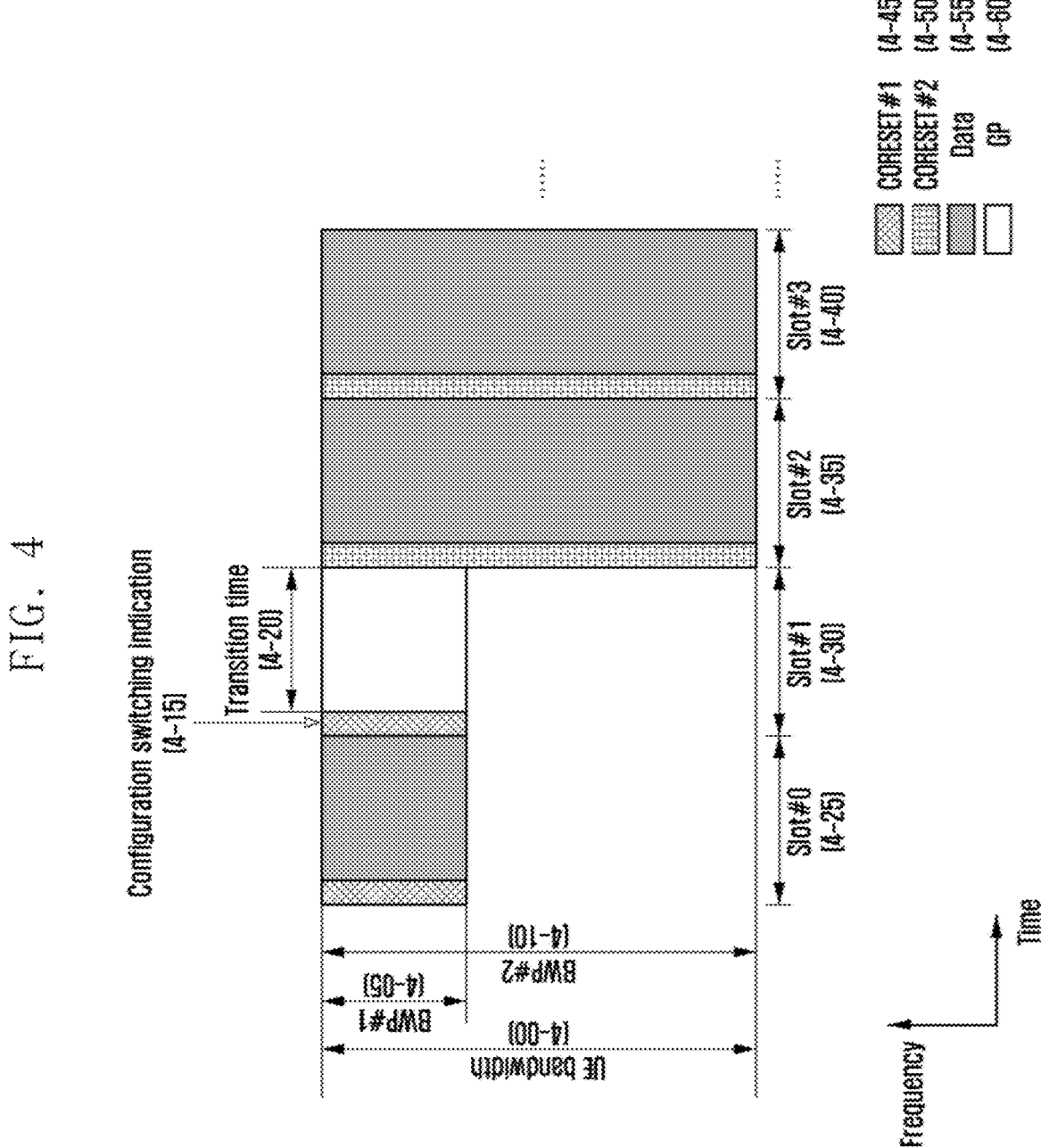
FIG. 4 is a diagram illustrating an example of a bandwidth part change procedure in a communication system according to an embodiment of the disclosure.

FIG. 4 is a diagram illustrating an example of a method of changing a bandwidth according to an embodiment of the disclosure.

With reference to FIG. 4, in case that the UE receives DCI including the bandwidth part change indicator in a slot n according to the requirement for the above-described bandwidth part change delay time (4-15), the UE may complete the change to a new bandwidth part indicated by the bandwidth part change indicator at a time point not later than a slot n+TBWP, and transmit and receive a data channel scheduled by the DCI in a changed new bandwidth part 4-10. In case that the base station wants to schedule a data channel with a new bandwidth part, the base station may determine time domain resource allocation for the data channel in consideration of the bandwidth part change delay time (TBWP) 4-20 of the UE. That is, when the base station schedules a data channel with the new bandwidth part, in a method of determining time domain resource allocation for the data channel, the base station may schedule the corresponding data channel after the bandwidth part change delay time (4-35, 4-40). Accordingly, the UE may not expect that DCI indicating the bandwidth part change indicates a slot offset (K0 or K2) value smaller than the bandwidth part change delay time (TBWP) 4-20.

When the UE receives DCI (e.g., DCI format 1_1 or 0_1) indicating a bandwidth part change, the UE may perform no transmission or reception during a time period corresponding from a third symbol of a slot that has received a PDCCH including the DCI to a start point of the slot indicated with a slot offset (K0 or K2) value indicated with a time domain resource allocation indicator field in the DCI. For example, when the UE has received DCI indicating a bandwidth part change in a slot n, and a slot offset value indicated by the DCI is K, the UE may perform no transmission or reception from a third symbol of a slot n to a previous symbol of a slot n+K (i.e., a last symbol of a slot n+K−1).

Hereinafter, a method of configuring transmission and reception related parameters for each bandwidth part in the 5G system will be described.

The UE may receive a configuration of one or a plurality of bandwidth parts from the base station and additionally receive a configuration of parameters (e.g., uplink and downlink data channel and control channel related configuration information) to be used for transmission and reception for each configured bandwidth part. For example, in FIG. 3, in case that the UE receives a configuration of a bandwidth part #1, 3-05 and a bandwidth part #2, 3-10, the UE may receive a configuration of a transmission and reception parameter #1 to the bandwidth part #1, 3-05, and receive a configuration of a transmission and reception parameter #2 to the bandwidth part #2, 3-10. In case that the bandwidth part #1, 3-05 is activated, the UE may perform transmission and reception to and from the base station based on the transmission and reception parameter #1, and in case that the bandwidth part #2, 3-10 is activated, the UE may perform transmission and reception to and from the base station based on the transmission and reception parameter #2.

More specifically, the following parameters may be configured from the base station to the UE.

First, the following information may be configured for the uplink bandwidth part.

TABLE 4

```
BWP-Uplink ::= SEQUENCE (
bwp-Id BWP-Id,
(bandwidth part identity)
bwp-Common BWP-UplinkCommon OPTIONAL, -- Cond SetupOtherBWP
(cell-specific or common parameter)
bwp-Dedicated BWP-UplinkDedicated OPTIONAL, -- Cond SetupOtherBWP
(UE-specific parameter)
...
}
BWP-UplinkCommon ::= SEQUENCE {
genericParameters BWP,
(general parameter)
rach-ConfigCommon SetupRelease { RACH-ConfigCommon } OPTIONAL,
-- Need M
(random access related common parameter)
pusch-ConfigCommon SetupRelease { PUSCH-ConfigCommon }
OPTIONAL, -- Need M
(PUSCH related UE-specific parameter)
pucch-ConfigCommon SetupRelease { PUCCH-ConfigCommon }
OPTIONAL, -- Need M
(PUSCH related UE-specific parameter)
...
}
BWP-UplinkDedicated ::= SEQUENCE {
pucch-Config SetupRelease { PUCCH-Config } OPTIONAL, -- Need M
(PUCCH related UE-specific parameter)
pusch-Config SetupRelease { PUSCH-Config } OPTIONAL, -- Need M
(PUSCH related UE-specific parameter)
configuredGrantConfig
(Configured grant related parameter) SetupRelease
{ ConfiguredGrantConfig }
OPTIONAL, -- Need M
srs-Config
(SRS related parameter)
SetupRelease { SRS-Config } OPTIONAL, -- Need M
beamFailureRecoveryConfig
(beam failure recovery related parameter) SetupRelease
{ BeamFailureRecoveryConfig }
OPTIONAL, -- Cond SpCellOnly
...
}
```

According to the table described above, the UE may receive a configuration of cell-specific (or cell common or common) transmission related parameters (e.g., a random access channel (RACH), a physical uplink control channel (PUCCH), and a physical uplink shared channel) related parameters) from the base station (corresponding to BWP-UplinkCommon). Further, the UE may receive a configuration of UE-specific (or dedicated) transmission related parameters (e.g., PUCCH, PUSCH, non-approval-based uplink transmission (configured grant PUSCH), and sounding reference signal (SRS) related parameters) from the base station (corresponding to BWP-UplinkDedicated).

Hereinafter, the following information may be configured for the downlink bandwidth part.

TABLE 5

```
BWP-Downlink ::= SEQUENCE {
bwp-Id BWP-Id,
(bandwidth part identity)
bwp-Common B WP-DownlinkCommon OPTIONAL, -- Cond SetupOtherBWP
(cell-specific or common parameter)
bwp-Dedicated BWP-DownlinkDedicated OPTIONAL, -- Cond SetupOtherBWP
(UE-specific parameter)
...
}
BWP-DownCommon ::= SEQUENCE {
genericParameters BWP,
(general parameter)
pdcch-ConfigCommon SetupRelease { PDCCH-ConfigCommon } OPTIONAL, -- Need
M
(PDCCH related common parameter)
pdsch-ConfigCommon SetupRelease { PDSCH-ConfigCommon } OPTIONAL, -- Need
M
(PDSCH related common parameter)
...
}
BWP-DownDedicated ::= SEQUENCE {
pdech-Config SetupRelease { PDCCH-Config } OPTIONAL, -- NeedM
(PDCCH related UE-specific parameter)
pdsch-Config SetupRelease { PDSCH-Config } OPTIONAL, -- Need M
```

TABLE 5-continued

```
(PDSCH related UE-specific parameter)
sps-Config
(SPS related parameter) SetupRelease { SPS-Config } OPTIONAL, -- Need M
radioLinkMonitoringConfig
(RLM related parameter) SetupRelease { radioLinkMonitoringConfig} OPTIONAL, --
Cond SpCellOnly
...
}
```

According to the table described above, the UE may receive a configuration of cell-specific (or cell common or common) reception related parameters (e.g., physical downlink control channel (PDCCH) and physical downlink shared channel related parameters) from the base station (corresponding to BWP-DownlinkCommon). Further, the UE may receive a configuration of UE-specific (or dedicated) reception related parameters (e.g., PDCCH, PDSCH, non-approval-based downlink data transmission (semi-persistent scheduled PDSCH), and radio link monitoring (RLM) related parameters) from the base station (corresponding to BWP-UplinkDedicated).

The control resource set in the above-described 5G system may be configured by the base station to the UE through higher layer signaling (e.g., system information, master information block (MIB), radio resource control (RRC) signaling). To configure the control resource set to the UE means to provide information such as a control resource set identity, a frequency position of the control resource set, and a symbol length of the control resource set. For example, information provided to configure the control resource set is as follows.

TABLE 6

```
ControlResourceSet ::=          SEQUENCE {
Corresponds to L1 parameter 'CORESET-ID'
controlResourceSetId ControlResourceSetId,
(control resource set identity)
frequencyDomainResources BIT STRING (SIZE (45)),
(frequency domain resource allocation information)
duration INTEGER (1..maxCoReSetDuration),
(time axis resource allocation information)
cce-REG-MappingType CHOICE {
(CCE-to-REG mapping method)
Interleaved SEQUENCE {
reg-BundleSize ENUMERATED {n2, n3, n6},
(REG bundle size)
precoderGranularity ENUMERATED {sameAsREG-bundle, all ContiguousRBs},
interleaverSize ENUMERATED {n2, n3, n6}
(interleaver size)
shiftindex INTEGER(0..maxNrofPhysicalResourceBlocks-1) OPTIONAL
(interleaver shift)
},
nonInterleaved NULL
},
tci-StatesPDCCH SEQUENCE(SIZE (1..maxNrofTCI-StatesPDCCH)) OF
TCI-StateIdOPTIONAL,
(QCL configuration information)
tci-PresentInDCI ENUMERATED {enabled} OPTIONAL, -- Need S
}
```

Figure 5:
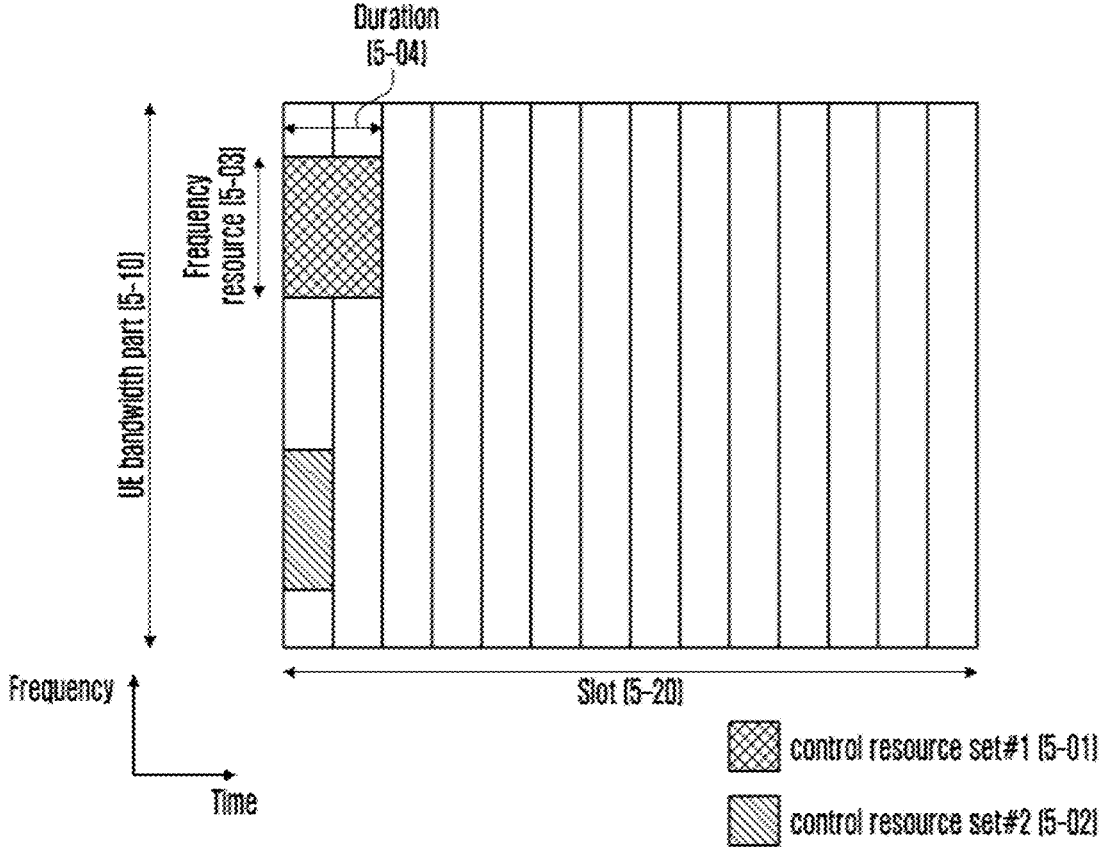
FIG. 5 is a diagram illustrating an example of a control resource set (CORESET) of a communication system according to an embodiment of the disclosure.

FIG. 5 is a diagram illustrating an example in which a UE bandwidth part 510 on the frequency axis, and two control resource sets (control resource set #1, 5-01, control resource set #2, 5-02) within 1 slot 5-20 on the time axis are configured. The control resource sets 5-01 and 5-02 may be configured in a specific frequency resource 5-03 within the entire UE bandwidth part 510 on the frequency axis. One or a plurality of OFDM symbols may be configured on a time axis, and this may be defined as control resource set duration 5-04. With reference to an example illustrated in FIG. 5, the control resource set #1, 5-01 may be configured to control resource set duration of 2 symbols, and the control resource set #2, 5-02 may be configured to control resource set duration of 1 symbol.

FIG. 5 is a diagram illustrating an example of a control resource set (CORESET) in which a downlink control channel is transmitted in a 5G wireless communication system.

In the 5G system, the control resource set may be configured with NRBCORESET RBs in the frequency axis, and may be configured with NsymbCORESET∈{1,2,3} symbols in the time axis. One CCE may be configured with 6 REGs, and a REG may be defined as 1 RB during 1 OFDM symbol. In one control resource set, REGs may be indexed in time-first order, starting with a REG index 0 from the lowest RB, the first OFDM symbol of the control resource set.

The 5G system supports an interleaved scheme and a non-interleaved scheme with a transmission method of the PDCCH. The base station may configure whether to transmit interleaving or non-interleaving for each control resource set to the UE through higher layer signaling. Interleaving may be performed in units of REG bundles. A REG bundle may be defined as a set of one or a plurality of REGs. The UE may determine a CCE-to-REG mapping method in the corresponding control resource set in the following manner based on whether interleaving or non-interleaving transmission configured from the base station is transmitted.

TABLE 7

The CCE-to-REG mapping for a control-resource set can be interleaved or non
-interleaved and is described by REG bundles:
   - REG bundle i is defined as REGs {iL, iL+ 1,...iL + L 1} where L is the
      REG bundle size, i = 0,1, ...,$N_{REG}^{CORESET}$/L − 1, and $N_{REG}^{CORESET}$ =
      $N_{Rb}^{CORESET}$ $N_{symb}^{CORESET}$ is the number of REGs in the CORESET
   - CCE j consists of REG bundles {f(6j/L), f(6j/L + 1),...,f(6j/L + 6/L − 1)} where
      f(·) is an interleaver
For non-interleaved CCE-to-REG mapping, L = 6 and f(x) = x.
For interleaved CCE-to-REG mapping, L ∈ {2,6]}for $N_{symb}^{CORESET}$ = 1 and L ∈
{$N_{symb}^{CORESET}$, 6) for $N_{symb}^{CORESET}$ ∈{2,3]}. The interleaver is defined by
        f(x) = (rC + c + $n_{shift}$) mod ($N_{REG}^{CORESET}$ /L)
          x = cR + r
          r = 0,1, ..., R − 1
          c = 0,1, ..., C − 1
          = $N_{REG}^{CORESET}$ /(LR)
where R∈{2,3,6]}.

All areas to which REs to which DCI is mapped and to which a demodulation reference signal (DMRS), which is a reference signal (RS, which may be used interchangeably with a reference signal) for decoding the REs is mapped may be included in a basic unit of the downlink control channel, that is, REG. Three DMRS REs may be included in one REG. The number of CCEs required to transmit the PDCCH may be 1, 2, 4, 8, or 16 according to an aggregation level (AL), and the number of different CCEs may be used for implementing link adaptation of the downlink control channel. For example, in case that AL=L, one downlink control channel may be transmitted through the L number of CCEs. The UE needs to detect a signal without knowing information on the downlink control channel, and for blind decoding, a search space indicating a set of CCEs is defined. The search space is a set of downlink control channel candidates consisting of CCEs in which the UE should attempt to decode on a given aggregation level, and because there are various aggregation levels that make one bundle with 1, 2, 4, 8 or 16 CCEs, the UE may have a plurality of search spaces. A search space set may be defined as a set of search spaces in all configured aggregation levels. The search space may be classified into a common search space and a UE-specific search space. A certain group of UEs or all UEs may examine a common search space of the PDCCH in order to receive cell-common control information such as a paging message or dynamic scheduling for system information. For example, the UE may examine the common search space of the PDCCH to receive PDSCH scheduling allocation information for transmission of the SIB including operator information of the cell. In case of the common search space, because a certain group of UEs or all UEs should receive the PDCCH, the common search space may be defined as a set of pre-promised CCEs. Scheduling allocation information for the UE-specific PDSCH or PUSCH may be received by examining the UE-specific search space of the PDCCH. The UE-specific search space may be UE-specifically defined as a function of an identity of the UE and various system parameters.

In the 5G system, the parameter for the search space for the PDCCH may be configured from the base station to the UE through higher layer signaling (e.g., SIB, MIB, RRC signaling). For example, the base station may configure the number of PDCCH candidates in each aggregation level L, a monitoring period for the search space, a monitoring occasion in symbol units in the slot for the search space, a search space type (common search space or UE-specific search space), a combination of RNTI and a DCI format to be monitored in the corresponding search space, a control resource set index for monitoring the search space, and the like to the UE. For example, the parameter for the search space for the PDCCH may include the following information.

TABLE 8

SearchSpace ::= SEQUENCE {
Identity of the search space. SearchSpaceId = 0 identifies the SearchSpace
configured via PBCH (MIB) or ServingCellConfigCommon
searchSpaceId SearchSpaceId,
(search space identity)
controlResourceSetId ControlResourceSetId,
(control resource set identity)
monitoringSlotPeriodicityAndOffset CHOICE {
(monitoring slot level period)
sl1 NULL,
sl2 INTEGER (0..1),
sl4 INTEGER (0..3),
sl5 INTEGER (0..4),
sl8 INTEGER (0..7),
sl10 INTEGER (0..9),
sl16 INTEGER (0..15),
sl20 INTEGER (0..19)
} OPTIONAL,
duration(monitoring length) INTEGER (2..2559)
monitoringSymbolsWithinSlot BIT STRING (SIZE (14)) OPTIONAL,
(monitoring symbol in slot)
nrofCandidates SEQUENCE {
(number of PDCCH candidates per aggregation level)
aggregationLevel1 ENUMERATED {n0, n1, n2, n3, n4, n5, n6, n8},
aggregationLevel2 ENUMERATED {n0, n1, n2, n3, n4, n5, n6, n8}, TABLE 8-continued

```
aggregationLevel4 ENUMERATED {n0, n1, n2, n3, n4, n5, n6, n8},
aggregationLevel8 ENUMERATED {n0, n1, n2, n3, n4, n5, n6, n8},
aggregationLevel16 ENUMERATED {n0, n1, n2, n3, n4, n5, n6, n8)
},
searchSpaceType CHOICE {
(search space type)
Configures this search space as common search space (CSS) and DCI formats to
monitor.
common SEQUENCE {
(common search space)
}
ue-Specific SEQUENCE {
(UE-specific search space)
Indicates whether the UE monitors in this USS for DCI formats 0-0 and 1-0 or for
formats 0-1 and 1-1.
formats ENUMERATED {formats0-0-And-1-0, formats0-1-And-1-1},

...

}
```

According to the configuration information, the base station may configure one or a plurality of search space sets to the UE. According to some embodiments, the base station may configure a search space set 1 and a search space set 2 to the UE. In the search space set 1, the UE may be configured to monitor a DCI format A scrambled with X-RNTI in the common search space, and in the search space set 2, the UE may be configured to monitor a DCI format B scrambled with Y-RNTI in the UE-specific search space.

According to the configuration information, one or a plurality of search space sets may exist in the common search space or the UE-specific search space. For example, a search space set #1 and a search space set #2 may be configured as the common search space, and a search space set #3 and a search space set #4 may be configured as the UE-specific search space.

In the common search space, a combination of the following DCI format and RNTI may be monitored. The disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, a combination of the following DCI format and RNTI may be monitored. The disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the following definitions and uses.

C-RNTI (Cell RNTI): Used for UE-specific PDSCH scheduling

TC-RNTI (Temporary Cell RNTI): Used for UE-specific PDSCH scheduling

CS-RNTI (Configured Scheduling RNTI): Used for semi-statically configured UE-specific PDSCH scheduling RA-RNTI (Random Access RNTI): Used for PDSCH scheduling in random access step P-RNTI (Paging RNTI): Used for scheduling a PDSCH in which paging is transmitted SI-RNTI (System Information RNTI): Used for scheduling a PDSCH in which system information is transmitted INT-RNTI (Interruption RNTI): Used for indicating whether a PDSCH is punctured TPC-PUSCH-RNTI (Transmit Power Control for PUSCH RNTI): Used for indicating a power control command for a PUSCH TPC-PUCCH-RNTI (Transmit Power Control for PUCCH RNTI): Used for indicating a power control command for a PUCCH TPC-SRS-RNTI (Transmit Power Control for SRS RNTI): Used for indicating a power control command for an SRS The specified DCI formats described above may follow the following definition.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G system, the search space of the aggregation level L in the control resource set p and the search space set s may be expressed by the following equation.

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \mod \left\lfloor N_{CCE,p}/L \right\rfloor \right\} + i \qquad \text{[Equation 1]}$$

L: Aggregation level nCI: carrier index

NCCE,p: the total number of CCEs present in the control resource set p nµs,f: slot index M(L)p,s,max: the number of PDCCH candidates of aggregation level L msnCI=0, . . . , M(L)p,s,max−1: PDCCH candidate index of aggregation level L i=0, . . . , L−1

$$Y_{p,n_{s,f}^\mu} = \left(A_p \cdot Y_{p,n_{s,f}^\mu-1}\right) \bmod D, \ Y_{p,-1} = n_{RN\tau1} \neq 0,$$

$$A_0 = 39827, \ A_1 = 39829, \ A_2 = 39839, \ D = 65537$$

nRNTI: UE identity

A Y_(p,nus,f) value may correspond to 0 in case of a common search space.

The Y_(p,nus,f) value may correspond to a value that changes according to an identity (C-RNTI or ID configured to the UE by the base station) of the UE and a time index in case of the UE-specific search space.

Hereinafter, a method of configuring a transmission configuration indication (TCI) state, which is a means for indicating or exchanging quasi co-location (QCL) information between a UE and a base station in a 5G communication system, will be described in detail.

The base station may configure and indicate a TCI state between two different RSs or channels through appropriate signaling to notify the QCL relationship between the different RSs or channels. The fact that different RSs or channels are QCLed means that it is allowed that the UE applies some or all of large-scale channel parameters estimated in the

TABLE 10

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may collectively refer to some or all of various parameters such as angle of arrival (AoA), power angular spectrum (PAS) of AoA, angle of departure (AoD), PAS of AoD, transmit and receive channel correlation, transmit and receive beamforming, and spatial channel correlation.

The QCL relationship may be configured to the UE through the RRC parameter TCI-State and QCL-Info, as illustrated in Table 11. With reference to Table 11, the base station may configure one or more TCI states to the UE to notify the UE of maximum two QCL relationships (qcl-Type1, qcl-Type2) for an RS, that is, a target RS referring to an ID of the TCI state. In this case, each QCL information (QCL-Info) included in each TCI state includes a serving cell index and BWP index of a reference RS indicated by the QCL information, a type and ID of the reference RS, and a QCL type, as illustrated in Table 10.

TABLE 11

```
TCI-State := SEQUENCE {
tci-StateId TCI-StateId,
(ID of the TCI state)
qcl-Type1 QCL-Info,
(information of the first reference RS of the RS (target RS) referring to the TCI state
ID)
qcl-Type2 QCL-Info OPTIONAL, -- Need R
(QCL information of the second reference RS of the RS (target RS) referring to the TCI
state ID)
...
}
QCL-Info ::= SEQUENCE {
cell ServCellIndex OPTIONAL, -- Need R
(serving cell index of the reference RS indicated by the QCL information)
bwp-Id BWP-Id OPTIONAL, -- Cond CSI-RS-Indicated
(BWP index of the reference RS indicated by the QCL information)
referenceSignal CHOICE {
csi-rs NZP-CSI-RS-ResourceId,
ssb SSB-Index
(one of the CSI-RS ID or SSB ID indicated by the QCL information)
},
qcl-Type ENUMERATED {typeA, typeB, typeC, typeD),
...
}
``` antenna port A to channel measurement from the antenna port B in estimating a channel through a certain reference RS antenna port A (reference RS #A) and another target RS antenna port B (target RS #B) in a QCL relationship. QCL may be necessary to correlate different parameters according to a situation such as 1) time tracking affected by average delay and delay spread, 2) frequency tracking affected by Doppler shift and Doppler spread, 3) radio resource management (RRM) affected by an average gain, and 4) beam management (BM) affected by spatial parameter. Accordingly, NR supports four types of QCL relationships as illustrated in Table 10.

Hereinafter, a method of configuring spatial relation information (SpatialRelationInfo), which is a means for indicating uplink beam information between a UE and a base station in a 5G communication system, will be described in detail.

The base station may establish a relationship with another downlink channel or signal or an uplink channel or signal B (referenceSignal included in the SpatialRelationInfo configuration) to an uplink channel or a signal A (channel or signal referring to the SpatialRelationInfo) through appropriate signaling (SpatialRelationInfo). Based on this, the UE uses the same beam direction used for reception or transmission of the channel or signal B for transmission of the channel or signal A.

A constitution of the SpatialRelationInfo may be changed according to the type of an uplink channel or signal referring to the SpatialRelationInfo. For example, in case of SpatialRelationInfo referenced by the PUCCH resource, as in an example of Table 11-1, in addition to referenceSignal information for PUCCH transmission beam determination, the SpatialRelationInfo may include additional information (e.g., pucch-PathlossReferenceRS-Id, p0-PUCCH-Id, closedLoopIndex, and the like) for PUCCH transmission power determination. Similarly, Table 11-2 represents an example of the configuration of SpatialRelationInfo referenced by the SRS resource.

to a type of a target RS that may refer to a TCI state or adding an uplink channel or signal to a type of a referenceSignal (reference RS) included in the TCI state or QCL-Info. Further, various extension methods such as a DL-UL joint TCI state exist, but all methods are not described in order not to obscure the gist of the description.

Hereinafter, methods of allocating time and frequency resources for data transmission in NR will be described.

In NR, the following detailed frequency domain resource allocation (FD-RA) methods may be provided in addition to frequency domain resource candidate allocation through BWP indication.

Figure 6:
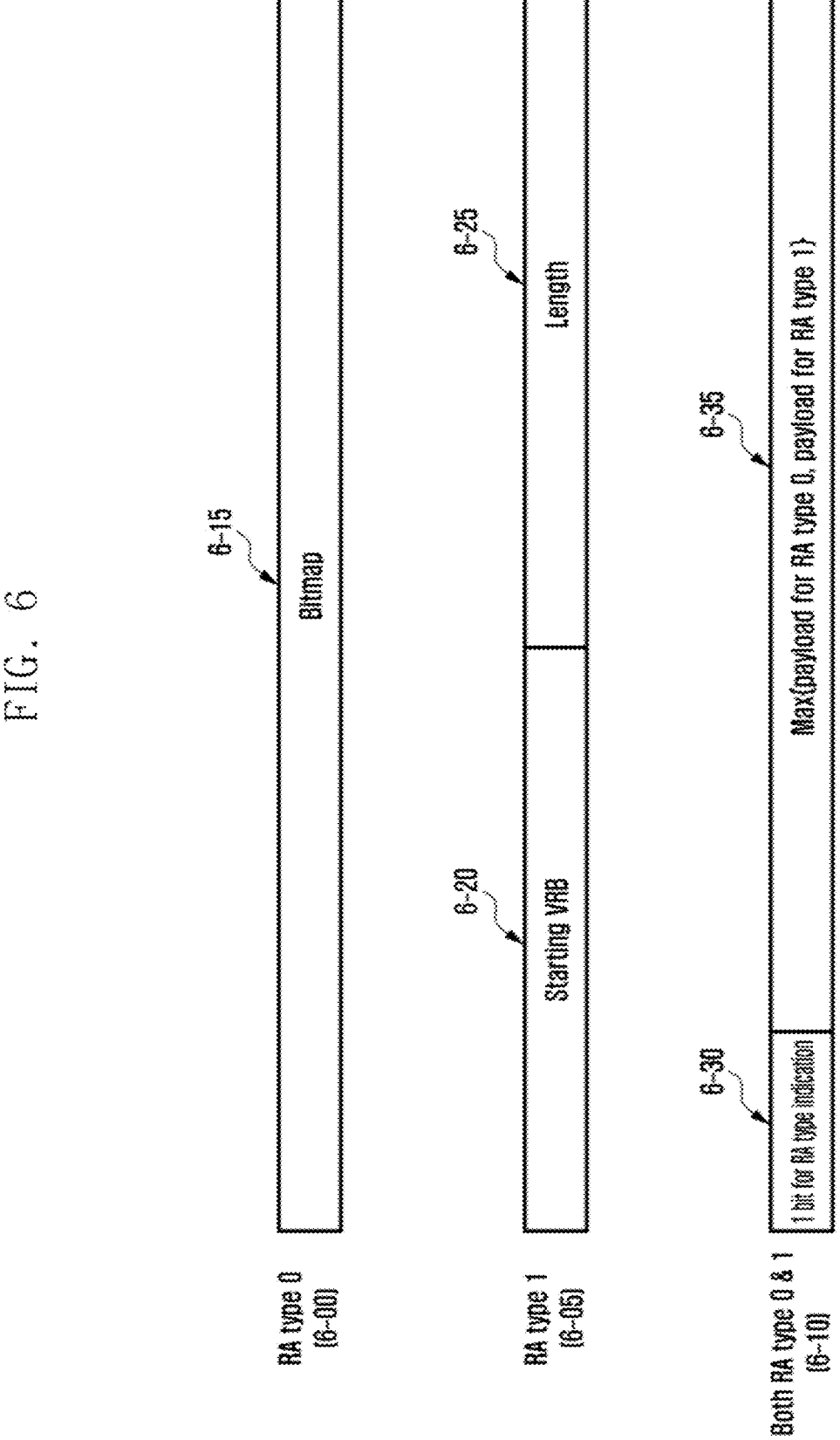
FIG. 6 is a diagram illustrating frequency domain resource assignment methods of a communication system according to an embodiment of the disclosure.

FIG. 6 is a diagram illustrating an example of a PDSCH frequency domain resource allocation in a wireless communication system according to an embodiment of the disclosure.

TABLE 11-1

```
PUCCH-SpatialRelationInfo ::=        SEQUENCE{
pucch-SpatialRelationInfold          PUCCH-SpatialRelatinInfold,
(ID of spatial relation information referenced by PUCCH resource)
serving CellId                              ServCellIndex
OPTIONAL, --Need S
(serving cell index of reference RS indicated by the corresponding Spatial relation
information)
referenceSignal                             CHOICE {
ssb-Index                            SSB-Index,
csi-RS-Index                              NZP-CSI-RS-ResourceId,
srs                                  SEQUENCE {
resource
SRS-ResourceId,
uplinkBWP
BWP-Id
}
}, (one of CSI-RS ID, SSB ID, or SRS resource ID indicated by the corresponding
Spatial relation information)
pucch-PathlossReferenceRS-Id          PUCCH-PathlossReferenceRS-Id,
p0-PUCCH-Id                               p0-PUCCH-Id,
closdeLoopIndex                      ENUMERATED {i0, i1}
}
```

TABLE 11-2

```
SRS-SpatialRelationInfo ::=          SEQUENCE{
serving CellId                              ServCellIndex
OPTIONAL, --Need S
(serving cell index of reference RS indicated by the corresponding Spatial relation
information)
referenceSignal                             CHOICE {
ssb-Index                               SSB-Index,
csi-RS-Index                         NZP-CSI-RS-ResourceId,
srs                                      SEQUENCE {
resourceId                          SRS-ResourceId,
uplinkBWP                               BWP-Id
}
} (one of CSI-RS ID, SSB ID, or SRS resource ID indicated by the corresponding Spatial
relation information)
}
```

In the above description, it has been described that a TCI state is used for beam indication of a downlink channel (indicates a reception spatial filter value/type of the UE) and that SpatialRelationInfo is used for beam indication of an uplink channel (indicates a transmission spatial filter value/type of the UE), but it should be noted that this does not mean a limitation according to the type of uplink and downlink and that mutual extension is possible in the future. For example, the conventional downlink TCI state (DL TCI state) may be extended to an uplink TCI state (UL TCI state) through a method such as adding an uplink channel or signal FIG. 6 is a diagram illustrating three frequency domain resource allocation methods of a type 0, 6-00, a type 1, 6-05, and a dynamic switch 6-10 configurable through a higher layer in NR.

With reference to FIG. 6, in case that the UE is configured to use only a resource type 0 through higher layer signaling (6-00), some downlink control information (DCI) that assign a PDSCH to the UE has a bitmap configured with the NRBG number of bits. Conditions for this will be again described later. In this case, NRBG means the number of resource block groups (RBGs) determined as illustrated in [Table 12]

according to a BWP size allocated by a BWP indicator and an upper layer parameter rbg-Size, and data is transmitted from the RBG indicated to 1 by the bitmap.

TABLE 12

| Bandwidth Part Size | Configur- ation 1 | Configur- ation 2 |
|---|---|---|
| [ 1-36 | 2 | 4 |
| 37-72 | 4 | 8 |
| 73-144 | 8 | 16 |
| 145-275 | 16 | 16 |

In case that the UE is configured to use only a resource type 1 through higher layer signaling (6-05), some DCI for allocating a PDSCH to the UE has frequency domain resource allocation information configured with the $$\lceil \log_2(P_{RB}^{DL,BWP}(N_{RB}^{DL,BWF} + 1)/2) \rceil$$

number of bits. Conditions for this are again described later. Thereby, the base station may configure a starting VRB 6-20 and a length of the frequency axis resource allocated continuously therefrom.

In case that the UE is configured to use both a resource type 0 and a resource type 1 through higher layer signaling (6-10), some DCI for allocating a PDSCH to the UE has frequency domain resource allocation information configured with bits of a large value 6-35 of a payload 6-15 for configuring a resource type 0 and payloads 6-20 and 6-25 for configuring a resource type 1. Conditions for this are again described later. In this case, one bit may be added to a first front part (MSB) of the frequency domain resource allocation information within DCI, and in case that the bit is 0, it may indicate that the resource type 0 is used, and in case that the bit is 1, it may indicate that the resource type 1 is used.

Figure 7:
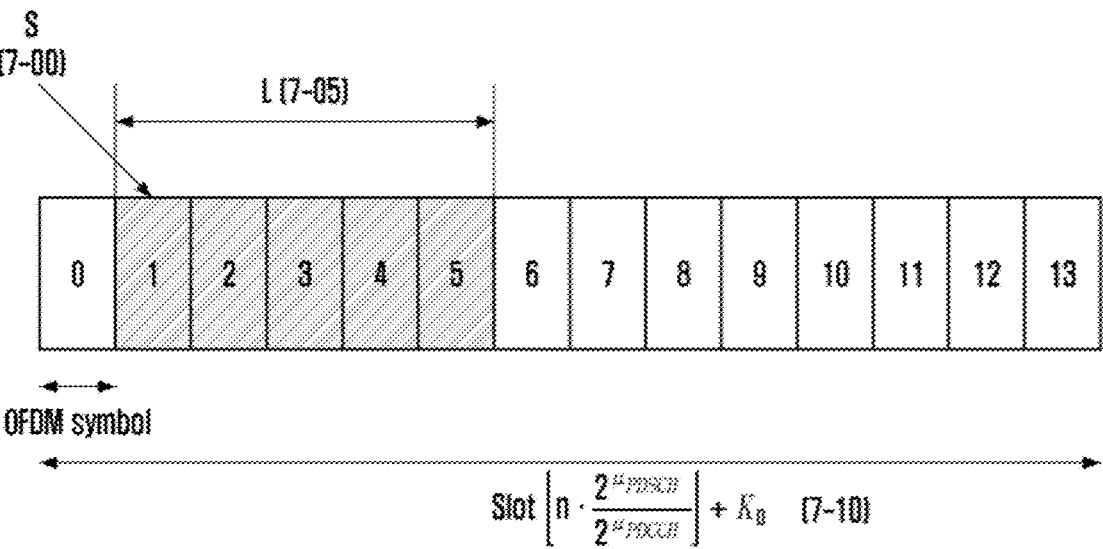
FIG. 7 is a diagram illustrating an example of time axis resource allocation of a communication system according to an embodiment of the disclosure.

FIG. 7 is a diagram illustrating an example of a physical downlink shared channel (PDSCH) time axis resource allocation in a wireless communication system according to an embodiment of the disclosure.

With reference to FIG. 7, the base station may indicate a time axis position of a PDSCH resource according to subcarrier spacing (SCS) (μPDSCH, μPDCCH) of a data channel and a control channel configured using a higher layer, a scheduling offset K0 value, and a OFDM symbol start position 7-00 and length 7-05 within one slot 7-10 dynamically indicated through DCI.

Figure 8:
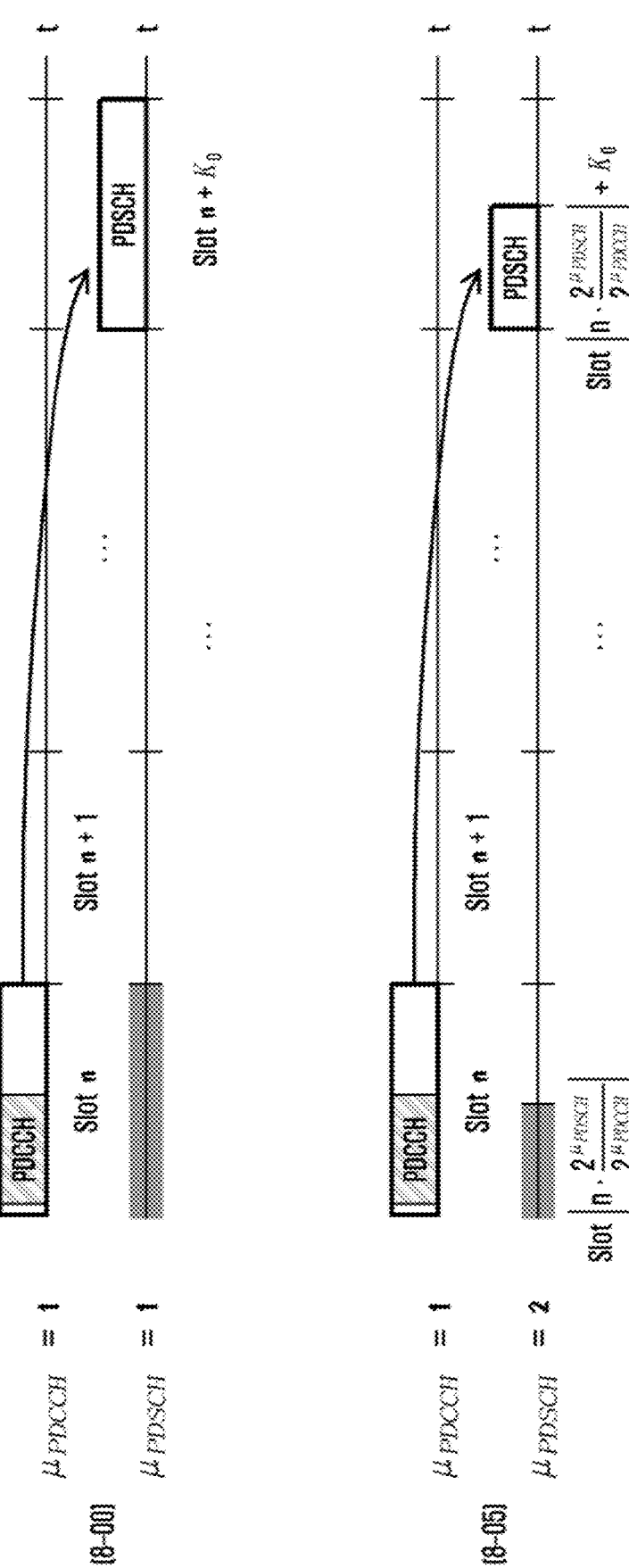
FIG. 8 is a diagram illustrating an example of time axis resource allocation according to subcarrier spacing of a data channel and a control channel in a wireless communication system according to an embodiment of the disclosure.

FIG. 8 is a diagram illustrating an example of time axis resource allocation according to subcarrier spacing of a data channel and a control channel in a wireless communication system according to an embodiment of the disclosure.

With reference to FIG. 8, in case that subcarrier spacings of the data channel and the control channel are the same (8-00, μPDSCH=μPDCCH), slot numbers for the data channel and the control channel are the same; thus, the base station and the UE may identify scheduling offset according to predetermined slot offset K0. However, in case that subcarrier spacings of the data channel and the control channel are different (8-05, μPDSCH≠μPDCCH), because slot numbers for the data channel and the control channel are different, the base station and the UE may identify scheduling offset according to predetermined slot offset K0 based on the subcarrier spacing of the PDCCH.

In FIG. 8, an offset analysis method for a case in which subcarrier spacing between the data channel and the control channel is the same or different has been described, but the above method is not limited thereto, and similarly, it may be applied to even a case in which subcarrier spacing of different channels or reference signals is the same or different such as a case in which subcarrier spacing between the CSI-RS and the control channel or subcarrier spacing between the SRS and the control channel is different.

In NR, various types of DCI formats as illustrated in Table 9 are provided according to the purpose for efficient control channel reception of the UE.

For example, the base station may use a DCI format 0_0 or a DCI format 0_1 so as to schedule a PDSCH to one cell.

The DCI format 0_1 includes at least the following information in case of being transmitted together with a CRC scrambled by a cell radio network temporary identity (C-RNTI), configured scheduling RNTI (CS-RNTI), or new-RNTI:

Identifier for DCI formats (1 bits): Always configure a DCI format indicator to 1

Frequency domain resource assignment bits or (NRBG bits or $$\lceil \log_2(N_{RB}^{DI,BWP}(\bar{N}_{RB}^{DL,BWP} + 1)/2) \rceil$$

bits): Indicates frequency domain resource assignment. In case that a DCI format 1_0 is monitored in the UE specific search space, $$N_{RB}^{DL,BWP}$$

is the size of the active DL BWP, and otherwise, $$N_{RB}^{DL,BWP}$$

is the size of the initial DL BWP. NRBG is the number of resource block groups. A detailed method thereof refers to the frequency domain resource assignment.

Time domain resource assignment (0~4 bits): indicates time axis resource assignment according to the above description.

VRB-to-PRB mapping (1 bit): in case that VRB-to-PRB mapping is 0, VRB-to-PRB mapping indicates non-interleaved VRP-to-PRB mapping, and in case that VRB-to-PRB mapping is 1, VRB-to-PRB mapping indicates interleaved VRP-to-PRB mapping.

Modulation and coding scheme (5 bits): indicates the modulation order and coding rate used for PDSCH transmission.

New data indicator (1 bit): indicates whether the PDSCH is initial transmission or retransmission according to whether toggle.

Redundancy version (2 bits): indicates the redundancy version used for PDSCH transmission.

HARQ process number (4 bits): indicates the HARQ process number used for PDSCH transmission.

Downlink assignment index (2 bits): DAI indicator

TPC command for scheduled PUCCH (2 bits): PUCCH power control indicator

PUCCH resource indicator (3 bits): It is a PUCCH resource indicator and indicates one of eight resources configured by a higher layer.

PDSCH-to-HARQ_feedback timing indicator (3 bits): It is a HARQ feedback timing indicator and indicates one of eight feedback timing offsets configured by an upper layer.

The DCI Format 1_1 includes at least the following information in case of being transmitted together with CRC scrambled by a cell radio network temporary identifier (C-RNTI), configured scheduling RNTI (CS-RNTI), or new-RNTI:

Identifier for DCI formats (1 bit): Always configure to 1 by a DCI format indicator Carrier indicator (0 or 3 bits): indicates the CC (or cell) to which the PDSCH allocated by the corresponding DCI is transmitted.

Bandwidth part indicator (0 or 1 or 2 bits): indicates the BWP in which the PDSCH allocated by the corresponding DCI is transmitted.

Frequency domain resource assignment (determine a payload according to the frequency domain resource assignment): indicates frequency domain resource assignment, and $$N_{RB}^{DL,BWP}$$

is the size of the active DL BWP. A detailed method thereof refers to the frequency domain resource assignment.

Time domain resource assignment (0~4 bits): indicates time axis resource assignment according to the above description VRB-to-PRB mapping (0 or 1 bit): in case that VRB-to-PRB mapping is 0, VRB-to-PRB mapping indicates non-interleaved VRB-to-PRB mapping, and in case that VRB-to-PRB mapping is 1, VRB-to-PRB mapping indicates interleaved VRP-to-PRB mapping. In case that frequency domain resource assignment is configured to a resource type 0, VRB-to-PRB mapping is 0 bit.

PRB bundling size indicator (0 or 1 bit): in case that the upper layer parameter prb-BundlingType is not configured or is configured to 'static', it is 0 bit, and in case that the upper layer parameter prb-BundlingType is configured to 'dynamic', it is 1 bit.

Rate matching indicator (0 or 1 or 2 bits): indicates the rate matching pattern.

ZP CSI-RS trigger (0 or 1 or 2 bits): an indicator that triggers aperiodic ZP CSI-RS.

For transport block 1:

Modulation and coding scheme (5 bits): indicates the modulation order and coding rate used for PDSCH transmission.

New data indicator (1 bit): indicates whether the PDSCH is initial transmission or retransmission according to whether toggle.

Redundancy version (2 bits): indicates the redundancy version used for PDSCH transmission.

For transport block 2:

Modulation and coding scheme (5 bits): indicates the modulation order and coding rate used for PDSCH transmission.

New data indicator (1 bit): indicates whether the PDSCH is initial transmission or retransmission according to whether toggle.

Redundancy version (2 bits): indicates the redundancy version used for PDSCH transmission.

HARQ process number (4 bits): indicates the HARQ process number used for PDSCH transmission.

Downlink assignment index (0 or 2 or 4 bits): DAI (Downlink assignment index) indicator TPC command for scheduled PUCCH (2 bits): PUCCH power control indicator PUCCH resource indicator (3 bits): It is a PUCCH resource indicator, and indicates one of eight resources configured by a higher layer.

PDSCH-to-HARQ_feedback timing indicator (3 bits): It is a HARQ feedback timing indicator, and indicates one of eight feedback timing offsets configured by a higher layer.

Antenna port (4 or 5 or 6 bits): indicates DMRS port and CDM group without data.

Transmission configuration indication (0 or 3 bits): TCI indicator.

SRS request (2 or 3 bits): SRS transmission request indicator

CBG transmission information (0 or 2 or 4 or 6 or 8 bits): an indicator indicating whether to transmit code block groups in the allocated PDSCH. 0 means that the CBG is not transmitted, and 1 means that the CBG is transmitted.

CBG flushing out information (0 or 1 bit): An indicator indicating whether previous CBGs are contaminated. If CBG flushing out information is 0, it means that previous CBGs may be contaminated, and if CBG flushing out information is 1, it means that CBG flushing out information may be used upon receiving retransmission (combinable).

DMRS sequence initialization (0 or 1 bit): DMRS scrambling ID selection indicator The maximum number of DCIs of different sizes that the UE may receive per slot in the corresponding cell is 4. The maximum number of DCIs of different sizes scrambled with C-RNTIs that the UE may receive per slot in the corresponding cell is 3.

Here, the antenna port indication may be indicated through the following [Table 13] to [Table 16].

TABLE 13

| Antenna port(s) (1000 + DMRS port), dmrs-Type = 1, maxLength = 1 One Codeword: Codeword 0 enabled, Codeword 1 disabled | | |
| --- | --- | --- |
| Value | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 14

| Antenna port(s) (1000 + DMRS part), dmrs-Type = 1, maxLength = 2 | | | | | | | |
|---|---|---|---|---|---|---|---|
| One Codeword: Codeword 0 enabled, Codeword 1 disabled | | | | Two Codewords: Codeword 0 enabled, Codeword 1 enabled | | | |
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 5 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | Reserved | Reserved | Reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 15

| Antenna port(s) (1000 + DMRS port), dmrs-Type = 2, maxLength = 1 | | | | | |
|---|---|---|---|---|---|
| One codeword: Codeword 0 enabled, Codeword 1 disabled | | | Two codewords: Codeword 0 enabled, Codeword 1 enabled | | |
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |

TABLE 15-continued

| Antenna port(s) (1000 + DMRS port), dmrs-Type = 2, maxLength = 1 | | | | | |
|---|---|---|---|---|---|
| One codeword: Codeword 0 enabled, Codeword 1 disabled | | | Two codewords: Codeword 0 enabled, Codeword 1 enabled | | |
| Value | Number of DMRS CDM group(s) without data | DMRS port(s) | Value | Number of DMRS CDM group(s) without data | DMRS port(s) |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

TABLE 16

| Antenna port(s) (1000 + DMRS port), dmrs-Type = 2, maxLength = 2 | | | | | | | |
| One codeword: Codeword 0 enabled, Codeword 1 disabled | | | | Two Codewords: Codeword 0 enabled, Codeword 1 enabled | | | |
| Value | Number of DMRS CDM group(s) without data | DMRS port(s) | Number of front-load symbols | Value | Number of DMRS CDM group(s) without data | DMRS port(s) | Number of front-load symbols |
|---|---|---|---|---|---|---|---|
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 5 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

It is preferable that [Table 16-1] and [Table 16-2] are understood to be connected to each other.

[Table 13] is a table used in case that a dmrs-type is indicated to 1 and that a maxLength is indicated to 1, and [Table 14] is a table used in case that a dmrs-Type is indicated to 1 and that a maxLength is indicated to 2. In case that a dmrs-type=2, maxLength=1, a port of a DMRS used based on [Table 15] is indicated, and in case that a drms-type is 2 and a maxLength is 2, a port of a DMRS used based on [Table 16-1] and [Table 16-2] is indicated.

In the table, numbers 1, 2, and 3 indicated by number of DMRS CDM group(s) without data mean CDM groups {0}, {0, 1}, and {0, 1, 2}, respectively. The DMRS port(s) is (are) formed by arranging the index of a use port in order. An antenna port is indicated by DMRS port+1000. The CDM group of the DMRS is connected to a method of generating a DMRS sequence and the antenna port, as illustrated in Tables 17 and 18. [Table 17] is a parameter in case of using dmrs-type=1, and [Table 18] is a parameter in case of using dmrs-type=2.

TABLE 17

| Parameters for PDSCH DM-RS dmrs-type = 1 | | | | | | |
|---|---|---|---|---|---|---|
| | CDM group | | $w_f(k')$ | | $w_t(l')$ | |
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 18

| Parameters for PDSCH DM-RS dmrs-type = 2 | | | | | | |
|---|---|---|---|---|---|---|
| | CDM group | | $w_f(k')$ | | $w_t(l')$ | |
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

The sequence of the DMRS according to each parameter is determined by Equation 2:

$$a_{k,l}^{(p,\mu)} = \beta_{PDSCH}^{DMRS} w_f(k') w_t(l') r(2n + k') \qquad \text{[Equation 2]}$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

FIG. 9 is a diagram illustrating wireless protocol structures of a base station and a UE upon performing single cell, carrier aggregation, and dual connectivity according to an embodiment of the disclosure.

With reference to FIG. 9, a wireless protocol of a next generation mobile communication system is configured with NR service data adaptation protocols (SDAP) 9-25 and 9-70, NR packet data convergence protocols (PDCP) 9-30 and 9-65, NR radio link controls (RLC) 9-35 and 9-60, and NR medium access controls (MAC) 9-40 and 9-55 in the UE and the base station, respectively.

Main functions of the NR SDAPs 9-25 and 9-70 may include some of the following functions.

Transfer of user plane data
Mapping between a QoS flow and a DRB for both DL and UL
Marking QoS flow ID in both DL and UL packets
Reflective QoS flow to DRB mapping for the UL SDAP PDUs.

With respect to the SDAP layer device, the UE may receive a configuration on whether to use a header of the SDAP layer device or whether to use a function of the SDAP layer device for each PDCP layer device, for each bearer, or for each logical channel with an RRC message. In case that the SDAP header is configured, the base station may instruct the UE to update or reconfigure uplink and downlink QoS flow and mapping information on data bearer with a NAS QoS reflection configuration 1-bit indicator (NAS reflective QoS) and an AS QoS reflection configuration 1-bit indicator (AS reflective QoS) of the SDAP header. The SDAP header may include QoS flow ID information indicating QoS. The QoS information may be used as a data processing priority and scheduling information for supporting smooth services.

Main functions of the NR PDCPs 9-30 and 9-65 may include some of the following functions.

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink.

In the above description, reordering of the NR PDCP device refers to reordering PDCP PDUs received from a lower layer in order based on a PDCP sequence number (SN), and reordering may include a function of delivering data to higher layers in the reordered order, a function of delivering directly data without considering the order, a function of reordering PDCP PDUs in order and recording lost PDCP PDUs, a function of transmitting a state report of the lost PDCP PDUs to the transmitting side, and a function of requesting retransmission of lost PDCP PDUs.

Main functions of the NR RLCs 9-35 and 9-60 may include some of the following functions.

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment In the above description, in-sequence delivery of the NR RLC device refers to a function of delivering RLC SDUs received from a lower layer to an upper layer in order, and in case that one RLC SDU is originally divided into several RLC SDUs and received, the in-sequence delivery may include a function of reassembling and delivering the received RLC PDUs, a function of reordering the received RLC PDUs based on an RLC sequence number (SN) or a PDCP sequence number (SN), a function of reordering the order of the received RLC PDUs to record the lost RLC PDUs, a function of performing a state report of the lost RLC PDUs to the transmitting side, and a function of requesting retransmission of the lost RLC PDUs, and in case that there is a lost RLC SDU, the in-sequence delivery may include a function of delivering only RLC SDUs before the lost RLC SDU to a higher layer in order, even if there is a lost RLC SDU, if a predetermined timer has expired, the in-sequence delivery may include a function of delivering all RLC SDUs received before the timer starts to an upper layer in order, or even if there is a lost RLC SDU, if a predetermined timer has expired, the in-sequence delivery may include a function of delivering all RLC SDUs received so far to a higher layer in order. Further, in the above description, the RLC PDUs may be processed in order in which they are received (in order of arrival regardless of serial number and sequence number) and transferred to the PDCP device out-of sequence delivery, and in case that the received RLC PDU is a segment, segments stored in the buffer or to be received later may be received, reconfigured into one complete RLC PDU, processed and transferred to the PDCP device. The NR RLC layer may not include a concatenation function, and the function may be performed in the NR MAC layer or may be replaced with a multiplexing function of the NR MAC layer.

In the above description, out-of-sequence delivery of the NR RLC device refers to a function of directly delivering RLC SDUs received from a lower layer to a higher layer regardless of order, and in case that one RLC SDU is originally divided into several RLC SDUs and received, the out-of-sequence delivery may include a function of reassembling and delivering several RLC SDUs, and a function of storing the RLC SN or PDCP SN of the received RLC PDUs and recording the lost RLC PDUs by aligning the order.

The NR MACs 9-40 and 9-55 may be connected to several NR RLC layer devices configured in one UE, and the main function of the NR MAC may include some of the following functions.

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

MBMS service identification

Transport format selection

Padding

The NR PHY layers 9-45 and 9-50 may perform an action of channel-coding and modulating upper layer data, making the upper layer data into an OFDM symbol, and transmitting the OFDM symbol with a radio channel, or demodulating and channel-decoding the OFDM symbol received through a radio channel and delivering the OFDM symbol to a higher layer.

A detailed structure of the radio protocol structure may be variously changed according to a carrier (or cell) operating method. For example, in case that the base station transmits data to the UE based on a single carrier (or cell), the base station and the UE use a protocol structure having a single structure for each layer, as in 9-00. However, in case that the base station transmits data to the UE based on carrier aggregation (CA) using multiple carriers in a single TRP, the base station and the UE have a single structure up to RLC as in 9-10, but use a protocol structure that multiplexes the PHY layer through the MAC layer. As another example, in case that the base station transmits data to the UE based on dual connectivity (DC) using multiple carriers in multiple TRP, the base station and the UE have a single structure up to RLC as in 9-20, but use a protocol structure that multiplexes a PHY layer through the MAC layer.

In LTE and NR, in a state connected to the serving base station, the UE has a procedure of reporting a capability supported by the UE to the corresponding base station. In the following description, this is referred to as a UE capability (reporting). The base station may transmit a UE capability enquiry message for requesting capability report to the UE in the connected state. The message may include a UE capability request for each RAT type of the base station. The request for each RAT type may include frequency band information for requesting a capability of the UE. Further, the UE capability enquiry message may request a plurality of RAT types in one RRC message container, or the base station may include a UE capability enquiry message including a request for each RAT type a plurality of times and deliver it to the UE. That is, the UE capability inquiry may be repeated a plurality of times, and the UE may configure a corresponding UE capability information message and report it a plurality of times. In the next-generation mobile communication system, a UE capability request for MR-DC including NR, LTE, and EN-DC may be performed. For reference, the UE capability inquiry message is generally sent initially after the UE establishes a connection, but it may be requested by the base station under any conditions when necessary.

In the above step, the UE that has received a UE capability report request from the base station configures a UE capability according to the RAT type and band information requested from the base station. Hereinafter, a method for the UE to configure UE capability in the NR system is summarized.

1. When the UE receives a list of LTE and/or NR bands as a UE capability request from the base station, the UE configures a band combination (BC) for EN-DC and NR stand alone (SA). That is, the UE configures a BC candidate list for EN-DC and NR SA based on the bands requested to the base station with FreqBandList. Further, a priority of the band has a priority in order described in Freqbandlist.

2. In case that the base station requests a UE capability report by setting the "eutra-nr-only" flag or the "eutra" flag, the UE completely removes NR SA BCs from the candidate list of the configured BCs. Such an operation may occur only when an LTE base station (eNB) requests "eutra" capability.

3. Thereafter, the UE removes fallback BCs from the candidate list of BCs configured in the above step. Here, the fallback BC corresponds to a case that a band corresponding to at least one SCell is removed from a certain super set BC, and because the super set BC may already cover the fallback BC, it may be omitted. This step is also applied to multi-RAT dual connectivity (MR-DC), i.e., it is also applied to LTE bands. BCs remaining after this step are the final "candidate BC list".

4. The UE selects BCs that match the requested RAT type from the final "candidate BC list" and selects BCs to report. In this step, the UE configures a supportedBandCombinationList in a predetermined order. That is, the UE configures the BC and UE capability to be reported according to the preconfigured rat-Type order (nr→eutra-nr→eutra). Further, the UE configures featureSetCombination for the configured supportedBandCombinationList, and configures a list of "candidate feature set combination" from the candidate BC list in which the list for fallback BC (including capability of the same or lower level) is removed. The above "candidate feature set combination" includes all feature set combinations for NR and EUTRA-NR BC, and may be obtained from the feature set combination of UE-NR-Capabilities and UE-MRDC-Capabilities containers.

5. Further, if the requested rat type is eutra-nr and affects, featureSetCombinations is included in both containers of UE-MRDC-Capabilities and UE-NR-Capabilities. However, the feature set of NR includes only UE-NR-Capabilities.

After a UE capability is configured, the UE transmits a UE capability information message including the UE capability to the base station. The base station then performs scheduling and transmission and reception management appropriate for the corresponding UE based on the UE capability received from the UE.

NR supports a channel state information reference signal (CSI-RS) as a reference signal for channel state report of the UE, and each CSI-RS resource configuration configured by a higher layer may include at least the following detailed configuration information. However, it is not limited to the following examples.

NZP-CSI-RS-Resource ConfigID: ID of the corresponding CSI-RS resource configurations NrofPorts: The number of CSI-RS ports included in the CSI-RS resource CSI-RS-timeConfig: Transmission period and slot offset of the CSI-RS resource CSI-RS-ResourceMapping: OFDM symbol position in the slot of the CSI-RS resource and subcarrier position in the PRB CSI-RS-Density: frequency density of the CSI-RS.

CDMType: CDM length and CDM RE pattern of the CSI-RS.

CSI-RS-FreqBand: Transmission bandwidth and start position of the CSI-RS

Pc: ratio between PDSCH (physical downlink shared channel) EPRE (Energy Per RE) and NZP CSI-RS EPRE Pc-SS: ratio between SS/PBCH block EPRE and NZP CSI-RS EPRE CSI-RS-ResourceRep: It is interworked between NZP CSI-RS resources belonging to one resource set. In case that CSI-RS-ResourceRep is 'ON', the UE applies the same spatial domain transmission filter to all NZP CSI-RS resources belonging to the resource set (i.e., the UE may assume that the base station used the same transmission beam. Hereinafter, a transmission beam may mean a directional transmission signal, which may be used interchangeably with application of a spatial domain transmission filter), and it can be seen that each NZP CSI-RS resource has the same CSI-RS port number and periodicity. In case that CSI-RS-ResourceRep is 'OFF', the UE may not assume that the same spatial domain transmission filter is applied to all NZP CSI-RS resources belonging to the resource set (i.e., the UE may not assume that the base station used the same transmission beam), and the UE may not assume that each NZP CSI-RS resource has the same CSI-RS port number and periodicity.

According to some embodiments, in NR, the number of CSI-RS ports of one of $\{1, 2, 4, 8, 12, 16, 24, 32\}$ may be configured to one CSI-RS resource, and NR supports different degrees of freedom according to the number of CSI-RS ports configured to the CSI-RS resource. Table 19 represents the CSI-RS density, the CDM length and type, the frequency axis and time axis start position $(\bar{k}, \bar{l})$ of the CSI-RS component RE pattern, and the frequency axis RE number (k') and the time axis RE number (l') of the CSI-RS component RE pattern configurable according to the number (X) of NR CSI-RS ports.

According to some embodiments, the CSI-RS component RE pattern is a basic unit constituting the CSI-RS resource, and may be constituted with the total YZ number of REs with the (Y=1+max(k')) number of REs adjacent on the frequency axis and the (Z=1+max(l')) number of REs adjacent on the time axis. With reference to Table 19, NR supports different degrees of freedom in configuring the frequency axis according to the number of CSI-RS ports configured to the CSI-RS resource.

The UE may receive an indication of the CSI-RS RE position by CSI-RS-ResourceMapping configured by a higher layer. In case that the CSI-RS is 1 port, the CSI-RS may be configured without subcarrier restrictions in the PRB, and the UE may receive an indication of a CSI-RS RE position by a 12-bit bitmap. In case that $\{2, 4, 8, 12, 16, 24, 32\}$ port and Y=2, the CSI-RS may be configured for every two subcarriers in the PRB, and the UE may receive an indication of a CSI-RS RE location by a 6-bit bitmap. In case that 4 ports and Y=4, the CSI-RS may be configured for every four subcarriers in the PRB, and the UE may receive an indication of a CSI-RS RE position by a 3-bit bitmap. Similarly, in case of the time axis RE position, the UE may receive an indication of the CSI-RS by a bitmap of total 14 bits. In this case, it is possible to change the length of the bitmap, as in the frequency position indication according to the Z value of Table 19 (CSI-RS locations within a slot), but the principle thereof is similar to the above description; thus, a detailed description thereof will be omitted.

TABLE 19

| Row | Ports $s^X$ | Density $y^\rho$ | Ccdm-Type | $(\bar{k}, \bar{l})$ | CDM group index j | k' | l' |
|---|---|---|---|---|---|---|---|
| 1 | 1 | 3 | No CDM | $(k_0, l_0), (k_0 + 4, l_0), (k0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0), (k_0 + 2, l_0)$ | 0, 1 | 0, 1 | 0 |
| 5 | 4 | 1 | FD-CDM2 | $(k_0, l_0), (k_0, l_0 + 1)$ | 0, 1 | 0, 1 | 0 |
| 6 | 8 | 1 | FD-CDM2 | $(k_0, l_0), (k_1, l_0), (k_2, l_0), (k_3, l_0)$ | 0, 1, 2, 3 | 0, 1 | 0 |
| 7 | 8 | 1 | FD-CDM2 | $(k_0, l_0), (k_1, l_0), (k_0, l_0 + 1), (k_1, l_0 +1)$ | 0, 1, 2, 3 | 0, 1 | 0 |
| 8 | 8 | 1 | CDM4 (FD2, TD2) | $(k_0, l_0), (k_1, l_0)$ | 0, 1 | 0, 1 | 0, 1 |
| 9 | 12 | 1 | FD-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | CDM4 (FD2, TD2) | $(k_0, l_0), (k_1, l_0), (k_2, l_0)$ | 0, 1, 2 | 0, 1 | 0, 1 |
| 11 | 16 | 1, 0.5 | FD-CDM2 | $(k_0, l_0), (k_1, l_0), (k_2, l_0), (k_3, l_0),$ $(k_0, l_0 + 1), (k_1, l_0 + 1), (k_2, l_0 + 1), (k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0), (k_1, l_0), (k_2, l_0), (k_3, l_0)$ | 0, 1, 2, 3 | 0, 1 | 0, 1 |

TABLE 19-continued

| Row | Ports $s^X$ | Density $y^\rho$ | Ccdm-Type | $(\bar{k}, \bar{l})$ | CDM group index j | k' | l' |
|---|---|---|---|---|---|---|---|
| 13 | 24 | 1, 0.5 | FD-CDM2 | $(k_0, l_0), (k_1, l_0), (k_2, l_0), (k_0, l_0 + 1), (k_1, l_0 + 1), (k_2, l_0 + 1),$ <br> $(k_0, l_1), (k_1, l_1), (k_2, l_1), (k_0, l_1 + 1), (k_1, l_1 + 1), (k_2, l_1 + 1)$ | 0, 1, 2, 3, 4, 5, <br> 6, 7, 8, 9, 10, 11 | 0, 1 | 0 |
| 14 | 24 | 1, 0.5 | CDM4 (FD2, TD2) | $(k_0, l_0), (k_1, l_0), (k_2, l_0), (k_0, l_1), (k_1, l_1), (k_2, l_1)$ | 0, 1, 2, 3, 4, 5 | 0, 1 | 0, 1 |
| 15 | 24 | 1, 0.5 | CDM8 (FD2, TD4) | $(k_0, l_0), (k_1, l_0), (k_2, l_0),$ | 0, 1, 2 | 0, 1 | 0, 1, 2, 3 |
| 16 | 32 | 1, 0.5 | FD-CDM2 | $(k_0, l_0), (k_1, l_0), (k_2, l_0), (k_3, l_0),$ <br> $(k_0, l_0 + 1), (k_1, l_0 + 1), (k_2, l_0 + 1), (k_3, l_0 + 1),$ <br> $(k_0, l_1), (k_1, l_1), (k_2, l_1), (k_3, l_1),$ <br> $(k_0, l_1 + 1), (k_1, l_1 + 1), (k_2, l_1 + 1), (k_3, l_1 + 1)$ | 0, 1, 2, 3, <br> 4, 5, 6, 7, <br> 8, 9, 10, 11, <br> 12, 13, 14, 15 | | |
| 17 | 32 | 1, 0.5 | CDM4 (FD2, TD2) | $(k_0, l_0), (k_1, l_0), (k_2, l_0), (k_3, l_0), (k_0, l_1), (k_1, l_1),$ <br> $(k_2, l_1), (k_3, l_1)$ | 0, 1, 2, 3, 4, 5, 6, 7 | 0, 1 | 0, 1 |
| 18 | 32 | 1, 0.5 | CDM8 (FD2, TD4) | $(k_0, l_0), (k_1, l_0), (k_2, l_0), (k_3, l_0)$ | 0, 1, 2, 3 | 0, 1 | 0, 1, 2, 3 |

As described above, in NR, in order to provide other functions such as rate matching or time/frequency tracking in addition to CSI measurement, the base station may configure a CSI-RS to the UE. In case that reporting setting is configured to CSI-RSs configured for functions other than the CSI-RS measurement, there may be side effects that UE power is consumed for unnecessary CSI generation or uplink resources are wasted for unnecessary CSI reporting.

Hereinafter, a method of measuring and reporting a channel state in a 5G communication system will be described in detail.

Channel state information (CSI) may include channel-quality information (CQI), a precoding matrix indicator (PMI), a CSI-RS resource indicator (CRI), an SS/PBCH block resource indicator (SSBRI), a layer indicator (LI), a rank indicator (RI), and/or L1-reference signal received power (RSRP). The base station may control the time and frequency resources for the above-mentioned CSI measurement and reporting of the UE.

For the above-described CSI measurement and reporting, the UE may receive a configuration of setting information (CSI-ReportConfig) for the N (≥1) number of CSI reporting, setting information (CSI-ResourceConfig) on the M (≥1) number of RS transmission resources, and one or two trigger state (CSI-AperiodicTriggerStateList, CSI-SemiPersisten-tOnPUSCH-TriggerStateList) list information through higher layer signaling.

The configuration information for the above-described CSI measurement and reporting may be more specifically described in Tables 20 to 26 as follows.

TABLE 20

CSI-ReportConfig

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.
    CSI-ReportConfig information element
    -- ASN1START
    -- TAG-CSI-REPORTCONFIG-START
    CSI-ReportConfig ::= SEQUENCE {
    reportConfigId   CSI-ReportConfigId,
    carrier ServCellIndex OPTIONAL,   -- Need S
    resourcesForChannelMeasurement   CSI-ResourceConfigId,
    csi-IM-ResourcesForInterference   CSI-ResourceConfigId   OPTIONAL,   --
Need R
    nzp-CSI-RS-ResourcesForInterference CSI-ResourceConfigId OPTIONAL, --
Need R
    reportConfigType CHOICE {
    periodic SEQUENCE {
    reportSlotConfig CSI-ReportPeriodicityAndOffset,
    pucch-CSI-ResourceList   SEQUENCE   (SIZE   (1..maxNrofBWPs))   OF
PUCCH-CSI-Resource
    },
    semiPersistentOnPUCCH   SEQUENCE {
    reportSlotConfig CSI-ReportPeriodicityAndOffset,
    pucch-CSI-ResourceList   SEQUENCE   (SIZE   (1..maxNrofBWPs))   OF
PUCCH-CSI-Resource
    },
    semiPersistentOnPUSCH   SEQUENCE {
    reportSlotConfig ENUMERATED {sl5, sl10, sl20, sl40, sl80, sl160, sl320},
    reportSlotOffsetList SEQUENCE (SIZE (1.. maxNrofUL-Allocations)) OF
INTEGER(0..32),
    p0alpha P0-PUSCH-AlphaSetId
    }, TABLE 20-continued

| CSI-ReportConfig |
|---|

```
aperiodic SEQUENCE {
reportSlotOffsetList SEQUENCE (SIZE (1..maxNrofUL-Allocations)) OF
INTEGER(0..32)
}
},
reportQuantity   CHOICE {
none NULL,
cri-RI-PMI-CQI NULL,
cri-RI-i1 NULL,
cri-RI-i1-CQI SEQUENCE {
pdsch-BundleSizeForCSI      ENUMERATED      {n2,    n4)
OPTIONAL -- Need S
},
cri-RI-CQI NULL,
cri-RSRP NULL,
ssb-Index-RSRP NULL,
cri-RI-LI-PMI-CQI NULL
},
reportFreqConfiguration SEQUENCE {
cqi-FormatIndicator   ENUMERATED {   widebandCQI,   subbandCQI   }
OPTIONAL,   -- Need R
   pmi-FormatIndicator   ENUMERATED {   widebandPMI,   subbandPMI   }
OPTIONAL,   -- Need R
   csi-ReportingBand CHOICE {
   subbands3 BIT STRING(SIZE(3)),
   subbands4 BIT STRING(SIZE(4)),
   subbands5 BIT STRING(SIZE(5)),
   subbands6 BIT STRING(SIZE(6)),
   subbands7 BIT STRING(SIZE(7)),
   subbands8 BIT STRING(SIZE(8)),
   subbands9 BIT STRING(SIZE(9)),
   subbands10 BIT STRING(SIZE(10)),
   subbands11 BIT STRING(SIZE(11)),
   subbands12 BIT STRING(SIZE(12)),
   subbands13 BIT STRING(SIZE(13)),
   subbands14 BIT STRING(SIZE(14)),
   subbands15 BIT STRING(SIZE(15)),
   subbands16 BIT STRING(SIZE(16)),
   subbands17 BIT STRING(SIZE(17)),
   subbands18 BIT STRING(SIZE(18)),
   ...,
   subbands 19-v1530 BIT STRING(SIZE(19))
   } OPTIONAL -- Need S
   } OPTIONAL,   -- Need R
   timeRestrictionForChannelMeasurements   ENUMERATED   {configured,
notConfigured},
   timeRestrictionForInterferenceMeasurements ENUMERATED {configured,
notConfigured},
   codebookConfig CodebookConfig OPTIONAL, -- Need R
   dummy ENUMERATED {n1, n2} OPTIONAL, -- Need R
   groupBasedBeamReporting CHOICE {
   enabled NULL,
   disabled SEQUENCE {
   nrofReportedRS ENUMERATED {n1, n2, n3, n4} OPTIONAL -- Need S
   }
   },
   cqi-Table ENUMERATED {table1, table2, table3, spare1} OPTIONAL, --
Need R
   subbandSize ENUMERATED {value1, value2},
   non-PMI-PortIndication                SEQUENCE               (SIZE
(1..maxNrofNZP-CSI-RS-ResourcesPerConfig)) OF PortIndexFor8Ranks OPTIONAL,   --
Need R
   ...,
   [[
semiPersistentOnPUSCH-v1530 SEQUENCE {
reportSlotConfig-v1530 ENUMERATED {sl4, sl8, sl16}
} OPTIONAL -- Need R
]]
}
CSI-ReportPeriodicityAndOffset ::= CHOICE {
slots4 INTEGER(0..3),
slots5 INTEGER(0..4),
slots8 INTEGER(0..7),
slots10 INTEGER(0..9),
slots16 INTEGER(0..15),
slots20 INTEGER(0..19),
slots40 INTEGER(0..39),
slots80 INTEGER(0..79),
```

TABLE 20-continued

| CSI-ReportConfig |
| --- |
| slots160 INTEGER(0..159), |
| slots320 INTEGER(0..319) |
| } |
| PUCCH-CSI-Resource ::= SEQUENCE { |
| uplinkBandwidthPartId     BWP-Id, |
| pucch-Resource PUCCH-ResourceId |
| } |
| PortIndexFor8Ranks ::= CHOICE { |
| portIndex8    SEQUENCE{ |
| rank1-8    PortIndex8    OPTIONAL, -- Need R |
| rank2-8 SEQUENCE(SIZE(2)) OF PortIndex8 OPTIONAL, -- Need R |
| rank3-8 SEQUENCE(SIZE(3)) OF PortIndex8 OPTIONAL, -- Need R |
| rank4-8 SEQUENCE(SIZE(4)) OF PortIndex8 OPTIONAL, -- Need R |
| rank5-8 SEQUENCE(SIZE(5)) OF PortIndex8 OPTIONAL, -- Need R |
| rank6-8 SEQUENCE(SIZE(6)) OF PortIndex8 OPTIONAL, -- Need R |
| rank7-8 SEQUENCE(SIZE(7)) OF PortIndex8 OPTIONAL, -- Need R |
| rank8-8 SEQUENCE(SIZE(8)) OF PortIndex8 OPTIONAL    -- Need R |
| }, |
| portIndex4 SEQUENCE{ |
| rank1-4 PortIndex4 OPTIONAL, -- Need R |
| rank2-4 SEQUENCE(SIZE(2)) OF PortIndex4 OPTIONAL, -- Need R |
| rank3-4 SEQUENCE(SIZE(3)) OF PortIndex4 OPTIONAL, -- Need R |
| rank4-4 SEQUENCE(SIZE(4)) OF PortIndex4 OPTIONAL    -- Need R |
| }, |
| portIndex2 SEQUENCE{ |
| rank1-2 PortIndex2 OPTIONAL, -- Need R |
| rank2-2    SEQUENCE(SIZE(2)) OF PortIndex2 OPTIONAL -- Need R |
| }, |
| portindex1 NULL |
| } |
| Portindex8::= INTEGER (0..7) |
| PortIndex4::= INTEGER (0..3) |
| PortIndex2::= INTEGER (0..1) |
| -- TAG-CSI-REPORTCONFIG-STOP |
| -- ASN1STOP |

| CSI-ReportConfig field descriptions |
| --- |
| carrier |
| Indicates in which serving cell the CSI-ResourceConfig indicated below are to be |
| found. If the field is absent, the resources are on the same serving cell as this |
| report configuration. |
| codebookConfig |
| Codebook configuration for Type-1 or Type-II including codebook subset |
| restriction. |
| cqi-FormatIndicator |
| Indicates whether the UE shall report a single (wideband) or multiple (subband) |
| CQI. (see TS 38.214 [19], clause 5.2.1.4). |
| cqi-Table |
| Which CQI table to use for CQI calculation (see TS 38.214 [19] clause 5.2.2.1). |
| csi-IM-ResourcesForInterference |
| CSI IM resources for interference measurement. csi-ResourceConfigId of a CSI- |
| ResourceConfig included in the configuration of the serving cell indicated with the |
| field "carrier" above. The CSI-ResourceConfig indicated here contains only CSI- |
| IM resources. The bwp-Id in that CSI-ResourceConfig is the same value as the |
| bwp-Id in the CSI-ResourceConfig indicated by |
| resourcesForChannelMeasurement. |
| csi-ReportingBand |
| Indicates a contiguous or non-contiguous subset of subbands in the bandwidth |
| part which CSI shall be reported for. Each bit in the bit-string represents one |
| subband. The right-most bit in the bit string represents the lowest subband in the |
| BWP. The choice determines the number of subbands (subbands3 for 3 |
| subbands, subbands4 for 4 subbands, and so on) (see TS 38.214 [19], clause |
| 5.2.1.4). This field is absent if there are less than 24 PRBs (no sub band) and |
| present otherwise, the number of sub bands can be from 3 (24 PRBs, sub band |
| size 8) to 18 (72 PRBs, sub band size 4). |
| dummy |
| This field is not used in the specification. If received it shall be ignored by the UE. |
| groupBasedBeamReporting |
| Turning on/off group beam based reporting (see TS 38.214 [19], clause 5.2.1.4) |
| non-PMI-PortIndication |

-continued

| CSI-ReportConfig field descriptions |
| --- |

Port indication for RI/CQI calculation. For each CSI-RS resource in the linked
ResourceConfig for channel measurement, a port indication for each rank R,
indicating which R ports to use. Applicable only for non-PMI feedback (see TS
38.214 [19], clause 5.2.1.4.2).
The first entry in non-PMI-PortIndication corresponds to the NZP-CSI-RS-
Resource indicated by the first entry in nzp-CSI-RS-Resources in the NZP-CSI-
RS-ResourceSet indicated in the first entry of nzp-CSI-RS-ResourceSetList of the
CSI-ResourceConfig whose CSI-ResourceConfigId is indicated in a CSI-MeasId
together with the above CSI-ReportConfigId; the second entry in non-PMI-
PortIndication corresponds to the NZP-CSI-RS-Resource indicated by the second
entry in nzp-CSI-RS-Resources in the NZP-CSI-RS-ResourceSet indicated in the
first entry of nzp-CSI-RS-ResourceSetList of the same CSI-ResourceConfig, and
so on until the NZP-CSI-RS-Resource indicated by the last entry in nzp-CSI-RS-
Resources in the in the NZP-CSI-RS-ResourceSet indicated in the first entry of
nzp-CSI-RS-ResourceSetList of the same CSI-ResourceConfig. Then the next
entry corresponds to the NZP-CSI-RS-Resource indicated by the first entry in
nzp-CSI-RS-Resources in the NZP-CSI-RS-ResourceSet indicated in the second
entry of nzp-CSI-RS-ResourceSetList of the same CSI-ResourceConfig and so
on.
nrofReportedRS
The number (N) of measured RS resources to be reported per report setting in a
non-group-based report. N <= N_max, where N_max is either 2 or 4 depending
on UE capability.
(see TS 38.214 [19], clause 5.2.14) When the field is absent the UE applies the
value 1
nzp-CSI-RS-ResourcesForInterference
NZP CSI RS resources for interference measurement. csi-ResourceConfigId of a
CSI-ResourceConfig included in the configuration of the serving cell indicated with
the field "carrier" above. The CSI-ResourceConfig indicated here contains only
NZP-CSI-RS resources. The bwp-Id in that CSI-ResourceConfig is the same
value as the bwp-Id in the CSI-ResourceConfig indicated by
resourcesForChannelMeasurement.
p0alpha
Index of the p0-alpha set determining the power control for this CSI report
transmission (see TS 38.214 [ 19], clause 6.2.1.2).
pdsch-BundleSizeForCSI
PRB bundling size to assume for CQI calculation when reportQuantity is
CRI/RI/i1/CQI. If the field is absent, the UE assumes that no PRB bundling is
applied (see TS 38.214 [19], clause 5.2.1.4.2).
pmi-FormatIndicator
Indicates whether the UE shall report a single (wideband) or multiple (subband)
PMI (see TS 38.214 [19], clause 5.2.1.4).
pucch-CSI-ResourceList
Indicates which PUCCH resource to use for reporting on PUCCH.
reportConfigType
Time domain behavior of reporting configuration
reportFreqConfiguration
Reporting configuration in the frequency domain (see TS 38.214 [19] clause
5.2.1.4).
reportQuantity
The CSI related quantities to report. Corresponds to L1 parameter
'ReportQuantity' (see TS 38.214 [19], clause 5.2.1).
reportSlotConfig
Periodicity and slot offset (see TS 38.14 [19], clause 5.2.1.4) .
reportSlotConfig-v1530
Extended value range for reportSlotConfig for semi-persistent CSI on PUSCH. If
the field is present, the UE shall ignore the value provided in the legacy field
(semiPersistentOnPUSCH.reportSlotConfiq).
reportSlotOffsetList
Timing offset Y for semi persistent reporting using PUSCH. This field lists the
allowed offset values. This list must have the same number of entries as the
pusch-TimeDomainAllocationList in PUSCH-Config. A particular value is indicated
in DCI. The network indicates in the DCI field of the UL grant, which of the
configured report slot offsets the UE shall apply. The DCI value 0 corresponds to
the first report slot offset in this list, the DCI value 1 corresponds to the second
report slot offset in this list, and so on. The first report is transmitted in slot n + Y,
second report in n + Y + P, where P is the configured periodicity.
Timing offset Y for aperiodic reporting using PUSCH. This field lists the allowed
offset values. This list must have the same number of entries as the pusch-
TimeDomainAllocationList in PUSCH-Config. A particular value is indicated in
DCI. The network indicates in the DCI field of the UL grant, which of the
configured report slot offsets the UE shall apply. The DCI value 0 corresponds to
the first report slot offset in this list, the DCI value 1 corresponds to the second
report slot offset in this list, and so on (see TS 38.214 [19] clause 5.2.3).
resourcesForChannelMeasurement -continued

| CSI-ReportConfig field descriptions |
| --- |
| Resources for channel measurement. csi-ResourceConfigId of a CSI-ResourceConfig included in the configuration of the serving cell indicated with the field "carrier" above The CSI-ResourceConfig indicated here contains only NZP. CSI-RS resources and/or SSB resources. This CSI-ReportConfig is associated with the DL BWP indicated by bwp-Id in that CSI-ResourceConfig. subbandSize Indicates one out of two possible BWP-dependent values for the subband size as indicated in TS 38.214 [19], table 5.2.1.4-2 . If csi-ReportingBand is absent, the UE shall ignore this field. timeRestrictionForChannelMeasurements Time domain measurement restriction for the channel (signal) measurements (see TS 38.214 [19], clause 5.2.1.1) timeRestrictionForInterferenceMeasurements Time domain measurement restriction for interference measurements (see TS 38.214 [19], clause 5.2.1.1) |

TABLE 21

| CSI-ResourceConfig |
| --- |
| The IE CSI-ResourceConfig defines a group of one or more NZP-CSI-RS-ResourceSet, CSI-IM-ResourceSet and/or CSI-SSB-ResourceSet. CSI-ResourceConfig information element -- ASN1START -- TAG-CSI-RESOURCECONFIG-START CSI-ResourceConfig ::= SEQUENCE { csi-ResourceConfigId   CSI-ResourceConfigId, csi-RS-ResourceSetList CHOICE { nzp-CSI-RS-SSB SEQUENCE { nzp-CSI-RS-ResourceSetList   SEQUENCE   (SIZE   (1..maxNrofNZP-CSI-RS-ResourceSetsPerConfig)) OF NZP-CSI-RS-ResourceSetId OPTIONAL, -- Need R csi-SSB-ResourceSetList      SEQUENCE   (SIZE (1..maxNrofCSI-SSB-ResourceSetsPerConfig)) OF CSI-SSB-ResourceSetId OPTIONAL   -- Need R }, csi-IM-ResourceSetList   SEQUENCE   (SIZE   (1..maxNrofCSI-IM-ResourceSetsPerConfig)) OF CSI-IM-ResourceSetId }, bwp-Id BWP-Id, resourceType ENUMERATED { aperiodic, semiPersistent, periodic }, ... } -- TAG-CSI-RESOURCECONFIG-STOP -- ASN1STOP |

45

| CSI-ResourceConfig field descriptions |
| --- |
| bwp-Id The DL BWP which the CSI-RS associated with this CSI-ResourceConfig are located in (see TS 38.214 [19], clause 5.2.1.2 csi-ResourceConfigId Used in CSI-ReportConfig to refer to an instance of CSI-ResourceConfiq csi-RS-ResourceSetList Contains up to maxNrofNZP-CSI-RS-ResourceSetsPerConfig resource sets if ResourceConfigType is 'aperiodic' and 1 otherwise (see TS 38.214 [19], clause 5.2.1.2) csi-SSB-ResourceSetList List of SSB resources used for beam measurement and reporting in a resource set (see TS 38.214 [19], section FFS_Section) resourceType Time domain behavior of resource configuration (see TS 38.214 [19], clause 5.21.2). It does not apply to resources provided in the csi-SSB-ResourceSetList. |

TABLE 22

| NZP-CSI-RS-ResourceSet |
| --- |

The IE NZP-CSI-RS-ResourceSet is a set of Non-Zero-Power (NZP) CSI-RS resources (their IDs) and set-specific parameters.
  NZP-CSI-RS-ResourceSet information element
  -- ASN1START
  -- TAG-NZP-CSI-RS-RESOURCESET-START
  NZP-CSI-RS-ResourceSet ::= SEQUENCE {
  nzp-CSI-ResourceSetId NZP-CSI-RS-ResourceSetId,
    nzp-CSI-RS-Resources  SEQUENCE  (SIZE  (1..maxNrofNZP-CSI-RS-ResourcesPerSet)) OF NZP-CSI-RS-ResourceId,
    repetition  ENUMERATED { on, off } OPTIONAL, -- Need S
    aperiodicTriggeringOffset  INTEGER(0..6)  OPTIONAL, -- Need S
    trs-Info ENUMERATED {true} OPTIONAL, --Need R
    ...
  }
  -- TAG-NZP-CSI-RS-RESOURCESET-STOP
  -- ASN1STOP

| NZP-CSI-RS-ResourceSet field descriptions |
| --- | aperiodicTriggeringOffset
Offset X between the slot containing the DCI that triggers a set of aperiodic NZP CSI-RS resources and the slot in which the CSI-RS resource set is transmitted. The value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. When the field is absent the UE applies the value 0.
nzp-CSI-RS-Resources
NZP-CSI-RS-Resources associated with this NZP-CSI-RS resource set (see TS 38.214 [19], clause 5.2). For CSI, there are at most 8 NZP CSI RS resources per resource set
repetition
Indicates whether repetition is on/off. If the field is set to 'OFF' or if the field is absent, the UE may not assume that the NZP-CSI-RS resources within the resource set are transmitted with the same downlink spatial domain transmission filter and with same NrofPorts in every symbol (see TS 38.214 [19], clauses 5.2.2.3.1 and 5.1.6.1.2). Can only be configured for CSI-RS resource sets which are associated with CSI-ReportConfig with report of L1 RSRP or "no report"
trs-Info
Indicates that the antenna port for all NZP-CSI-RS resources in the CSI-RS resource set is same. If the field is absent or released the UE applies the value "false" (see TS 38.214 [19], clause 5.2.2.3.1).

TABLE 23

| CSI-SSB-ResourceSet |
| --- |

The IE CSI-SSB-ResourceSet is used to configure one SS/PBCH block resource set which refers to SS/PBCH as indicated in ServingCellConfigCommon.
  CSI-SSB-ResourceSet information element
  -- ASN1START
  -- TAG-CSI-SSB-RESOURCESET-START
CSI-SSB-ResourceSet ::= SEQUENCE {
csi- SSB-ResourceSetId  CSI-SSB-ResourceSetId,
csi-SSB-ResourceList    SEQUENCE    (SIZE(1..maxNrofCSI-SSB-ResourcePerSet)) OF SSB-Index,
  ...
  }
  -- TAG-CSI-SSB-RESOURCESET-STOP
  -- ASN1STOP

TABLE 24

| CSI-IM-ResourceSet |
| --- |

The IE CSI-IM-ResourceSet is used to configure a set of one or more CSI Interference Management (IM) resources (their IDs) and set-specific parameters.
  CSI-IM-ResourceSet information element
  -- ASN1START
  -- TAG-CSI-IM-RESOURCESET-START

TABLE 24-continued

| CSI-IM-ResourceSet |
| --- |

CSI-IM-ResourceSet = SEQUENCE {
  csi-IM-ResourceSetId CSI-IM-ResourceSetId,
  csi-IM-Resources SEQUENCE (SIZE(1..maxNrofCSI-IM-ResourcesPerSet)) OF CSI-IM-ResourceId,
  ...
  }

TABLE 24-continued

| CSI-IM-ResourceSet |
| --- |

| -- TAG-CSI-IM-RESOURCESET-STOP |
| -- ASN1STOP | 5 |

| CSI-IM-ResourceSet field descriptions |
| --- |
| 10 | csi-IM-Resources
CSI-IM-Resources associated with this CSI-IM-ResourceSet
(see TS 38.214 [19], clause 5.2)

TABLE 25

| CSI-AperiodicTriggerStateList |
| --- |

The CSI-AperiodicTriggerStateList IE is used to configure the UE with a list
of aperiodic trigger states. Each codepoint of the DCI field "CSI request" is associated with one
trigger state. Upon reception of the value associated with a trigger state, the UE will perform
measurement of CSI-RS (reference signals) and aperiodic reporting on L1 according to all
entries in the associatedReportConfigInfoList for that trigger state.
    CSI-AperiodicTriggerStateList information element
    -- ASN1START
    -- TAG-CSI-APERIODICTRIGGERSTATELIST-START
    CSI-AperiodicTriggerStateList ::=   SEQUENCE (SIZE (1..maxNrOfCSI-
AperiodicTriggers)) OF CSI-AperiodicTriggerState
    CSI-AperiodicTriggerState ::= SEQUENCE {
    associatedReportConfigInfoList                                        SEQUENCE
(SIZE(1..maxNrofReportConfigPerAperiodicTrigger)) OF CSI-AssociatedReportConfigInfo,
    ...
    }
    CSI-AssociatedReportConfigInfo ::= SEQUENCE {
    reportConfigId CSI-ReportConfigId,
    resourcesForChannel CHOICE {
    nzp-CSI-RS   SEQUENCE {
    resourceSet INTEGER (1..maxNrofNZP-CSI-RS-ResourceSetsPerConfig),
    qcl-info   SEQUENCE   (SIZE(1..maxNrofAP-CSI-RS-ResourcesPerSet))   OF
TCI-StateId OPTIONAL -- Cond Aperiodic
    },
    csi-SSB-ResourceSet                          INTEGER                          (1..maxNrofCSI-SSB-
ResourceSetsPerConfig)
    },
    csi-IM-ResourcesForInterference                                          INTEGER(1..maxNrofCSI-IM-
ResourceSetsPerConfig) OPTIONAL, -- Cond CSI-IM-ForInterference
    nzp-CSI-RS-ResourcesForInterference INTEGER (1..maxNrofNZP-CSI-RS-
ResourceSetsPerConfig) OPTIONAL, -- Cond NZP-CSI-RS-ForInterference
    ...
    }
    -- TAG-CSI-APERIODICTRIGGERSTATELIST-STOP
    -- ASN1STOP

| CSI-AssociatedReportConfigInfo field descriptions |
| --- | csi-IM-ResourcesForInterference
CSI-IM-ResourceSetfor interference measurement. Entry number in csi-IM-
ResourceSetList in the CSI-ResourceConfig indicated by csi-IM-
ResourcesForInterference in the CSI-ReportConfig indicated by reportConfigId
above (1 corresponds to the first entry, 2 to the second entry, and so on). The
indicated CSI-IM-ResourceSet should have exactly the same number of
resources like the NZP-CSI-RS-ResourceSet indicated in nzp-CSI-RS-
ResourcesforChannel.
csi-SSB-ResourceSet
CSI-SSB-ResourceSet for channel measurements. Entry number in csi-SSB-
ResourceSetList in the CSI-ResourceConfig indicated by
resourcesForChannelMeasurement in the CSI-ReportConfig indicated by
reportConfigId above (1 corresponds to the first entry, 2 to the second entry, and
so on).
nzp-CSI-RS-ResoureesForInterference
NZP-CSI-RS-ResourceSet for interference measurement. Entry number in nzp-
CSI-RS-ResourceSetList in the CSI-ResourceConfig indicated by nzp-CSI-RS- CSI-AssociatedReportConfigInfo field descriptions ResourcesForInterference in the CSI-ReportConfig indicated by reportConfigId above (1 corresponds to the first entry, 2 to the second entry, and so on).
qcl-info
List of references to TCI-States for providing the QCL source and QCL type for each NZP-CSI-RS-Resource listed in nzp-CSI-RS-Resources of the NZP-CSI-RS-ResourceSet indicated by nzp-CSI-RS-ResourcesforChannel. Each TCI-StateId refers to theTCI-State which has this value for tci-StateId and is defined in tci-StatesToAddModList in the PDSCH-Config included in the BWP-Downlink corresponding to the serving cell and to the DL BWP to which the resourcesForChannelMeasurement (in the CSI-ReportConfig indicated by reportConfigId above) belong to. First entry in qcl-info-forChannel corresponds to first entry in nzp-CSI-RS-Resources of that NZP-CSI-RS-ResourceSet, second entry in qcl-info-forChannel corresponds to second entry in nzp-CSI-RS-Resources, and so on (see TS 38.214 [19], clause 5.2.1.5.1)
reportConfigId
The reportConfigId of one of the CSI-ReportConfigToAddMod configured in CSI-MeasConfig
resourceSet
NZP-CSI-RS-ResourceSet for channel measurements. Entry number in nzp-CSI-RS-ResourceSetList in the CSI-ResourceConfig indicated by resourcesForChannelMeasurement in the CSI-ReportConfig indicated by reportConfigId above (1 corresponds to the first entry, 2 to thesecond entry, and so on).

TABLE 26

CSI-SemiPersistentOnPUSCH-TriggerStateList

The CSI-SemiPersistentOnPUSCH-TriggerStateList IE is used to configure the UE with list of trigger states for semi-persistent reporting of channel state information on L1.
See also TS 38.214 [19], clause 5.2.
    CSI-Semi PersistentOnPUSCH-TriggerStateList information element
    -- ASN1START
    --TAG-CSI-SEMIPERSISTENTONPUSCHTRIGGERSTATELIST-START
    CSI-SemiPersistentOnPUSCH-TriggerStateList   ::=      SEQUENCE(SIZE
(1..maxNrOfSemiPersistentPUSCH-Triggers)) OF CSI-SemiPersistentOnPUSCH-TriggerState
    CSI-SemiPersistentOnPUSCH-TriggerState ::=      SEQUENCE {
    associatedReportConfigInfo                    CSI-ReportConfigId,
    ...
    }
    -- TAG-CSI-SEMIPERSISTENTONPUSCHTRIGGERSTATELIST-STOP
    -- ASN1STOP For the above-described CSI reporting setting (CSI-ReportConfig), each reporting setting CSI-ReportConfig may be associated with a CSI resource setting associated with the corresponding reporting setting and one downlink (DL) bandwidth part identified by a higher layer parameter bandwidth part identity (bwp-id) given by CSI-ResourceConfig.

| Conditional Presence | Explanation |
|---|---|
| Aperiodic | The field is mandatory present if the NZP-CSI-RS-Resources in the associated resourceSet have the resourceType aperiodic. The field is absent otherwise. |
| CSI-IM-ForInterference | This field is optional need M if the CSI-ReportConfig identified by reportConfigId is configured with csi-IM-ResourcesForInterference; otherwise it is absent. |
| NZP-CSI-RS- | This field is optional need M if the CSI-ReportConfig identified by reportConfigId is configured with nzp-CSI-RS-ResourceForInterference; otherwise it is absent. |

As a time domain report operation for each reporting setting CSI-ReportConfig, 'aperiodic', 'semi-persistent', and 'periodic' methods are supported, which may be configured from the base station to the UE by a reportConfig-Type parameter configured from the upper layer. The semi-persistent CSI report method supports 'PUCCH-based semi-persistent (semi-PersistentOnPUCCH)' and 'PUSCH-based semi-persistent (semi-PersistentOnPUSCH)'. In case of the periodic or semi-persistent CSI report method, the UE may receive a configuration of a PUCCH or PUSCH resource for transmitting CSI from the base station through higher layer signaling. A period and slot offset of a PUCCH or PUSCH resource to transmit CSI may be given based on numerology of an uplink (UL) bandwidth part configured to transmit a CSI report. In case of the aperiodic CSI report method, the UE may receive scheduling of a PUSCH resource for transmitting CSI from the base station through L1 signaling (DCI, e.g., DCI format 0_1 described above).

For the above-described CSI resource setting (CSI-ResourceConfig), each CSI resource setting CSI-ReportConfig may include the S (≥1) number of CSI resource sets (configured by the higher layer parameter csi-RS-ResourceSetList). The CSI resource set list may be configured with a non-zero power (NZP) CSI-RS resource set and an SS/PBCH block set or may be configured with a CSI-interference measurement (CSI-IM) resource set. Each CSI resource setting may be located in a downlink (DL) bandwidth part identified by a higher layer parameter bwp-id, and the CSI resource setting may be connected to CSI reporting setting of the same downlink bandwidth part. A time domain operation of the CSI-RS resource in the CSI resource setting may be configured to one of 'aperiodic', 'periodic' or 'semi-persistent' from a higher layer parameter resource-Type. For periodic or semi-persistent CSI resource setting, the number of CSI-RS resource sets may be limited to S=1, and the configured period and slot offset may be given based on the numerology of the downlink bandwidth part identified by bwp-id. The UE may receive a configuration of one or more CSI resource settings for channel or interference measurement from the base station through higher layer signaling, and include, for example, the following CSI resources.

CSI-IM resource for interference measurement

NZP CSI-RS resource for interference measurement

NZP CSI-RS resource for channel measurement

For CSI-RS resource sets associated with resource setting in which the upper layer parameter resourceType is configured to 'aperiodic', 'periodic', or 'semi-persistent', a trigger state of CSI reporting settings in which reportType is configured to 'aperiodic' and resource setting of a channel or interference measurement for one or a plurality of component cells (CC) may be configured to a higher layer parameter CSI-AperiodicTriggerStateList.

Aperiodic CSI reporting of the UE may be performed using a PUSCH, periodic CSI reporting may be performed using a PUCCH, and in case that semi-persistent CSI reporting is triggered by DCI or activated, after semi-persistent CSI reporting is activated with the PUSCH and MAC control element (MAC CE), the semi-persistent CSI reporting may be performed using the PUCCH. As described above, CSI resource setting may also be configured aperiodically, periodically, or semi-persistently. A combination between the CSI reporting setting and the CSI resource configuration may be supported based on Table 27.

scheduling information and CSI request indicator for the PUSCH. The CSI request indicator may be configured to NTS(=0, 1, 2, 3, 4, 5, or 6) bits, and the number of bits of the CSI request indicator may be determined by higher layer signaling (reportTriggerSize). One trigger state of one or a plurality of aperiodic CSI reporting trigger states that may be configured by higher layer signaling (CSI-AperiodicTriggerStateList) may be triggered by the CSI request indicator.

In case that all bits of the CSI request field are 0, it may mean that no CSI report is requested.

If the number (M) of CSI trigger states in the configured CSI-AperiodicTriggerStateLite is greater than 2NTs-1, the M number of CSI trigger states may be mapped to 2NTs-1 according to a predefined mapping relationship, and one trigger state of 2NTs-1 trigger states may be indicated by the CSI request field.

If the number (M) of CSI trigger states in the configured CSI-AperiodicTriggerStateLite is less than or equal to 2NTs-1, one of the M number of CSI trigger states may be indicated by the CSI request field.

Table 28 represents an example of a relationship between a CSI request indicator and a CSI trigger state that may be indicated by the indicator.

TABLE 28

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1 CSI report#2 | CSI report#1, CSI report#2 |
| 10 | CSI trigger state#2 | CSI report#3 | CSI report#3 |
| 11 | CSI trigger state#3 | CSI report#4 | CSI report#4 |

TABLE 5.2.1.4-1

Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/ activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1 |
| Semi-Persistent CSI-RS | Not Supported | For reporting on PUCCH, the UE receives an activation [10, TS 38.321]; for reporting on PUSCH, the UE receives triggering on DCI | Triggered by DCI; additionally, activation command [10, TS38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

The aperiodic CSI report may be triggered by the "CSI request" field of the aforementioned DCI format 0_1 corresponding to scheduling DCI for the PUSCH. The UE may monitor a PDCCH, acquire a DCI format 0_1, and acquire The UE may perform measurement on the CSI resource in the CSI trigger state triggered by the CSI request field, and generate CSI (including at least one of the above-mentioned CQI, PMI, CRI, SSBRI, L1, RI, or L1-RSRP) therefrom:

The UE may transmit the acquired CSI using a PUSCH scheduled by the corresponding DCI format 0_1. In case that 1 bit corresponding to an uplink data indicator (UL-SCH indicator) in the DCI format 0_1 indicates "1", the UE may multiplex and transmit uplink data (UL-SCH) and acquired CSI to PUSCH resources scheduled by the DCI format 0_1. In case that 1 bit corresponding to the uplink data indicator (UL-SCH indicator) in the DCI format 0_1 indicates "0", the UE may map and transmit only CSI without uplink data (UL-SCH) to the PUSCH resource scheduled by the DCI format 0_1.

When performing aperiodic CSI reporting, the UE may monitor the PDCCH to acquire a DCI format 0_1, and acquire scheduling information on the PUSCH and CSI request information therefrom. The UE may acquire resource information on a CSI-RS to be measured from the received CSI request indicator. The UE may determine whether to measure a CSI-RS resource transmitted at which time point based on a time point that receives the DCI format 0_1 and a CSI resource e set configuration (e.g., a parameter (the above-described aperiodicTriggeringOffset) for offset in the NZP CSI-RS resource set configuration (NZP-CSI-RS-ResourceSet)). More specifically, the UE may receive a configuration of an offset value X of the parameter aperiodicTriggeringOffset in the NZP-CSI-RS resource set configuration by higher layer signaling from the base station, and the configured offset value X may mean offset between a slot that receives DCI triggering aperiodic CSI reporting and a slot in which the CSI-RS resource is transmitted. For example, an aperiodicTriggeringOffset parameter value and an offset value X may have a mapping relationship described in Table 29.

TABLE 29

| aperiodic TriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

Figure 10:
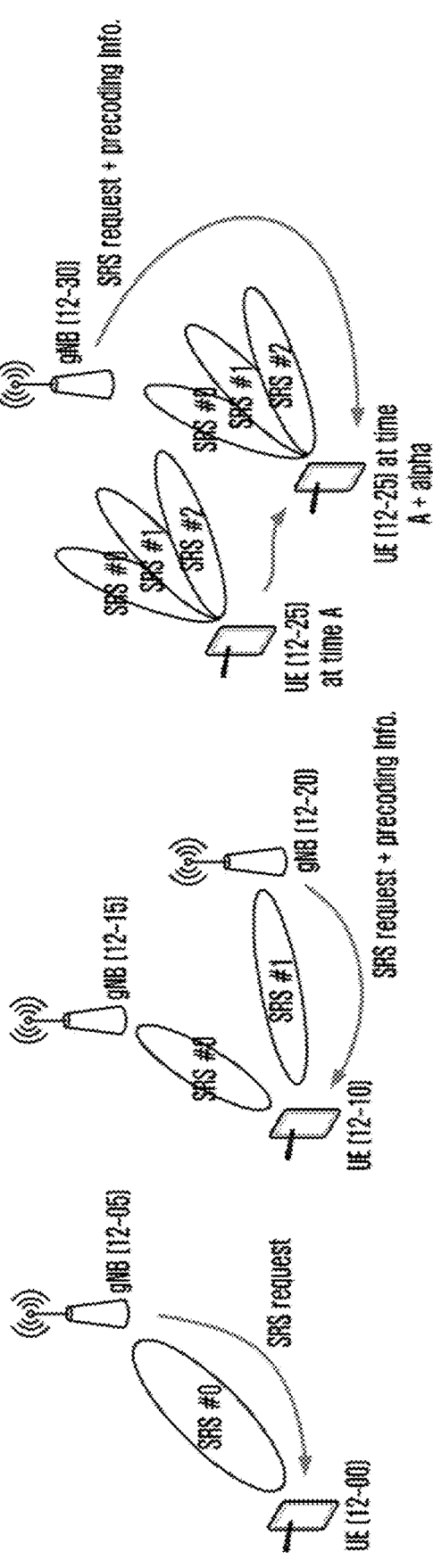
FIG. 10 is a diagram illustrating examples of various operating scenarios of an SRS according to an embodiment of the disclosure.

FIG. 10 is a diagram illustrating examples of various operating scenarios of an SRS according to an embodiment of the disclosure.

With reference to FIG. 10, an NR system may consider at least three SRS operating scenarios.

1) A base station 10-05 configures a beam of one direction to a UE 12-00 (in this specification, configuring a beam/precoding in one direction includes not applying the beam/precoding or applying a wide beam (cell-coverage or sector coverage)), and the UE 12-00 transmits an SRS according to a transmission period and offset of the SRS in case of periodic SRS or semi-persistent SRS, and according to an SRS request of the base station (at a predetermined time after the SRS request) in case of an aperiodic SRS. In this case, the SRSs do not need additional information for beam/precoding.

Figure 12:
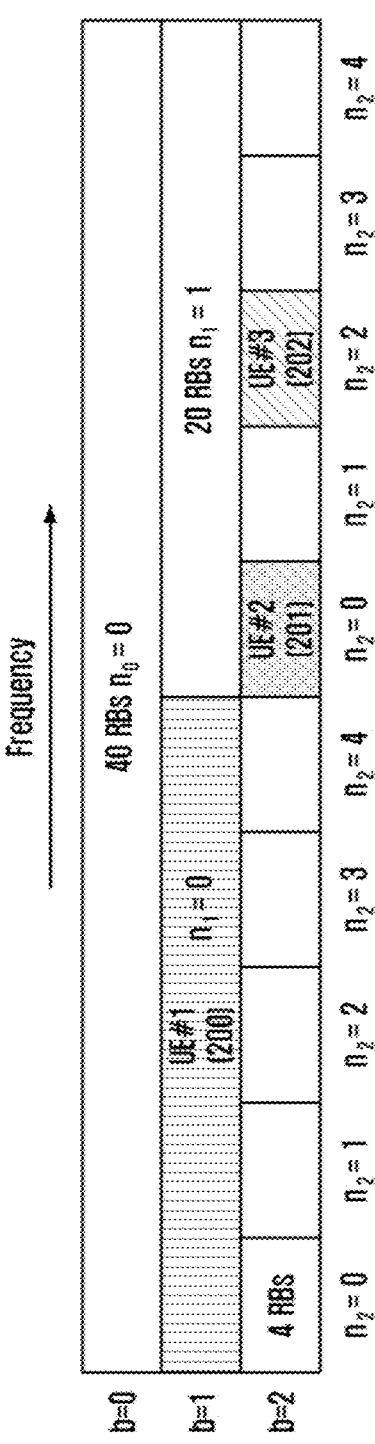
FIG. 12 is a diagram illustrating a structure in which an SRS is allocated for each subband according to an embodiment of the disclosure.

2) Base stations 10-15 and 10-20 may configure beams in one or more directions to a UE 10-10, and the UE 10-10 may transmit a plurality of SRSs beamformed in one or more directions. For example, as illustrated in FIG. 12, an SRS resource (or port) #0 may be configured to be beamformed to the base station 10-15, and an SRS resource (or port) #1 may be configured to be beamformed to the base station 10-20. In this case, the base stations 10-15 and 10-20 need to notify SRS beam/precoding information as well as SRS request, unlike the method 1).

3) A base station 10-30 may configure beams in one or more directions to a UE 10-25, and the UE 10-25 may transmit a plurality of SRSs beamformed in the one or more directions. For example, as illustrated in FIG. 12, by applying different beam/precoding to an SRS resource (or port) #0, SRS resource (or port) #1, and SRS resource (or port) #2, the base station may configure the UE to transmit an SRS. Thereby, even in case that the mobility of the UE is high, stable communication may be performed through beam/precoder diversity. For example, the UE 10-25 may provide channel state information to the base station 10-30 with an SRS #2 at a time point of a time A and provide channel state information to the base station 10-30 with an SRS #0 at a time point of a time A+Alpha. In this case, the base station 10-30 needs to notify not only SRS request but also SRS beam/precoding information, unlike the method 1).

The descriptions are performed based on SRS transmission, but may be similarly expanded to other UL channel or/and RS transmission, such as a PRACH, PUSCH, and PUCCH, and a detailed descriptions of all cases will be omitted not to obscure the gist of the disclosure.

Figure 11:
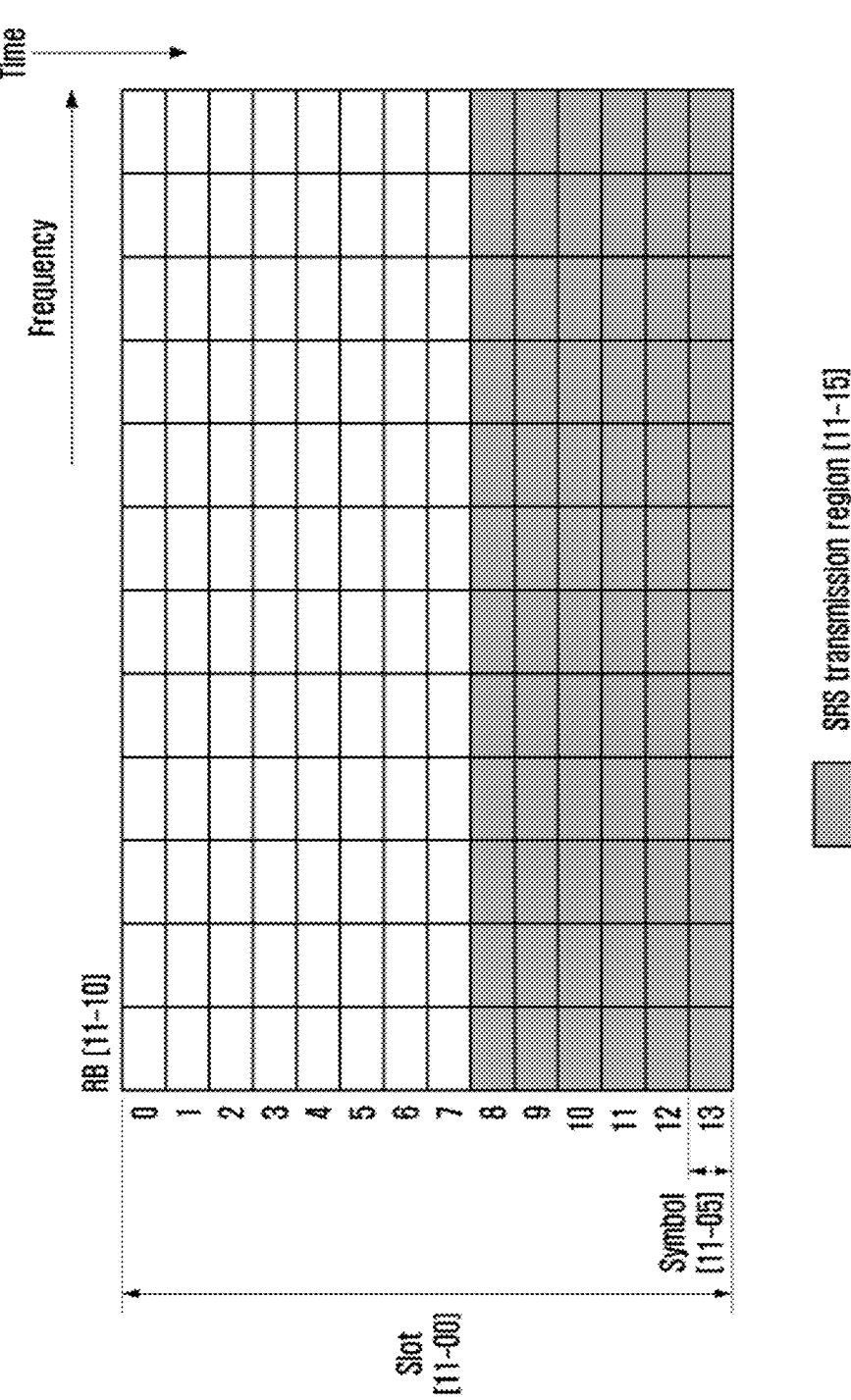
FIG. 11 is a diagram illustrating an uplink transmission structure of a 5G or NR system according to an embodiment of the disclosure.

FIG. 11 is a diagram illustrating an uplink transmission structure of a 5G or NR system according to an embodiment of the disclosure.

With reference to FIG. 11, a basic transmission unit of the 5G or NR system is a slot 11-00, and assuming a general cyclic prefix (CP) length, each slot may be configured with 14 symbols 11-05, and one symbol may correspond to one UL waveform (CP-OFDM or DFT-S-OFDM) symbol.

A resource block (RB) 11-10 is a resource allocation unit corresponding to one slot based on a time domain, and may be configured with 12 subcarriers based on a frequency domain.

An uplink structure may be largely divided into a data area and a control area. Unlike the LTE system, in the 5G or NR system, the control area may be configured and transmitted at an arbitrary location of the uplink. Here, the data area includes a series of communication resources including data such as a voice and packet transmitted to each UE, and corresponds to the remaining resources, except for the control area in a subframe. The control area includes a series of communication resources for a downlink channel quality report from each UE, reception ACK/NACK for a downlink signal, an uplink scheduling request, and the like.

The UE may simultaneously transmit control information and data thereof in the data area and the control area. A symbol in which the UE may periodically transmit an SRS in one slot may be last six symbol periods 11-15, and be transmitted through a preconfigured SRS transmission band within the UL BWP based on the frequency domain. However, this is an example, and a symbol capable of transmitting an SRS may be extended to another time interval within the slot (e.g., to configure some of all OFDM symbols in the slot to an SRS resource). RBs capable of transmitting an SRS may be transmitted in multiples of 4 RBs when being transmitted in the frequency domain and be transmitted in maximum 272 RBs.

Further, in the 5G or NR system, the number of symbols N of the SRS may be configured to 1, 2, or 4, and be transmitted in consecutive symbols. Further, the 5G or NR system allows repeated transmission of an SRS symbol. Specifically, a repetition factor r of the SRS symbol is $r \in \{1,2,4\}$, where it may be configured as in r. For example, in case that one SRS antenna is mapped to one symbol and the one symbol is transmitted, maximum 4 symbols may be repeatedly transmitted. Alternatively, four different symbols may be transmitted through four different antenna ports. In this case, because each antenna port is mapped to one symbol, repeated transmission of the SRS symbol is not allowed.

In case of LTE and NR, the SRS may be configured based on the following higher layer signaling information (or a subset thereof).

BandwidthConfig: Configure SRS bandwidth information. An accurate of each code point may vary according to an uplink system BW value.

SubframeConfig (or ConfigIndex): Configure the SRS transmission period and transmission offset values. According to whether it is FDD or TDD, an accurate value of each code point may vary.

ackNackSRS-SimultaneousTransmission: ACK/NACK—Notify whether SRSs are simultaneously transmitted.

MaxUpPts: Notify whether a frequency location of SRS transmission is initialized in UpPTS.

Hopping: It is 2-bit information and notifies whether SRS frequency hopping and hopping location and method.

Frequency domain position: Notify the frequency domain position of SRS transmission.

Duration: Notify whether a periodic SRS is transmitted.

Transmission comb: Notify a comb offset value upon transmitting an SRS.

Cyclic shift: Notify a cyclic shift value during SRS transmission.

Antenna port: Notify the number of SRS antenna ports used for SRS transmission. In case of LTE, 1, 2 or 4 ports may be supported.

An LTE-A system may support periodic and aperiodic SRS transmission based on the above-described configuration information. An NR system may use additional information such as activation/deactivation signaling for SRS resources in addition to the above-described configuration information, and support periodic, semi-persistent, and aperiodic SRS transmission. According to the SRS transmission type, for example, according to whether periodic, semi-persistent, or aperiodic SRS transmission, some of the configuration information may be omitted.

The SRS may be configured with a constant amplitude zero auto correlation (CAZAC) sequence. CAZAC sequences constituting each SRS transmitted from several UEs have different cyclic shift values. Further, CAZAC sequences generated through cyclic shift in one CAZAC sequence have a characteristic having a correlation value of zero with sequences having a cyclic shift value different from that of each CAZAC sequence. Using such a characteristic, SRSs simultaneously allocated to the same frequency domain may be classified according to a CAZAC sequence cyclic shift value configured for each SRS by the base station.

SRSs of several UEs may be classified according to frequency positions as well as cyclic shift values. The frequency position may be divided into SRS subband unit allocation or Comb. The 5G or NR system may support Comb2 and Comb4. In case of Comb2, one SRS may be allocated only to the even-numbered or odd-numbered subcarriers in the SRS subband. In this case, each of the even-numbered subcarriers and the odd-numbered subcarriers may constitute one Comb.

Each UE may receive allocation of an SRS subband based on a tree structure. The UE may perform hopping of the SRS allocated to each subband at each SRS transmission time point. Accordingly, all transmission antennas of the UE may transmit an SRS using the entire uplink data transmission bandwidth.

FIG. 12 is a diagram illustrating a structure in which an SRS is allocated for each subband according to an embodiment of the disclosure.

FIG. 12 illustrates an example in which the SRS is allocated to each UE by a tree structure configured by the base station when the SRS has a data transfer band corresponding to 40 RBs on a frequency.

In FIG. 12, when a level index of a tree structure is b, a highest level (b=0) of the tree structure may be configured with a SRS subband of 40 RB bandwidth. In a second level (b=1), two SRS subbands of 20 RB bandwidth may be generated in the SRS subband of a level (b=0). Therefore, two SRS subbands may exist in the entire data transfer band of a second level (b=1). In a third level (b=2), five 4 RB SRS subbands are generated in a 20 RB SRS subband at an immediate upper level (b=1), and there may be a structure with 10 4RB SRS subbands within one level.

A constitution of such a tree structure may have the number of various levels, SRS subband sizes, and the number of SRS subbands per level according to the configuration of the base station. Here, it may be defined that the number of SRS subbands in a level b generated in one SRS subband of a higher level is Nb and that indexes of the Nb number of SRS subbands are nb={0, . . . ,Nb−1}. As the subbands per level vary in this way, as illustrated in FIG. 12, a UE may be allocated to each subband per level. For example, a UE 1, 200 is allocated to a first SRS subband (n1=0) of two SRS subbands having 20 RB bandwidth at a level of b=1, and a UE 2, 201 and a UE 3, 202 may be allocated to positions of a first SRS subband (n2=0) and a third SRS subband (n2=2), respectively under a second SRS subband. Through these processes, the UE may simultaneously transmit SRSs through multiple component carriers (CCs) and simultaneously transmit SRSs in multiple SRS subbands within one CC.

Specifically, for the above-described SRS subband configuration, NR supports SRS bandwidth configurations, as illustrated in Table 30.

TABLE 30

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |

TABLE 30-continued

| C_{SRS} | B_{SRS} = 0 | | B_{SRS} = 1 | | B_{SRS} = 2 | | B_{SRS} = 3 | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |

TABLE 30-continued

| C_{SRS} | B_{SRS} = 0 | | B_{SRS} = 1 | | B_{SRS} = 2 | | B_{SRS} = 3 | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 29 | 120 | 1 | 24 | 5 | 12 | 2 | 4 | 3 |
| 30 | 128 | 1 | 64 | 2 | 32 | 2 | 4 | 8 |

Further, the NR supports SRS frequency hopping based on values of the Table 30, and a detailed procedure thereof follows Table 31.

TABLE 31

When SRS is transmitted on a given SRS resource, the sequence $r^{(p_i)}(n, l')$ for each OFDM symbol l' and for each of the antenna ports of the SRS resource shall be multiplied with the amplitude scaling factor $\beta_{SRS}$ in order to conform to the transmit power specified in [5, 38.213] and mapped in sequence starting with $r^{(p_i)}(0, l')$ to resource elements (k, l) in a slot for each of the antenna ports $p_i$ according to $$a^{(p_i)}_{K_{TC}k'+k_0^{(p_i)},l'+l_0} = \begin{cases} \dfrac{1}{\sqrt{N_{ap}}}\beta_{SRS}r^{(p_i)}(k',l') & k' = 0, 1, \ldots, M^{SRS}_{sc,b} - 1 \quad l' = 0, 1, \ldots, N^{SRS}_{symb} - 1 \\ 0 & \text{otherwise} \end{cases}$$

The length of the sounding reference signal sequence is given by
$$M_{sc,b}^{SRS} = m_{SRS,b}N_{sc}^{RB}/K_{TC}$$
where $m_{SRS,b}$ is given by a selected row of Table 6.4.1.4.3-1 with b = $B_{SRS}$ where $B_{SRS} \in \{0, 1, 2, 3\}$ is given by the field b-SRS contained in the higher-layer parameter freqHopping. The row of the table is selected according to the index $C_{SRS} \in \{0, 1, \ldots, 63\}$ given by the field c-SRS contained in the higher-layer parameter freqHopping. The frequency-domain starting position $k_0^{(p_i)}$ is defined by $$k_0^{(p_i)} = \bar{k}_0^{(p_i)} + \sum_{b=0}^{B_{SRS}} K_{TC}M_{sc,b}^{SRS}n_b$$

where $$\bar{k}_0^{(p_i)} = n_{shift}N_{sc}^{RB} + k_{TC}^{(p_i)}$$

$$k_{TC}^{(p_i)} = \begin{cases} (\bar{k}_{TC} + K_{TC}/2)\bmod K_{TC} & \text{if } n_{SRS}^{cs} \in \{n_{SRS}^{cs,max}/2, \ldots, n_{SRS}^{cs,max} - 1\} \text{ and } N_{sp}^{SRS} = 4 \text{ and } p_i \in \{1001, 1003\} \\ \bar{k}_{TC} & \text{otherwise} \end{cases}$$

If $N_{BWP}^{start} \le n_{shift}$ the reference point for $k_0^{(p_i)} = 0$ is subcarrier 0 in common resource block 0, otherwise the reference point is the lowest subcarrier of the BWP.
The frequency domain shift value $n_{shift}$ adjusts the SRS allocation with respect to the reference point grid and is contained in the higher-layer parameter freqDomainShift in the SRS-Config IE. The transmission comb offset $\bar{k}_{TC} \in \{0, 1, \ldots, K_{TC} - 1\}$ is contained in the higher-layer parameter transmissionComb in the SRS-Config IE and $n_b$ is a frequency position index.
Frequency hopping of the sounding reference signal is configured by the parameter $b_{hop} \in \{0, 1, 2, 3\}$, given by the field b-hop contained in the higher-layer parameter freqHopping.
If $b_{hop} \ge B_{SRS}$, frequency hopping is disabled and the frequency position index $n_b$ remains constant (unless re-configured) and is defined by
$$n_b = \lfloor 4n_{RRC}/m_{SRS,b} \rfloor \bmod N_b$$
for all $N_{symb}^{SRS}$ OFDM symbols of the SRS resource. The quantity $n_{RRC}$ is given by the higher-layer parameter freqDomainPosition and the values of $m_{SRS,b}$ and $N_b$ for b = $B_{SRS}$ are given by the selected row of Table 6.4.1.4.3-1 corresponding to the configured value of $C_{SRS}$.
If $b_{hop} < B_{SRS}$, frequency hopping is enabled and the frequency position indices $n_b$ are defined by $$n_b = \begin{cases} \lfloor 4n_{RRC}/m_{SRS,b} \rfloor \bmod N_b & b \le b_{hop} \\ \{F_b(n_{SRS}) + \lfloor 4n_{RRC}/m_{SRS,b} \rfloor\}\bmod N_b & \text{otherwise} \end{cases}$$

where $N_b$ is given by Table 6.4.1.4.3-1.

$$F_b(n_{SRS}) = \begin{cases} (N_b/2)\left\lfloor \dfrac{n_{SRS}\bmod \prod_{b'=b_{hop}}^{b} N_{b'}}{\prod_{b'=b_{hop}}^{b-1} N_{b'}} \right\rfloor + \left\lfloor \dfrac{n_{SRS}\bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2\rfloor\left\lfloor n_{SRS}/\prod_{b'=b_{hop}}^{b-1} N_{b'}\right\rfloor & \text{if } N_b \text{ odd} \end{cases}$$

TABLE 31-continued and where $N_{b_{hop}} = 1$ regardless of the value of $N_b$. The quantity $n_{SRS}$ counts the
number of SRS transmissions. For the case of an SRS resource configured as aperiodic
by the higher-layer parameter resourceType, it is given by $n_{SRS} = \lfloor l'/R \rfloor$ within the slot
in which the $N_{symb}^{SRS}$ symbol SRS resource is transmitted. The quantity $R \le N_{sym}^{SRS}$ is
the repetition factor given by the field repetitionFactor contained in the higher-layer
parameter resourceMapping.

As described above, the 5G or NR UE supports the SU-MIMO (single user) technique and has maximum four transmission antennas. Further, the NR UE may simultaneously transmit SRSs to multiple CCs, or multiple SRS subbands in CC. In case of the 5G or NR system, unlike the LTE system, various numerology is supported, and a plurality of SRS transmission symbols may be variously configured, and repeated transmission for SRS transmission through a repetition factor may be allowed.

Therefore, it is necessary to count SRS transmission considering this. Counting SRS transmission may be used in various ways. For example, counting SRS transmission may be used for supporting antenna switching according to SRS transmission. Specifically, at which SRS transmission time point and in which band the SRS corresponding to which antenna is transmitted may be determined by SRS transmission counting.

Hereinafter, a rate matching operation and a puncturing operation will be described in detail.

In case that a time and frequency resource A to transmit an arbitrary symbol sequence A overlaps an arbitrary time and frequency resource B, a rate matching or puncturing operation may be considered with transmission and reception operations of the channel A considering an area resource C in which the resource A and the resource B overlap. A specific operation thereof may follow the following contents.

Rate Matching Operation

The base station may map and transmit a channel A only to the remaining resource areas, except for a resource C corresponding to an area overlapped with a resource B among the entire resource A for transmitting a symbol sequence A to the UE. For example, in case that the symbol sequence A is configured with {symbol #1, symbol #2, symbol #3, symbol 4}, that the resource A is {resource #1, resource #2, resources #3, resource #4}, and that the resource B is {resource #3, resource #5}, the base station may sequentially map and transmit the symbol sequence A to {resource #1, resource #2, resource #4}, which are the remaining resources, except for {resource #3} corresponding to the resource C among resource A. As a result, the base station may map and transmit the symbol sequence {symbol #1, symbol #2, symbol #3} to {resources #1, resource #2, resource #4}, respectively.

The UE may determine the resource A and the resource B from scheduling information on the symbol sequence A from the base station, thereby determining the resource C, which is an area in which the resource A and the resource B overlap. The UE may receive the symbol sequence A, assuming that the symbol sequence A is mapped and transmitted in the remaining area, except for the resource C among the entire resources A. For example, in case that the symbol sequence A is configured with {symbol #1, symbol #2, symbol #3, symbol 4}, that the resource A is {resource #1, resource #2, resource #3, resource #4}, and that the resource B is {resource #3, resource #5}, the UE may assume that the symbol sequence A was sequentially mapped to the remaining resources {resource #1, resource #2, resource #4}, except for {resource #3} corresponding to the resource C among the resource A and receive the symbol sequence A. As a result, the UE may assume that the symbol sequence {symbol #1, symbol #2, symbol #3} is mapped and transmitted to {resource #1, resource #2, resource #4}, respectively and perform a subsequent series of reception operations.

Puncturing Operation

In case that there is a resource C corresponding to an area overlapping with the resource B among the entire resource A to transmit the symbol sequence A to the UE, the base station may map the symbol sequence A to the entire resource A, but may not perform transmission in the resource area corresponding to the resource C, and may transmit only the remaining resource areas, except for the resource C among the resource A. For example, in case that the symbol sequence A is configured with {symbol #1, symbol #2, symbol #3, symbol 4}, that the resource A is {resource #1, resource #2, resource #3, resource #4}, and that the resource B is {resource #3, resource #5}, the base station may map the symbol sequence A {symbol #1, symbol #2, symbol #3, symbol #4} to the resource A {resource #1, resource #2, resource #3, resource #4}, respectively, transmit only a symbol sequence {symbol #1, symbol #2, symbol #4} corresponding to the remaining resources {resource #1, resource #2, resource #4}, except for {resource #3} corresponding to the resource C among the resource A, and not transmit {symbol #3} mapped to {resource #3} corresponding to the resource C. As a result, the base station may map and transmit the symbol sequence {symbol #1, symbol #2, symbol #4} to {resources #1, resource #2, resource #4}, respectively.

The UE may determine the resource A and the resource B from scheduling information on the symbol sequence A from the base station, thereby determining the resource C, which is an area in which the resource A and the resource B overlap. The UE may receive the symbol sequence A, assuming that the symbol sequence A is mapped to the entire resource A and transmitted only in the remaining areas, except for the resource C among the resource area A. For example, in case that the symbol sequence A is configured with {symbol #1, symbol #2, symbol #3, symbol 4}, that the resource A is {resource #1, resource #2, resource #3, resource #4}, and that the resource B is {resource #3, resource #5}, the UE may assume that the symbol sequence A {symbol #1, symbol #2, symbol #3, symbol #4} is mapped to the resource A {resource #1, resource #2, resource #3, resource #4}, respectively, but that {symbol #3} mapped to the {resource #3} corresponding to the resource C is not transmitted, and the UE may assume that the symbol sequence {symbol #1, symbol #2, symbol #4} corresponding to {resource #1, resource #2, resource #4}, which are the remaining resources, except for {resource #3} corresponding to the resource C among the resource A was mapped and transmitted and receive the symbol sequence {symbol #1, symbol #2, symbol #4}. As a result, the UE may assume that the symbol sequence {symbol #1, symbol #2, symbol #4} was mapped and transmitted to {resource #1, resource #2, resource #4}, respectively, and perform a subsequent series of reception operations.

[Rate Matching Resource]

The base station may configure one or a plurality of rate matching resources to the UE through higher layer signaling (e.g., RRC signaling). Rate matching resource configuration information may include time axis resource allocation information, frequency axis resource allocation information, and period information. Hereinafter, a bitmap corresponding to the frequency domain resource allocation information is referred to as a "first bitmap", a bitmap corresponding to the time axis resource allocation information is referred to as a "second bitmap", and a bitmap corresponding to the period information is referred to as a "third bitmap". In case that all or part of the time and frequency resources of the scheduled data channel overlap the configured rate matching resource, the base station may rate-match and transmit the data channel in the rate matching resource part, and the UE may assume that the data channel is rate-matched in the rate matching resource part and perform reception and decoding.

The base station may dynamically notify the UE through DCI whether to rate-match a data channel in the configured rate matching resource part through an additional configuration (corresponding to the "rate matching indicator" in the above-described DCI format). Specifically, the base station may select some of the configured rate matching resources and group the selected rate matching resources into a rate matching resource group, and instruct the UE whether to rate-match a data channel for each rate matching resource group by DCI using a bitmap method. For example, in case that four rate matching resources RMR #1, RMR #2, RMR #3, and RMR #4 are configured, the base station may configure RMG #1={RMR #1, RMR #2} and RMG #2={RMR #3, RMR #4} as a rate matching group, and the base station may instruct to the UE with a bitmap whether to rate-match in RMG #1 and RMG #2, respectively, using 2 bits in the DCI field. For example, the base station may configure each bit to "1" in case that rate matching is to be performed, and "0" in case that rate matching is not to be performed.

The 5G system supports granularity of "RB symbol level" and "RE level" with a method of configuring the above-described rate matching resource to the UE. More specifically, the 5G system may follow the following configuration method.

RB Symbol Level

The UE may receive a configuration of maximum 4 RateMatchPatterns for each bandwidth part by upper layer signaling, and one RateMatchPattern may include the following contents.

As a reserved resource within the bandwidth part, a resource in which time and frequency resource areas of the corresponding reserved resource are configured may be included in a combination of an RB level bitmap and a symbol level bitmap on the frequency axis. The reserved resource may span one or two slots. A time domain pattern (periodicityAndPattern) in which the time and frequency domains configured with each RB level and symbol level bitmap pair are repeated may be additionally configured.

A time and frequency domain resource area configured with a control resource set in the bandwidth part and a resource area corresponding to a time domain pattern configured with a search space configuration in which the corresponding resource area is repeated may be included.

Re Level

The UE may receive a configuration of the following contents through higher layer signaling.

It may include an LTE-CRS-vshift(s) value (v-shift) and the number of ports (nrofCRS-Ports) of LTE CRS as configuration information (lte-CRS-ToMatchAround) on an RE corresponding to the LTE CRS (CELL-specific reference signal or common reference signal) pattern, center subcarrier position information (carrier-FreqDL) of the LTE carrier from a reference frequency point (e.g., reference point A), bandwidth size (carrierBandwidthDL) information of the LTE carrier, subframe configuration information (mbsfn-SubframConfigList) corresponding to a multicast-broadcast single-frequency network (MBSFN) and the like. The UE may determine a position of the CRS in an NR slot corresponding to the LTE subframe based on the above-described information.

It may include configuration information on resource sets corresponding to one or a plurality of zero power (ZEP) CSI-RS within the bandwidth part.

In 5G and subsequent communication systems, while a communication frequency band rises and antenna integration technology is mature compared to the conventional 4G system, there is an increasing possibility that four or more transmitting or receiving antennas will be mounted in the UE. This means that the number of OFDM symbols for SRS sounding may greatly increase when considering various SRS transmission methods in consideration of SRS coverage securement and UE complexity such as SRS antenna switching, frequency hopping, and repetition. For example, considering the simultaneous operation of SRS antenna switching for 8 ports and frequency hopping consisting of 4 subbands, the total 32=4×8 number of OFDM symbols will be needed for sounding for all channels.

Thereafter, various methods for SRS antenna switching are provided through specific embodiments.

[First Embodiment] UE Capability Signaling

<Method 1> New Signaling:

Method 1 is a method in which a UE supporting antenna switching proposed in the disclosure transmits, to a base station, an available antenna switching structure and at least one of channel, band, or FR pair information that may use the corresponding structure using new UE capability signaling. The base station that has received the corresponding information from the UE may transmit antenna switching SRS resource configuration information to the UE based on the received information.

<Method 2> Existing Signaling+New Signaling Overwrite:

Method 2 is a method in which a UE supporting antenna switching proposed in the disclosure transmits, to the base station, an available antenna switching structure and at least one of channel, band, or FR pair information that may use the corresponding structure using both the existing UE capability signaling and new UE capability signaling. According to the method 2, the UE may first transmit information through the existing UE capability signaling, and then update the information by a method of overwriting all or part of the information transmitted through the existing UE capability signaling through new UE capability signaling. The base station that has received the corresponding information from the UE may transmit antenna switching SRS resource configuration information to the UE based on the received information.

<Method 3> Existing Signaling+New Signaling Addition

Method 3 is a method in which a UE supporting antenna switching proposed in the disclosure transmits an available antenna switching structure and at least one of channel, band, or FR pair information that may use the corresponding structure using both the existing UE capability signaling and new UE capability signaling. According to the method 3, the UE may first transmit a part of the information through the existing UE capability signaling, and separately transmit the remaining some information not transmitted through the existing UE capability signaling to the base station through new UE capability signaling. The base station that has received the corresponding information from the UE may transmit antenna switching SRS resource configuration information to the UE based on the received information.

In UE capability signaling according to the first embodiment disclosed through the methods 1 to 3, an antenna switching constitution (combination of xTxR) supportable by the UE for each band may be transmitted to the base station. The base station may transmit the SRS resource constitution method presented in the disclosure to the UE based on the corresponding information, and use one or more SRS resource constitution methods corresponding to one or more antenna switching constitution combinations, and change or trigger the one or more SRS resource constitution methods using control channels such as MAC CE and DCI.

[Second Embodiment] SRS Resource Constitution Method According to a Structure Having One PA <Method 1> Case 1: 1T1R-1T4R for FR1, 1TIR-1T6/8R for FR2

The proposed method 1 is a method for an antenna structure in which an antenna using FR1 uses structures of 1T1R to 1T4R, and in which an antenna using FR2 uses a structure of 1T6/8R. The proposed method 1 may be used in a UE having various antenna structures. According to an embodiment, the proposed method 1 may be used in a UE having the antenna structure illustrated in FIG. 13A.

Figure 13A:
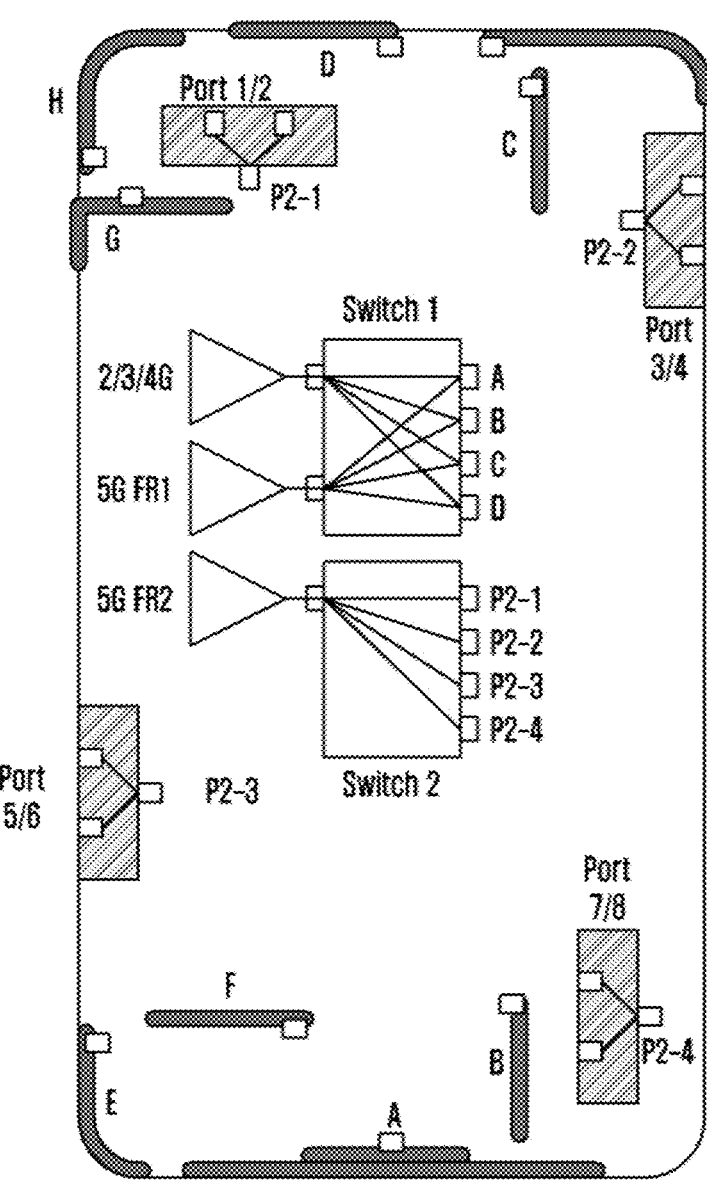
FIGS. 13A to 13D are diagrams illustrating an antenna structure of a terminal according to an embodiment of the disclosure.

With reference to FIG. 13A, in the proposed method 1, an antenna for FR1 has antenna patches of A, B, C, D, E, F, G, and H, and an antenna for FR2 may be used in antenna structures having antenna modules of ports 2-1, 2-2, 2-3, and 2-4. Here, in case that only ports 2-1, 2-2, and 2-3 exist, it is assumed that a structure of 1T6R is supported, and in case that ports 2-1, 2-2, 2-3, and 2-4 exist, it is assumed that a structure of 1T8R is supported. Further, each antenna module may have the L number of ports, and FIG. 13A illustrates a representative example having two ports. In order to operate the antenna structure illustrated in FIG. 13A, the UE may have a switch, as illustrated. As an example, a switch 1 has a structure in which a 5G RF for 2/3/4G and FR1 is connected to 4 antennas among A-H, and a switch 2 has a structure in which a 5G RF for FR2 is connected to ports 2-1 to 2-4. The switch is a logic element that may be configured with a separate element or that may be configured with a single element and an RF. A function of the switch is to connect an input RF signal to one output terminal.

For a UE having the above antenna structure, the base station should measure a channel between each RF path and the antenna element, and for this, the base station may support the following SRS resource structure. The resource structure may be constituted based on maximum 7 resource sets as follows, and be constituted based on some of them.

Figure 13B:
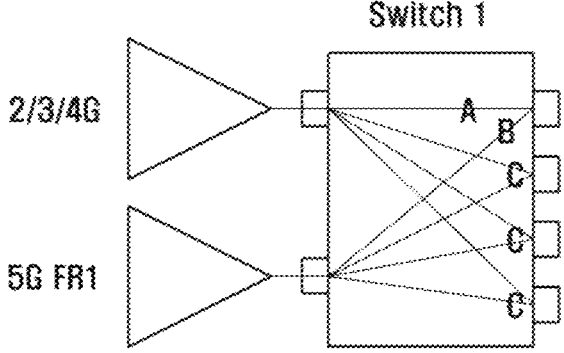

1 set (A), 1 SRS resource with single port (main #1)
1 set (B), 1 SRS resource with single port (main #2)
1 set (C), 3 SRS resources with single port - 3RxD (shared)
3 sets (D, E, F), each set has 2 SRS resources with single port
1 set (G), 2 SRS resources with single port FIG. 13B is a diagram illustrating a resource constitution method according to an embodiment of the disclosure.

With reference to FIG. 13B, the base station may constitute two resource sets to transmit an SRS for 5G FR1 or 2/3/4G, respectively. For example, the base station may constitute a set A so as to transmit an SRS through a main antenna of 2/3/4G and constitute a set B so as to transmit an SRS through a main antenna of 5G FR1. A set C may be constituted for an additional reception antenna for 2/3/4G or 5G. Here, the set C has three resources, and each resource may be constituted to transmit in different symbols of one slot or in different slots.

Based on the above resource constitution, for example, in case that 4×4 MIMO is used in 2/3/4G, sets A and C are used, and in case that 4×4 MIMO is used in 5G FR1, an SRS may be transmitted using sets B and C. In case that it is desired to change a MIMO configuration of the base station and the UE from 4×4 to 4×1, the MIMO constitution may be quickly changed using the channel information acquired from the sets A and B. In case of constituting MIMO for FR2, for example, in case of contituting 8×8 MIMO, resource sets of D, E, F, and G may be used, and resources may be constituted for 6, 4, and 2, as illustrated in the table below. The UE may transmit information on a constitution (1T8R, 1T6R, 1T4R, 1T2R, and 1T1R) in which an antenna structure thereof may be operated to the base station in combination with each band, and the base station may measure a channel for multi-antenna transmission using an SRS resource configuration method according to the method proposed by the disclosure based on the information.

TABLE

| Case 1 | | | | | |
|---|---|---|---|---|---|
| Resource sets | 1T8R | 1TGR | 1T4R | 1T2R | 1T1R |
| 28 G | DEFG | DEF | DE | D | NA |
| 2, 3.5 G | NA | NA | A, B, C | NA | A |
| 700M, 2M | NA | NA | A, B, C | NA | B |

<Method 2> Case 2: 1T2R-1T4R for FR1, 1T2R-1T6/8R for FR2 with 6 Set

The proposed method 2 is a method for an antenna structure in which an antenna using FR1 uses structures of 1T1R, 1T2R, and 1T4R, and in which an antenna using FR2 uses a structure of 1T6/8R. The proposed method 2 may be used in a UE having various antenna structures. According to an embodiment, the proposed method 2 may be used in a UE having an antenna structure as illustrated in FIG. 13A.

With reference to FIG. 13A, in the proposed method 2, an antenna for FR1 have antenna patches of A, B, C, D, E, F, G, and H, and an antenna for FR2 may be used in antenna structures having antenna modules of ports 2-1, 2-2, 2-3, and 2-4. Here, in case that only ports 2-1, 2-2, and 2-3 exist, it is assumed that a structure of 1T6R is supported, and in case that ports 2-1, 2-2, 2-3, and 2-4 exist, it is assumed that a structure of 1T8R is supported. Further, each antenna module may have the L number of ports, and FIG. 13A illustrates a representative example having two ports. In order to operate the antenna structure illustrated in FIG. 13A, the UE may have a switch, as illustrated. As an example, a switch 1 has a structure in which a 5G RF for 2/3/4G and FR1 is connected to 4 antennas among A-H, and a switch 2 has a structure in which a 5G RF for FR2 is connected to ports 2-1 to 2-4. The switch is a logic element that may be configured with a separate element or that may be configured with a single element and an RF. A function of the switch is to connect an input RF signal to one output terminal.

For a UE having the above antenna structure, the base station should measure a channel between each RF path and the antenna element, and for this, the base station may support the following SRS resource structure. The resource structure may be configured based on maximum 7 resource sets as follows, and be constituted based on some of them.

---

1 set (A), 2 SRS resource with single port (main #1, RxD)
1 set (B), 2 SRS resource with single port (main #2, RxD)
1 set (C), 2 SRS resources with single port - 2RxD
3 sets (D, E, F), each set has 2 SRS resources with single port
1 set (G), 2 SRS resources with single port

---

Figure 13C:
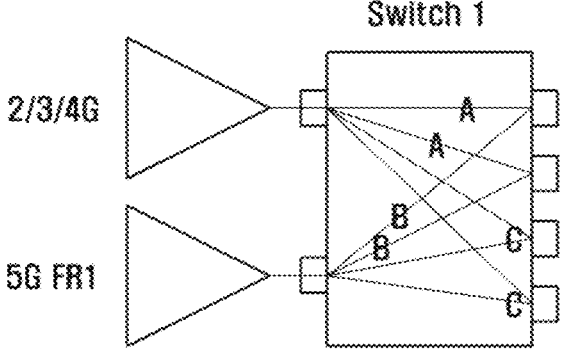

FIG. 13C is a diagram illustrating a resource constitution method according to an embodiment of the disclosure.

With reference to FIG. 13C, the base station may constitute two resource sets so as to transmit an SRS for 5G FR1 or 2/3/4G, respectively. For example, the base station may configure a set A so as to transmit an SRS through a main antenna of 2/3/4G and constitute a set B so as to transmit an SRS through a main antenna of 5G FR1. A set C may be constituted for an additional reception antenna for 2/3/4G or 5G. Here, the set C has two resources, and each resource may be constituted to transmit in different symbols of one slot or in different slots.

Based on the above resource constitution, for example, in case that 4×4 MIMO is used in 2/3/4G, an SRS may be transmitted using sets A and C, and in case that 4×4 MIMO is used in 5G FR1, an SRS may be transmitted using sets B and C. In case that it is desired to change a MIMO constitution of the base station and the UE from 4×4 to 4×2 or 4×1, the MIMO constitution may be quickly changed using channel information acquired from sets A and B. In case of constitution MIMO for FR2, for example, in case of constitution 8×8 MIMO, resource sets of D, E, F, and G may be used, and the resource may be constituted for 6, 4, and 2, as illustrated the table below. The UE may transmit information on a constitution (1T8R, 1T6R, 1T4R, 1T2R, 1T1R) in which an antenna structure thereof may be operated to the base station in combination with each band, and the base station may measure a channel for multi-antenna transmission using an SRS resource constitution method according to the method proposed by the disclosure based on the information.

TABLE

| Case 2 | | | | | |
|---|---|---|---|---|---|
| Resource sets | 1T8R | 1T6R | 1T4R | 1T2R | 1T1R |
| 28 G | DEFG | DEF | DE | D | NA |
| 2, 3.5 G | NA | NA | A, B, C | A | A |
| 700M, 2M | NA | NA | A, B, C | B | A |

<Method 3> Case 3: 1T4R for FR1, 1T2R-1T6/8R for FR2 with 5 Set

The proposed method 3 is a method for an antenna structure in which an antenna using FR1 uses structures of 1T2R and 1T4R and in which an antenna using FR2 uses a structure of 1T6/8R. The proposed method 3 may be used in a UE having various antenna structures. According to an embodiment, the proposed method 3 may be used in a UE having an antenna structure illustrated in FIG. 13A.

With reference to FIG. 13A, in the proposed method 3, an antenna for FR1 has antenna patches of A, B, C, D, E, F, G, and H, and an antenna for FR2 may be used in an antenna structure having antenna modules of ports 2-1, 2-2, 2-3, and 2-4. Here, in case that only ports 2-1, 2-2, and 2-3 exist, it is assumed that a structure of 1T6R is supported, and in case that ports 2-1, 2-2, 2-3, and 2-4 exist, it is assumed that that a structure of 1T8R is supported. Further, each antenna module may have the L number of ports, and FIG. 13A illustrates a representative example having two ports. In order to operate the antenna structure illustrated in FIG. 13A, the UE may have a switch, as illustrated. As an example, a switch 1 has a structure in which a 5G RF for 2/3/4G and FR1 is connected to 4 antennas among A-H, and a switch 2 has a structure in which a 5G RF for FR2 is connected to ports 2-1 to 2-4. The switch is a logic element that may be configured with a separate element or that may be configured with a single element and an RF. A function of the switch is to connect an input RF signal to one output terminal.

For a UE having the above antenna structure, the base station should measure a channel between each RF path and the antenna element, and for this, the base station may support the following SRS resource structure. The resource structure may be configured based on maximum six resource sets as follows, and be constituted based on some of them.

---

1 set (A), 2 SRS resource with single port (main #1, main #2)
1 set (B), 2 SRS resource with single port (RxD, RxD)
3 sets (C, D, E), each set has 2 SRS resources with single port
1 set (F), 2 SRS resources with single port

---

Figure 13D:
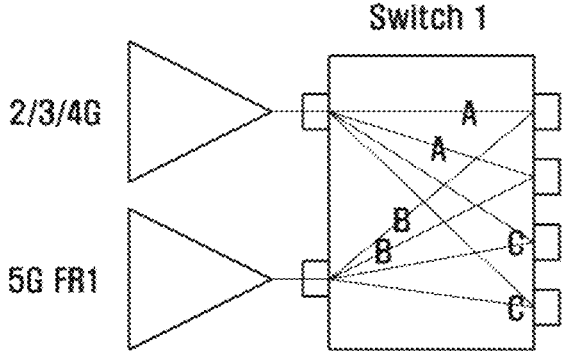

FIG. 13D is a diagram illustrating a resource constitution method according to an embodiment of the disclosure.

With reference to FIG. 13D, the base station may constitute two resource sets so as to transmit an SRS for 5G FR1 or 2/3/4G, respectively. For example, the base station may constitute a set A so as to transmit an SRS through a main antenna of 2/3/4G and constitute a set B so as to transmit an SRS through a main antenna of 5G FR1. A set C may be constituted for an additional reception antenna for 2/3/4G or 5G. Here, the set C has two resources, and each resource may be configured to transmit in different symbols of one slot or in different slots.

Based on the above resource constitution, for example, in case that 4×4 MIMO is used in 2/3/4G, an SRS may be transmitted using sets A and C, and in case that 4×4 MIMO is used in 5G FR1, an SRS may be transmitted using sets B and C. In case that it is desired to change a MIMO constitution of the base station and the UE from 4×4 to 4×2 or 4×1, the MIMO constitution may be quickly changed using channel information acquired from the sets A and B. In case of constitution MIMO for FR2, for example, in case of constituting 8×8 MIMO, resource sets of C, D, E, and F may be used, and resources may be constituted for 6, 4, and 2, as illustrated in the table below. The UE may transmit information on a constitution (1T8R, 1T6R, 1T4R, 1T2R, 1T1R)

in which an antenna structure thereof may be operated to the base station in combination with each band, and the base station may measure a channel for multi-antenna transmission using the SRS resource constitution method according to the method proposed by the disclosure based on the information.

TABLE

| | Case 3 | | | | |
|---|---|---|---|---|---|
| Resource sets | 1T8R | 1T6R | 1T4R | 1T2R | 1T1R |
| 28 G | CDEF | CDE | CD | C | NA |
| 700M, 2 G, 3.5 G | NA | NA | A, B | A | NA |

<Method 4> Case 4: 1TIR and 1T6R for FR1, 1T2R-1T6/8R for FR2

The proposed method 4 is a method for an antenna structure in which an antenna using FR1 uses structures of 1T1R and 1T6R and in which an antenna using FR2 uses a structure of 1T6/8R. The proposed method 4 may be used in a UE having various antenna structures. According to an embodiment, the proposed method 4 may be used in a UE having the antenna structure illustrated in FIG. 14A.

Figure 14A:
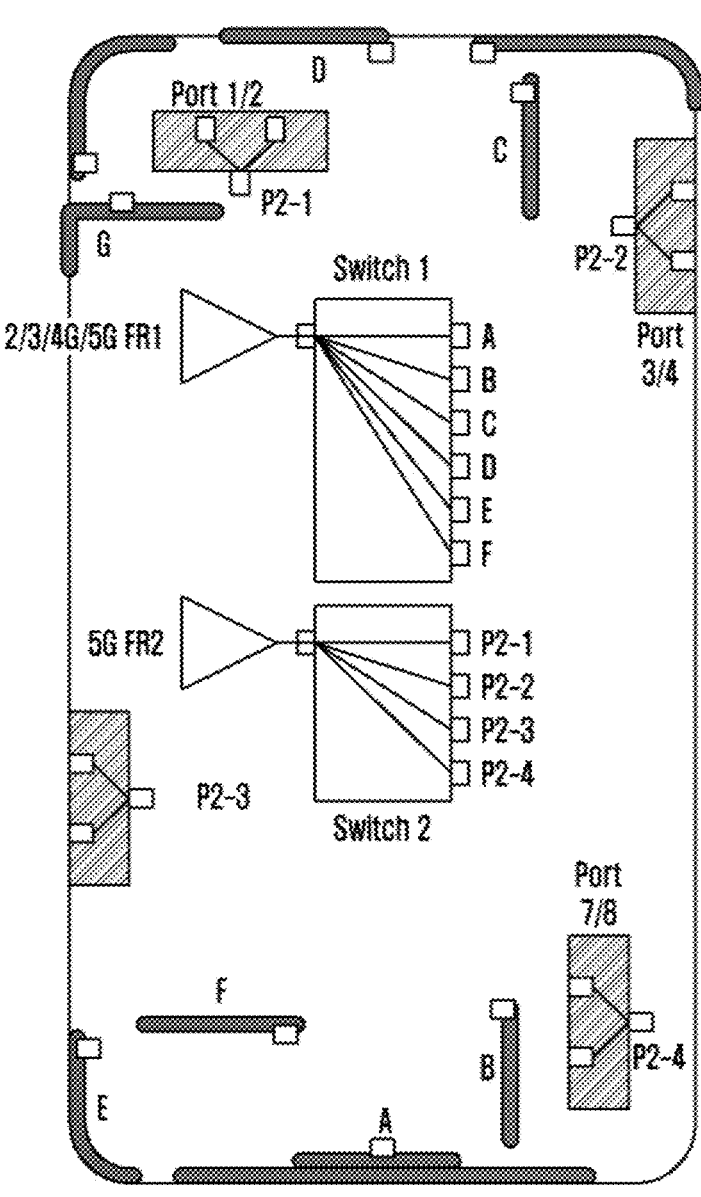
FIGS. 14A to 14F are diagrams illustrating an antenna structure of a terminal according to an embodiment of the disclosure.

With reference to FIG. 14A, in the proposed method 4, an antenna for FR1 has antenna patches of A, B, C, D, E, F, G, and H, and an antenna for FR2 may be used in antenna structures having antenna modules of ports 2-1, 2-2, 2-3, and 2-4. Here, in case that only ports 2-1, 2-2, and 2-3 exist, it is assumed that a structure of 1T6R is supported, and in case that ports 2-1, 2-2, 2-3, and 2-4 exist, it is assumed that a structure of 1T8R is supported. Further, each antenna module may have the L number of ports, and FIG. 14A illustrates a representative example having two ports. In order to operate the antenna structure illustrated in FIG. 14A, the UE may have a switch, as illustrated. As an example, a switch 1 has a structure in which an RF for 2/3/4/5G FR1 is connected to 6 antennas among A-H, and a switch 2 has a structure in which a 5G RF for FR2 is connected to ports 2-1 to 2-4. The switch is a logic element that may be constituted with a separate element or that may be constituted with a single element and an RF. A function of the switch is to connect an input RF signal to one output terminal.

1 set (A), 1 SRS resource with single port - main A
1 set (B), 5 SRS resource with single port - main B, 4 RxD
3 sets (C, D, E), each set has 2 SRS resources with single port
1 set (F), 2 SRS resources with single port For a UE having the above antenna structure, the base station should measure a channel between each RF path and the antenna element, and for this, the base station may support the following SRS resource structure. The resource structure may be constituted based on maximum 6 resource sets as follows, and be constituted based on some of them.

Figure 14B:
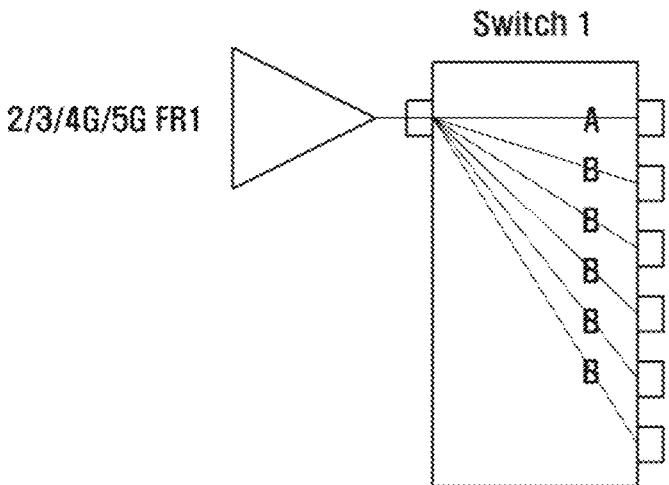

FIG. 14B is a diagram illustrating a resource constitution method according to an embodiment of the disclosure.

With reference to FIG. 14B, the base station may constitute two sets so as to transmit an SRS for 2/3/4/5G FR1. For example, the base station may constitute a set A so as to transmit an SRS through a main antenna of 2/3/4/5G FR1, and a set B may be constituted to transmit an SRS through a second main antenna and an SRS of the remaining 4 additional antennas. Here, the set B has 5 resources, and each resource may be constituted to transmit in different symbols of one slot or in different slots or may be divided into 1 and 4 to be constituted to transmit in different slots.

Based on the above resource constitution, for example, in case that 4×4 MIMO is used in 2/3/4/5G FR1, an SRS may be transmitted using sets A and B. In case that it is desired to change a MIMO constitution of the base station and the UE from 8×6 to 8×1, the MIMO constitution may be quickly changed using channel information acquired from the set A. In case of constituting MIMO for FR2, for example, in case of constituting 8×8 MIMO, resource sets of C, D, E, and F may be used, and resources may be constituted for 6, 4, and 2, as illustrated in the table below. The UE may transmit information on a constitution (1T8R, 1T6R, 1T4R, 1T2R, 1T1R) in which an antenna structure thereof may be operated to the base station in combination with each band, and the base station may measure a channel for multi-antenna transmission using the SRS resource constitution method according to the method proposed by the disclosure based on the information.

TABLE

| | Case 4 | | | | |
|---|---|---|---|---|---|
| Resource sets | 1T8R | 1T6R | 1T4R | 1T2R | 1T1R |
| 28 G | CDEF | CDE | CD | C | NA |
| 700M, 2 G, 3.5 G | NA | A, B | NA | NA | A |

<Method 5> Case 5: 1TIR-1T6R for FR1, 1T2R-1T6/8R for FR2

The proposed method 5 is a method for an antenna structure in which an antenna using FR1 uses structures of 1T1R, 1T2R, 1T4R, and 1T6R and in which an antenna using FR2 uses structures of 1T2R, 1T4R, and 1T6/8R. The proposed method 5 may be used in a UE having various antenna structures. According to an embodiment, the proposed method 5 may be used in a UE having the antenna structure illustrated in FIG. 14A.

With reference to FIG. 14A, in the proposed method 5, an antenna for FR1 has antenna patches of A, B, C, D, E, F, G, and H, and an antenna for FR2 may be used in antenna structures having antenna modules of ports 2-1, 2-2, 2-3, and 2-4. Here, in case that only ports 2-1, 2-2, and 2-3 exist, it is assumed that a structure of 1T6R is supported, and in case that ports 2-1, 2-2, 2-3, and 2-4 exist, it is assumed that a structure of 1T8R is supported. Further, each antenna module may have the L number of ports, and FIG. 14A illustrates a representative example having two ports. In order to operate the antenna structure illustrated in FIG. 14A, the UE may have a switch, as illustrated. As an example, a switch 1 has a structure in which an RF for 2/3/4/5G FR1 is connected to 6 antennas among A-H, and a switch 2 has a structure in which a 5G RF for FR2 is connected to ports 2-1 to 2-4. The switch is a logic element that may be configured with a separate element or that may be configured with a single element and an RF. A function of the switch is to connect an input RF signal to one output terminal.

For a UE having the above antenna structure, the base station should measure a channel between each RF path and the antenna element, and for this, the base station may support the following SRS resource structure. The resource structure may be constituted based on maximum 8 resource sets as follows, and be configured based on some of them.

Figure 14C:
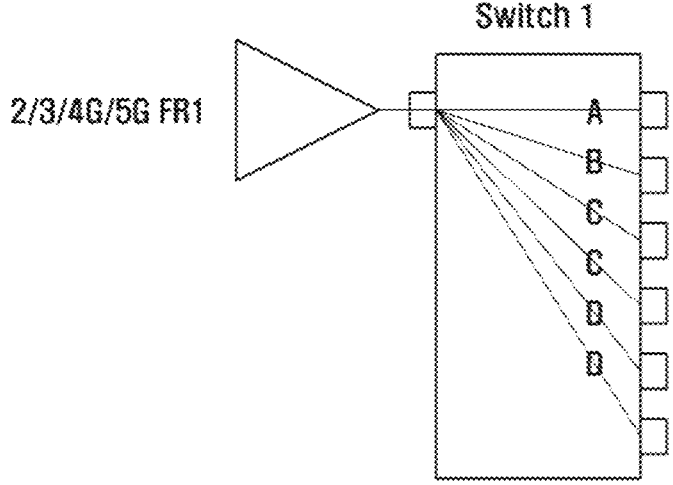

1 set (A), 1 SRS resource with single port - main A
1 set (B), 1 SRS resource with single port - main B
1 set (C), 2 SRS resources with single port - 2RxD
1 set (D), 2 SRS resources with single port - 2RxD
3 sets (E, F, G). each set has 2 SRS resources with single port
1 set (H), 2 SRS resources with single port FIG. 14C is a diagram illustrating a resource constitution method according to an embodiment of the disclosure.

With reference to FIG. 14C, the base station may constitute a resource set as follows so as to transmit an SRS for 2/3/4/5G FR1. For example, a set A may be constituted to transmit an SRS through a main antenna of 2/3/4/5G FR1, a set B may be constituted to transmit an SRS through a second main antenna, and sets C and D may be constituted to transmit an SRS of the remaining two additional antennas, respectively. Here, the sets C and D have two resources, and each resource may be constituted to transmit in different symbols of one slot or in different slots.

Based on the above resource constitution, for example, in case that 4×4 MIMO is used in 2/3/4/5G FR1, an SRS may be transmitted using sets A, B, and C. In case that it is desired to change a MIMO constitution of the base station and the UE from 8×6 to 8×1, the MIMO constitution may be quickly changed using channel information acquired from the set A. In case of constituting MIMO for FR2, for example, in case of constituting 8×8 MIMO, resource sets of E, F, G, and H may be used, and resources may be constituted for 6, 4, and 2, as illustrated in the table below. The UE may transmit information on a constitution (1T8R, 1T6R, 1T4R, 1T2R, 1T1R) in which an antenna structure thereof may be operated to the base station in combination with each band, and the base station may measure a channel for multi-antenna transmission using the SRS resource constitution method according to the method proposed by the disclosure based on the information.

TABLE

| | Case 5 | | | | |
|---|---|---|---|---|---|
| Resource sets | 1T8R | 1T6R | 1T4R | 1T2R | 1T1R |
| 28 G | EFGH | EFG | EF | E | NA |
| 700M, 2 G, 3.5 G | NA | ABCD | ABC | AB | A |

<Method 6> Case 6: 1T2R-1T6R for FR1, 1T2R-1T6/8R for FR2

The proposed method 6 is a method for an antenna structure in which an antenna using FR1 uses structures of 1T2R, 1T4R, and 1T6R and in which an antenna using FR2 uses structures of 1T2R, 1T4R, and 1T6/8R. The proposed method 6 may be used in a UE having various antenna structures. According to an embodiment, the proposed method 6 may be used in a UE having the antenna structure illustrated in FIG. 14A.

With reference to FIG. 14A, an antenna for FR1 has antenna patches of A, B, C, D, E, F, G, and H, and an antenna for FR2 may be used in antenna structures having antenna modules of ports 2-1, 2-2, 2-3, and 2-4. Here, in case that only ports 2-1, 2-2, and 2-3 exist, it is assumed that a structure of 1T6R is supported, and in case that ports 2-1, 2-2, 2-3, and 2-4 exist, it is assumed that a structure of 1T8R is supported. Further, each antenna module may have the L number of ports, and FIG. 14A illustrates a representative example having two ports. In order to operate the antenna structure illustrated in FIG. 14A, the UE may have a switch, as illustrated. As an example, a switch 1 has a structure in which an RF for 2/3/4/5G FR1 is connected to 6 antennas among A-H, and a switch 2 has a structure in which a 5G RF for FR2 is connected to ports 2-1 to 2-4. The switch is a logic element that may be constituted with a separate element or that may be configured with a single element and an RF. A function of the switch is to connect an input RF signal to one output terminal.

For a UE having the above antenna structure, the base station should measure a channel between each RF path and the antenna element, and for this, the base station may 1 set (A), 2 SRS resource with single port - main A, RxD
1 set (B), 2 SRS resource with single port - main B, RxD
1 set (C), 2 SRS resources with single port - 2RxD
3 sets (D, E, F), each set has 2 SRS resources with single port
1 set (G), 2 SRS resources with single port support the following SRS resource structure. The resource structure may be constituted based on maximum 7 resource sets as follows, and be constituted based on some of them.

Figure 14D:
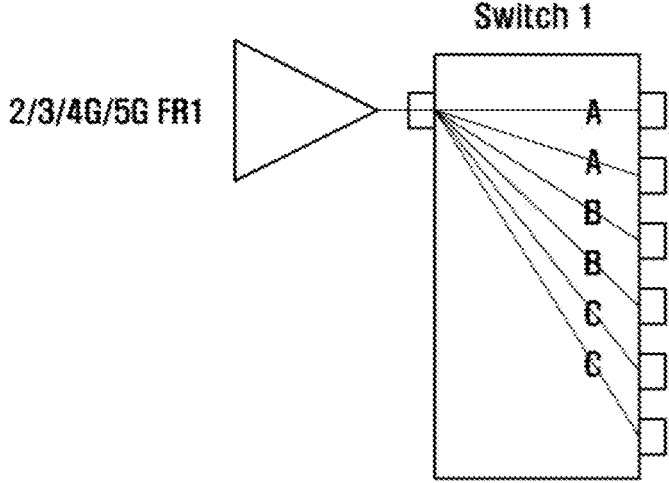

FIG. 14D is a diagram illustrating a resource configuration method according to an embodiment of the disclosure.

With reference to FIG. 14D, the base station may constitute three sets so as to transmit an SRS for 2/3/4/5G FR1. For example, a set A may be constituted to transmit an SRS through a main antenna and an additional antenna of 2/3/4/5G FR1, and a set B may be constituted to transmit an SRS through a second main antenna and an additional antenna, and a set C may be constituted to transmit an SRS of the remaining two additional antennas. Here, the sets A, B, and C have two resources, and each resource may be constituted to transmit in different symbols of one slot or in different slots.

Based on the above resource constitution, for example, in case that 4×4 MIMO is used in 2/3/4/5G FR1, an SRS may be transmitted using sets A and B. In case that it is desired to change a MIMO constitution of the base station and the UE from 8×6 to 8×1, the MIMO constitution may be quickly changed using channel information acquired from the set A. In case of constitution MIMO for FR2, for example, in case of constitution 8×8 MIMO, resource sets of D, E, F, and G may be used, and resources may be constituted for 6, 4, and 2, as illustrated in the table below. The UE may transmit information on a constitution (1T8R, 1T6R, 1T4R, 1T2R, 1T1R) in which an antenna structure thereof may be operated to the base station in combination with each band, and the base station may measure a channel for multi-antenna transmission using the SRS resource constitution method according to the method proposed by the disclosure based on the information.

TABLE

| | Case 6 | | | | |
|---|---|---|---|---|---|
| Resource sets | 1T8R | 1T6R | 1T4R | 1T2R | 1T1R |
| 28G | DEFG | DEF | DE | D | NA |
| 700M, 2G, 3.5G | NA | ABC | AC or BC | A or B | NA |

<Method 7> Case 7: 1T2R and 1T6R for FR1, 1T2R-1T6/8R for FR2 with 5 Set

The proposed method 7 is a method for an antenna structure in which an antenna using FR1 uses structures of 1T2R and 1T6R and in which an antenna using FR2 uses structures of 1T2R, 1T4R, and 1T6/8R. The proposed method 7 may be used in a UE having various antenna structures. According to an embodiment, the proposed method 7 may be used in a UE having the antenna structure illustrated in FIG. 14A.

With reference to FIG. 14A, an antenna for FR1 has antenna patches of A, B, C, D, E, F, G, and H, and an antenna for FR2 has ports may be used in antenna structures having antenna modules of ports 2-1, 2-2, 2-3, and 2-4. Here, in case that only ports 2-1, 2-2, and 2-3 exist, it is assumed that a structure of 1T6R is supported, and in case that ports 2-1, 2-2, 2-3, and 2-4 exist, it is assumed that a structure of 1T8R is supported. Further, each antenna module may have the L number of ports, and FIG. 14A illustrates a representative example having two ports. In order to operate the antenna structure illustrated in FIG. 14A, the UE may have a switch, as illustrated. As an example, a switch 1 has a structure in which an RF for 2/3/4/5G FR1 is connected to 6 antennas among A-H, and a switch 2 has a structure in which a 5G RF for FR2 is connected to ports 2-1 to 2-4. The switch is a logic element that may be configured with a separate element or that may be configured with a single element and an RF. A function of the switch is to connect an input RF signal to one output terminal.

For a UE having the above antenna structure, the base station should measure a channel between each RF path and the antenna element, and for this, the base station may support the following SRS resource structure. The resource structure may be constituted based on maximum 7 resource sets as follows, and be constituted based on some of them.

---

1 set (A), 2 SRS resource with single port - main A, R × D
1 set (B), 4 SRS resource with single port - main B, R × D
1 set (C), 2 SRS resources with single port - 2 R × D
3 sets (D, E, F), each set has 2 SRS resources with single port
1 set (G), 2 SRS resources with single port

---

Figure 14E:
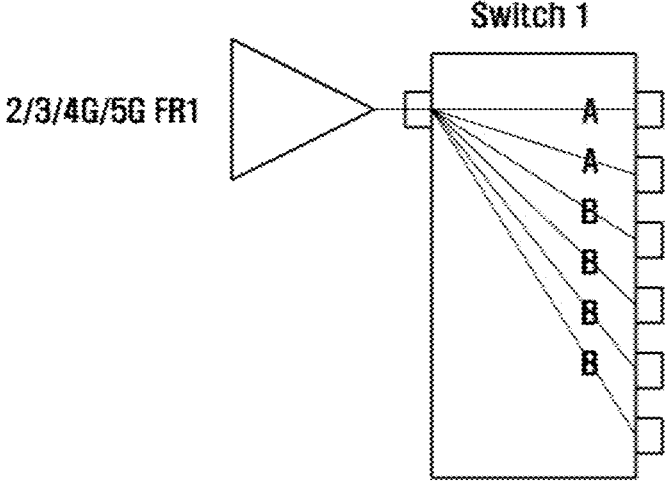

FIG. 14E is a diagram illustrating a resource constitution method according to an embodiment of the disclosure.

With reference to FIG. 14E, the base station may constitute two sets so as to transmit an SRS for 2/3/4/5G FR1. For example, a set A may be constituted to transmit an SRS through a main antenna and a second main antenna of 2/3/4/5G FR1, and a set B may be constituted to transmit an SRS of the remaining 4 additional antennas. Here, the set B has 4 resources, and each resource may be constituted to transmit in different symbols of one slot or in different slots.

Based on the above resource constitution, for example, in case that 8×4 MIMO is used in 2/3/4/5G FR1, an SRS may be transmitted using a set B, and in case that 8×2 MIMO is used in 2/3/4/5G FR1, an SRS may be transmitted using a set A. In case that it is desired to change a MIMO constitution of the base station and the UE from 8×6 to 8×2, the MIMO constitution may be quickly changed using channel information acquired from the set A. In the case of constituting MIMO for FR2, for example, in case of constitution 8×8 MIMO, resource sets of D, E, F, and G may be used, and resources may be constituted for 6, 4, and 2, as illustrated in the table below. The UE may transmit information on a constitution (1T8R, 1T6R, 1T4R, 1T2R) in which an antenna structure thereof may be operated to the base station in combination with each band, and the base station may measure a channel for multi-antenna transmission using the SRS resource constitution method according to the method proposed by the disclosure based on the information.

TABLE

| | Case 7 | | | | |
| --- | --- | --- | --- | --- | --- |
| Resource sets | 1T8R | 1T6R | 1T4R | 1T2R | 1T1R |
| 28G | DEFG | DEF | DE | D | NA |
| 700M, 2G, 3.5G | NA | AB | AC or B | A | NA |

<Method 8> Case 8: 1T2R/4R-1T6R for FR1, 1T2R-1T6/8R for FR2

The proposed method 8 is a method for an antenna structure in which an antenna using FR1 uses structures of 1T2R, 1T4R, and 1T6R and in which an antenna using FR2 uses structures of 1T2R, 1T4R, and 1T6/8R. The proposed method 8 may be used in a UE having various antenna structures. According to an embodiment, the proposed method 8 may be used in a UE having the antenna structure illustrated in FIG. 14A.

With reference to FIG. 14A, an antenna for FR1 has antenna patches of A, B, C, D, E, F, G, and H, and an antenna for FR2 may be used in antenna structures having antenna modules of ports 2-1, 2-2, 2-3, and 2-4. Here, in case that only ports 2-1, 2-2, and 2-3 exist, it is assumed that a structure of 1T6R is supported, and in case that ports 2-1, 2-2, 2-3, and 2-4 exist, it is assumed that a structure of 1T8R is supported. Further, each antenna module may have the L number of ports, and FIG. 14A illustrates a representative example having two ports. In order to operate the antenna structure illustrated in FIG. 14A, the UE may have a switch, as illustrated. As an example, a switch 1 has a structure in which an RF for 2/3/4/5G FR1 is connected to 6 antennas among A-H, and a switch 2 has a structure in which a 5G RF for FR2 is connected to ports 2-1 to 2-4. The switch is a logic element that may be constituted with a separate element or that may be configured with a single element and an RF. A function of the switch is to connect an input RF signal to one output terminal.

For a UE having the above antenna structure, the base station should measure a channel between each RF path and the antenna element, and for this, the base station may support the following SRS resource structure. The resource structure may be constituted based on maximum 6 resource sets as follows, and be constituted based on some of them.

---

1 set (A), 2 SRS resource with single port - main A, R × D
1 set (B), 4 SRS resource with single port - main B, 3R × D
3 sets (D, E, F), each set has 2 SRS resources with single port
1 set (G), 2 SRS resources with single por

---

Figure 14F:
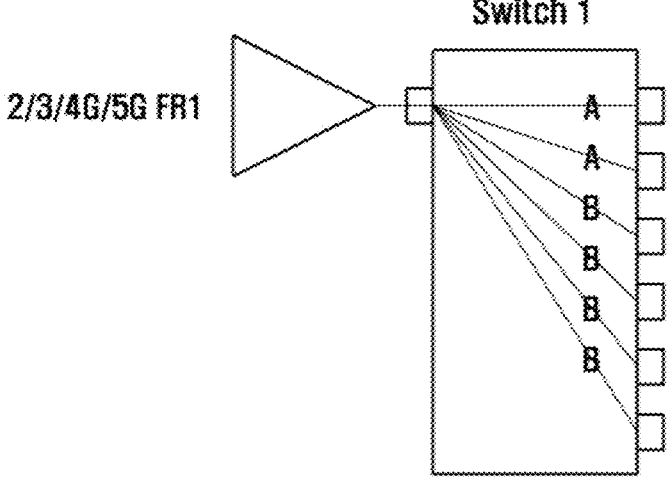

FIG. 14F is a diagram illustrating a proposed resource constitution method according to an embodiment of the disclosure.

With reference to FIG. 14F, the base station may constitute two sets so as to transmit an SRS for 2/3/4/5G FR1. For example, a set A may be constituted to transmit an SRS through a main antenna and an additional antenna of 2/3/4/5G FR1, and a set B may be constituted to transmit an SRS of a second main antenna and the remaining three additional antennas. Here, the sets A and B have 2 and 4 resources, respectively, and each resource may be constituted to transmit in different symbols of one slot or in different slots.

Based on the above resource constitution, for example, in the case that 8×6 MIMO is used in 2/3/4/5G FR1, sets A and B are used, and in the case that 8×4 MIMO is used, an SRS may be transmitted using a set B, and in case that 8×2

MIMO is used in 2/3/4/5G FR1, an SRS may be transmitted using a set A. In case that it is desired to change a MIMO constitution of the base station and the UE to 8×6, 8×4, or 8×2, the MIMO constitution may be quickly changed using channel information acquired from the set A. In case of constituting MIMO for FR2, for example, in case that 8×8 MIMO is constituted, a resource set of CDEF may be used and resources may be constituted for 6, 4, and 2, as illustrated in the table below. The UE may transmit information on a constitution (1T8R, 1T6R, 1T4R, 1T2R) in which an antenna structure thereof may be operated to the base station in combination with each band, and the base station may measure a channel for multi-antenna transmission using the SRS resource constitution method according to the method proposed by the disclosure based on the information.

TABLE

| Case 8 | | | | | |
| --- | --- | --- | --- | --- | --- |
| Resource sets | 1T8R | 1T6R | 1T4R | 1T2R | 1T1R |
| 28G | CDEF | CDE | CD | C | NA |
| 3.5G | NA | AB | B | A | NA |

[Third Embodiment] SRS Resource Constitution Method According to the Structure of Two Pas <Method 9> Case 9: 2T2R-2T4R for FR1, 2T2R-2T6/8R for FR2

The proposed method 9 is a method for an antenna structure in which an antenna using FR1 uses structures of 2T2R to 2T4R and in which an antenna using FR2 uses structures of 2T2R-2T6/8R. The proposed method 9 may be used in a UE having various antenna structures. According to an embodiment, the proposed method 9 may be used in a UE having the antenna structure illustrated in FIG. 15A.

Figure 15A:
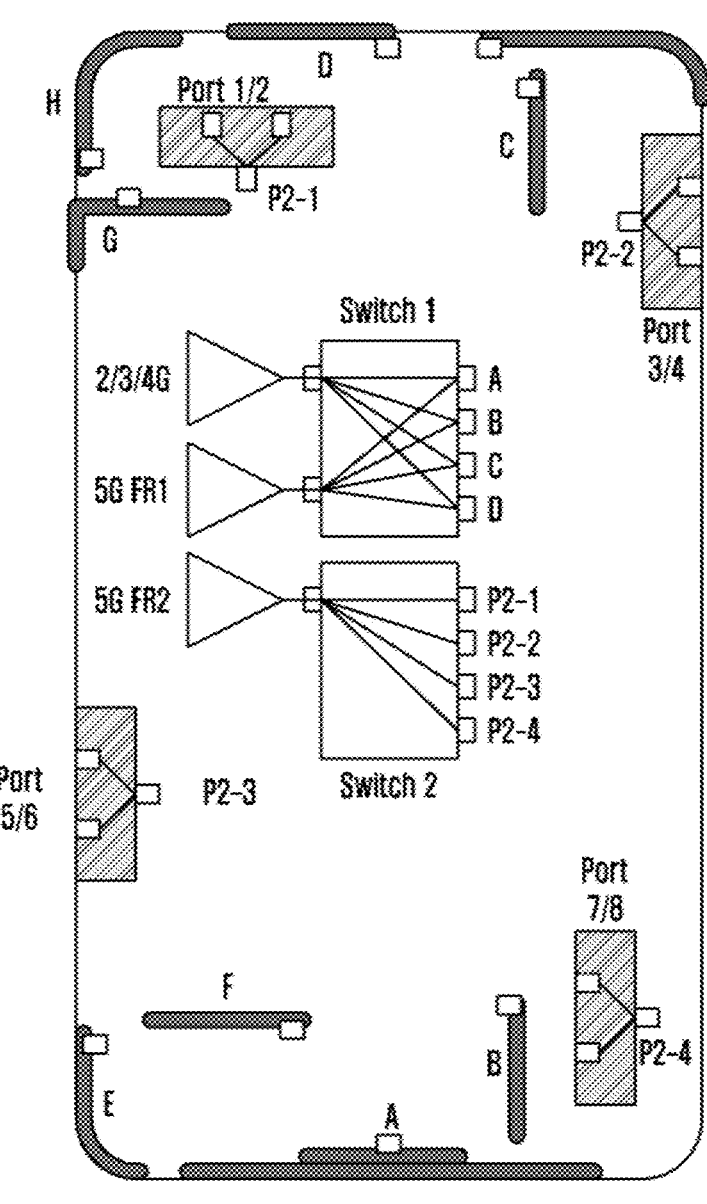
FIGS. 15A to 15B are diagrams illustrating an antenna structure of a terminal according to an embodiment of the disclosure.

With reference to FIG. 15A, in the proposed method 9, an antenna for FR1 may be used in antenna structures having antenna patches of A, B, C, D, E, F, G, and H, and an antenna for FR2 may be used in antenna structures having antenna modules of ports 2-1, 2-2, 2-3, and 2-4. Here, in the case that only ports 2-1, 2-2, and 2-3 exist, it is assumed that a structure of 2T6R is supported, and in the case that ports 2-1, 2-2, 2-3, and 2-4 exist, it is assumed that a structure of 2T8R is supported. Further, each antenna module may have the L number of ports, and FIG. 15A illustrates a representative example having two ports. In order to operate the antenna structure illustrated in FIG. 15A, the UE may have a switch, as illustrated. As an example, a switch 1 has a structure in which a 5G RF for 2/3/4G and FR1 is connected to 4 antennas among A-H, and a switch 2 has a structure in which a 5G RF for FR2 is connected to ports 2-1 to 2-4. The switch is a logic element that may be constituted with a separate element or that may be constituted with a single element and an RF. A function of the switch is to connect an input RF signal to one output terminal.

For a UE having the above antenna structure, the base station should measure a channel between each RF path and the antenna element, and for this, the base station may support the following SRS resource structure. The resource structure may be constituted based on maximum 6 resource sets as follows, and be constituted based on some of them.

Figure 15B:
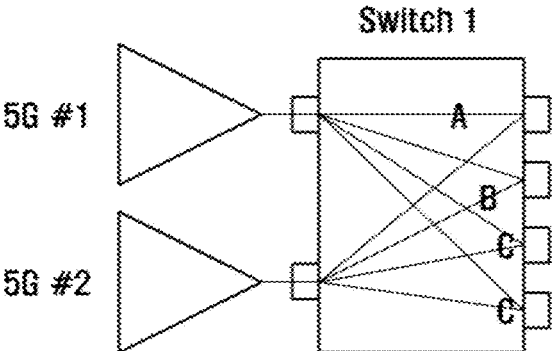

1 set (A), 1 SRS resource with 2 port - main A, B
1 set (B), 2 SRS resource with 2 port - R × D, R × D -continued 3 sets (C, D, E), 1 SRS resources with 2 port
1 set (F), 1 SRS resources with 2 port FIG. 15B is a diagram illustrating a proposed resource constitution method according to an embodiment of the disclosure.

With reference to FIG. 15B, the base station may constitute each of two sets so as to transmit an SRS for 5G FR1 or 2/3/4G. For example, a set A may be constituted to transmit an SRS through a main antenna of 2/3/4G, and a set B may be constituted to transmit an SRS through a main antenna of 5G FR1. A set C may be constituted for an additional reception antenna for 2/3/4G or 5G. Here, the set C has one resource, and each resource may be constituted to transmit in different symbols of one slot or in different slots.

Based on the above resource constitution, for example, in case of using 4×4 MIMO, an SRS may be transmitted using sets A and B. In case that it is desired to change a MIMO constitution of the base station and the UE from 4×4 to 4×2, the MIMO constitution may be quickly changed using channel information acquired from sets A and B. In the case of constitution MIMO for FR2, for example, in case of constituting 8×8 MIMO, a set of C, D, E, and F may be used, and resources may be constituted for 6, 4, and 2, as illustrated in the table below. The UE may transmit information on a constitution (1T8R, 1T6R, 1T4R, 1T2R, 1TIR or 2T1R-2T8R) in which an antenna structure thereof may be operated to the base station in combination with each band, and the base station may measure a channel for multi-antenna transmission using the SRS resource constitution method according to the method proposed by the disclosure based on the information.

TABLE

| Case 9 | | | | | |
| --- | --- | --- | --- | --- | --- |
| Resource sets | 2T8R | 2T6R | 2T4R | 2T2R | 2T1R |
| 28G | CDEF | CDE | CD | C | NA |
| 3.5G | NA | NA | A, B | A | NA |

<Method 10> Case 10: 2T2R-2T6R for FR1, 2T2R-2T6/8R for FR2

Figure 16A:
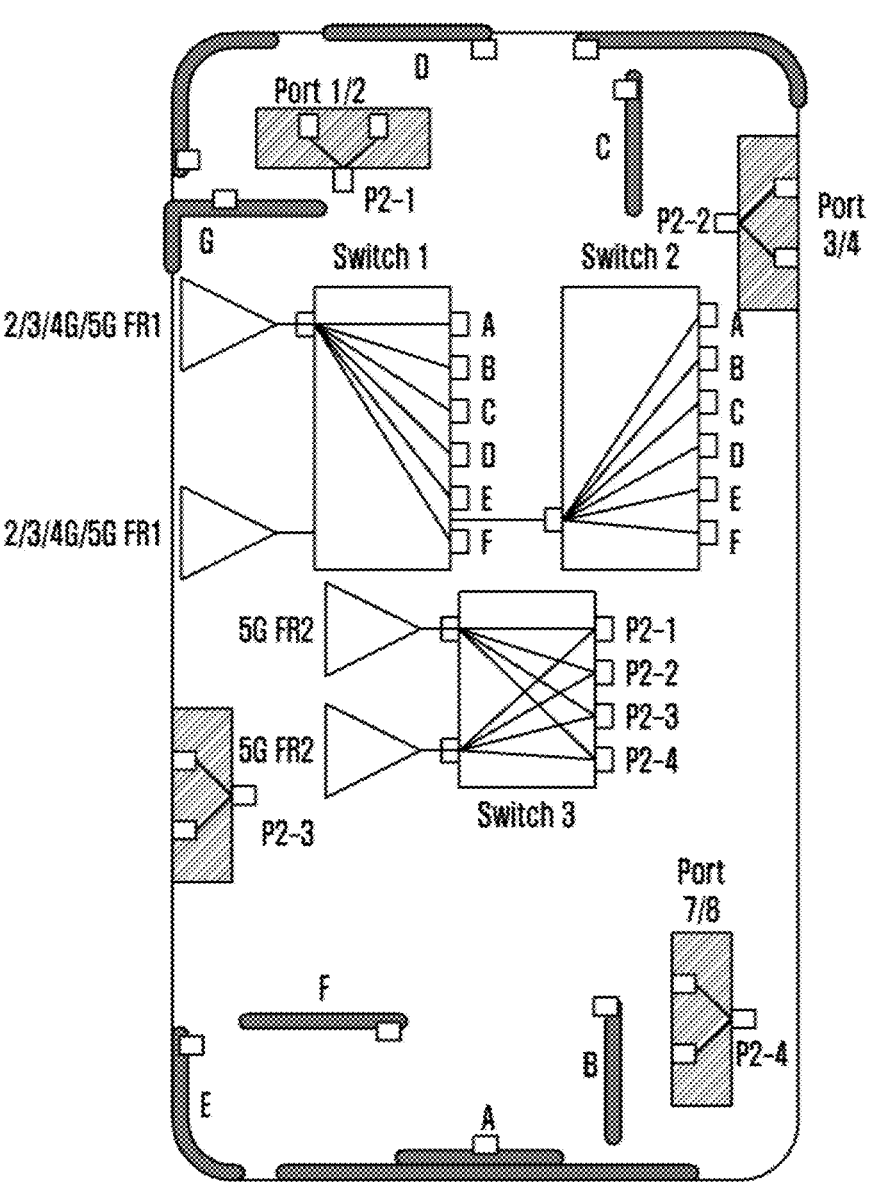
FIGS. 16A to 16C are diagrams illustrating an antenna structure of a terminal according to an embodiment of the disclosure.

The proposed method 10 is a method for an antenna structure in which an antenna using FR1 uses structures of 2T2R, 2T4R, and 2T6R and in which an antenna using FR2 uses structures of 2T2R-2T6/8R. The proposed method 10 may be used in a UE having various antenna structures. According to an embodiment, in the proposed method 10, the antenna for FR1 illustrated in FIG. 16A has antenna patches of A, B, C, D, E, F, G, and H, and the antenna for FR2 may be used in antenna structures having antenna modules of ports 2-1, 2-2, 2-3, and 2-4. Here, in case that only ports 2-1, 2-2, and 2-3 exist, it is assumed that a structure of 2T6R is supported, and in case that ports 2-1, 2-2, 2-3, and 2-4 exist, it is assumed that a structure of 2T8R is supported. Further, each antenna module has the L number of ports, and FIG. 16A illustrates a representative example having two ports. In order to operate the antenna structure illustrated in FIG. 16A, the UE may have a switch, as illustrated. As an example, a switch 1 is connected to a first PA of 2/3/4/5G FR1 and 6 antennas among antennas A-H, a switch 2 has a structure connected to a second PA of 2/3/4/5G FR1 and 6 antennas among antennas A-H, and a switch 3 has a structure connected to two 5G RF ports and ports 2-1 to 2-4 for FR2. The switch is a logic element that may be constituted with a separate element or that may be constituted with a single element and an RF. A function of the switch is to connect an input RF signal to one output terminal.

In such a UE structure, the base station should measure a channel between each RF path and an antenna element, and for this, the base station may support the following SRS resource structure. The resource structure may be constituted based on maximum 7 resource sets as follows, and be constituted based on some of them

---

1 set (A), 1 SRS resource with 2 port - main A, main B
1 set (B), 1 SRS resource with 2 port - R × D, R × D
1 set (C), 1 SRS resources with 2 port - R × D, R × D
3 sets (D, E, F), each set has 1 SRS resources with 2 port
1 set (G), 2 SRS resources with single port

---

Figure 16B:
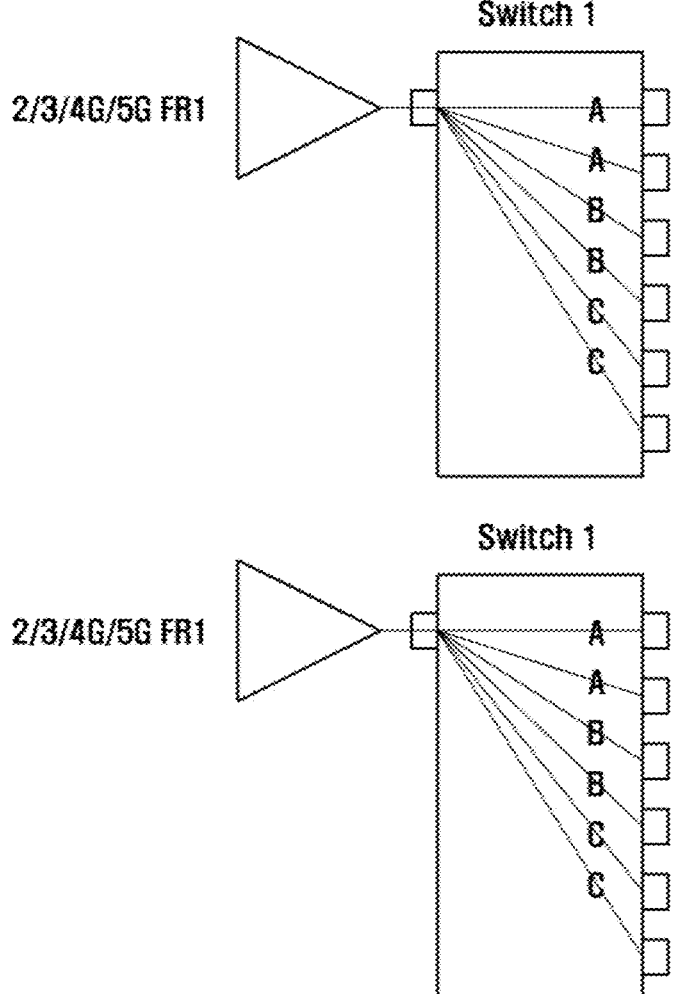

FIG. 16B is a diagram illustrating a resource constitution method according to an embodiment of the disclosure.

With reference to FIG. 16B, each of two sets may be constituted to transmit an SRS for 5G FR1 or 2/3/4G. For example, a set A may be constituted to transmit an SRS through a main antenna of 2/3/4G, and a set B may be constituted to transmit an SRS through a main antenna of 5G FR1. A set C may be constituted for an additional reception antenna for 2/3/4G or 5G. Here, the set C has one resource, and each resource may be constituted to transmit in different symbols of one slot or in different slots.

Based on the above resource constitution, for example, in case that 8×6 MIMO is used, an SRS may be transmitted using sets A and B. In case that it is desired to change a MIMO constitution of the base station and the UE to 8×2, the MIMO constitution may be quickly changed using channel information acquired from the set A. In case of constituting MIMO for FR2, and in case that 8×8 MIMO is constituted, a set of D, E, F, and G is used, and resources may be constituted for 6, 4, and 2, as illustrated in the table below. The UE may transmit information on a constitution (1T8R, 1T6R, 1T4R, 1T2R or 2TIR-2T8R) in which an antenna structure thereof may be operated to the base station in combination with each band, and the base station may measure a channel for multi-antenna transmission using an SRS resource constitution method according to the method proposed by the disclosure based on the information.

TABLE

| | | | Case 10 | | |
|---|---|---|---|---|---|
| Resource sets | 2T8R | 2T6R | 2T4R | 2T2R | 2T1R |
| 28G | DEFG | DEF | DE | D | NA |
| 3.5G | NA | ABC | AC or BC | A ar B | NA |

<Method 11> Case 11: 2T2R and 2T6R for FR1, 2T2R-2T6/8R for FR2

The proposed method 11 is a method for an antenna structure in which an antenna using FR1 uses structures of 2T2R and 2T6R and in which an antenna using FR2 uses structures of 2T2R-2T6/8R. The proposed method 11 may be used in a UE having various antenna structures. According to an embodiment, the proposed method 11 may be used in a UE having the antenna structure illustrated in FIG. 16A.

With reference to FIG. 16A, in the proposed method 11, an antenna for FR1 has antenna patches of A, B, C, D, E, F, G, and H, and an antenna for FR2 may be used in antenna structures having antenna modules of ports 2-1, 2-2, 2-3, and 2-4. Here, in case that only ports 2-1, 2-2, and 2-3 exist, it is assumed that a structure of 2T6R is supported, and in case that ports 2-1, 2-2, 2-3, and 2-4 exist, it is assumed that a structure of 2T8R is supported. Further, each antenna module has the L number of ports, and FIG. 16A illustrates a representative example having two ports. In order to operate the antenna structure illustrated in FIG. 16A, the UE may have a switch, as illustrated. As an example, a switch 1 is connected to a first PA of 2/3/4/5G FR1, and 6 antennas among antennas A-H, and a switch 2 has a structure connected to a second PA of 2/3/4/5G FR1 and 6 antennas among use antennas A-H, and a switch 3 has a structure connected to two 5G RF and ports 2-1 to 4 for FR2. The switch is a logic element that may be constituted with a separate element or that may be constituted with a single element and an RF. A function of the switch is to connect an input RF signal to one output terminal.

In such a UE structure, the base station should measure a channel between each RF path and an antenna element, and for this, the base station may support the following SRS resource structure. The resource structure may be constituted based on maximum six resource sets as follows, and be constituted based on some of them.

---

1 set (A), 1 SRS resource with 2 port - main A, main B
1 set (B), 2 SRS resource with 2 port - R × D, R × D, R × D, R × D
3 sets (C, D, E), each set has 2 SRS resources with single port
1 set (F), 2 SRS resources with single port

---

Figure 16C:
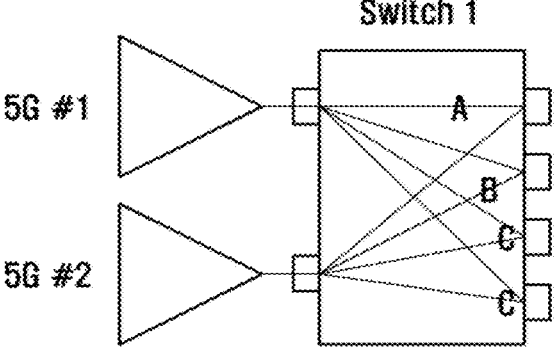

FIG. 16C is a diagram illustrating a resource constitution method according to an embodiment of the disclosure.

With reference to FIG. 16C, the base station may constitute each of two sets so as to transmit an SRS for 5G FR1 or 2/3/4G. For example, a set A may be constituted to transmit an SRS through a main antenna of 2/3/4G, and a set B may be constituted to transmit an SRS through a main antenna of 5G FR1. A set C may be constituted for an additional reception antenna for 2/3/4G or 5G. Here, the set C has three resources, and each resource may be constituted to transmit in different symbols of one slot or in different slots.

Based on the above resource constitution, for example, in the case of using 4×4 MIMO, an SRS may be transmitted using sets A and B. In the case that it is desired to change a MIMO constitution of the base station and the UE from 4×4 to 4×2, the MIMO configuration may be quickly changed using channel information acquired from the set A and the set B. In the case of constituting MIMO for FR2, and in case that 8×8 MIMO is constituted, sets of C, D, E, and F may be used, and resources may be constituted for 6, 4, and 2, as illustrated in the table below. The UE may transmit information on a constitution (1T8R, 1T6R, 1T4R, 1T2R or 2T1R-2T8R) in which an antenna structure thereof may be operated to the base station in combination with each band, and the base station may measure a channel for multi-antenna transmission using the SRS resource constitution method according to the proposed method based on the information.

TABLE

| Case 11 | | | | |
|---|---|---|---|---|
| Resource sets | 2T8R | 2T6R | 2T4R | 2T2R | 2T1R |
| 28G | CDEF | CDE | CD | C | NA |
| 3.5G | NA | AB | NA | A | NA |

[Fourth Embodiment] SRS Resource Constitution
Method According to a Structure Having 4 PAs <Method 12> Case 12: 4T6(8)R Antenna Structure (4 Main,
4 Sub for Under 6, 6(8) Main for Over 6)

The proposed method 12 is a method for an antenna structure in which an antenna using FR1 uses a structure of 4T4R and in which an antenna using FR2 uses a structure of 4T2/4/6/8R. The proposed method 12 may be used in a UE having various antenna structures. According to an embodiment, the proposed method 12 may be used in a UE having the antenna structure illustrated in FIG. 17A.

Figure 17A:
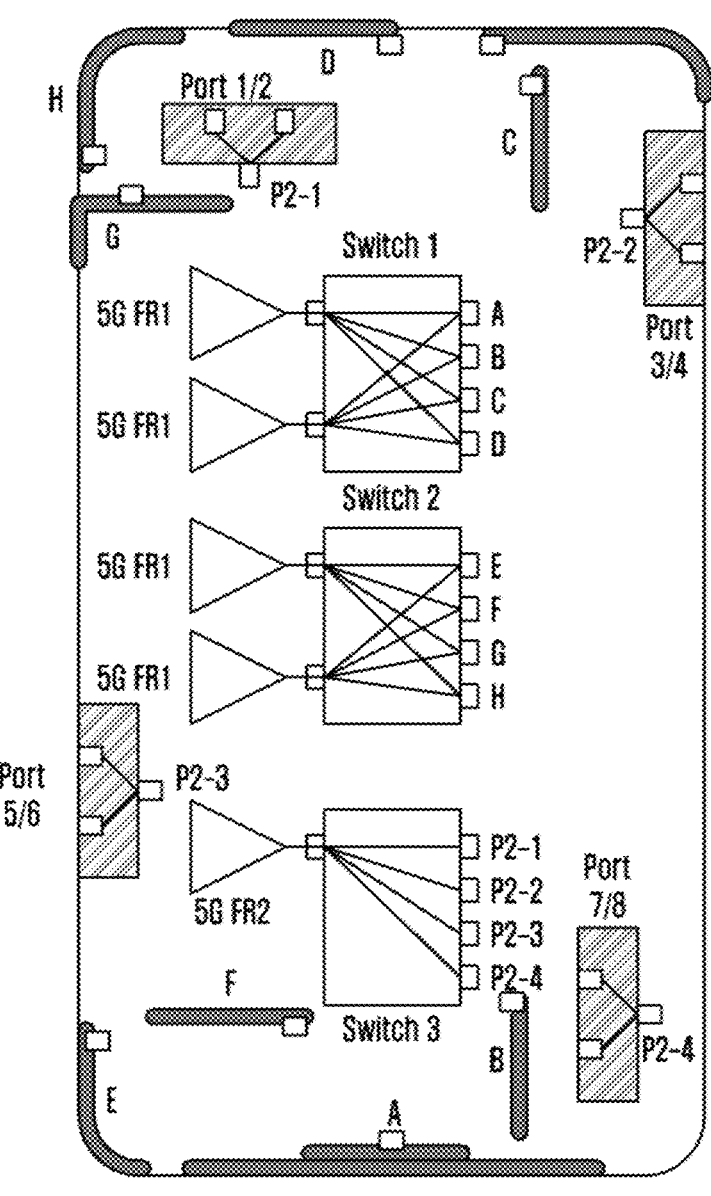
FIGS. 17A to 17C are diagrams illustrating an antenna structure of a terminal according to an embodiment of the disclosure.

With reference to FIG. 17A, in the proposed method 12, an antenna for FR1 has antenna patches of A, B, C, D, E, F, G, and H, and an antenna for FR2 may be used in a structure having antenna modules of ports 2-1, 2-2, 2-3, and 2-4. Here, in the case that only ports 2-1, 2-2, and 2-3 exist, it is assumed that a structure of 4T6R is supported, and in the case that ports 2-1, 2-2, 2-3, and 2-4 exist, it is assumed that a structure of 4T8R is supported. Further, each antenna module has the L number of ports, and FIG. 17A illustrates a representative example having two ports. In order to operate the antenna structure illustrated in FIG. 17A, the UE may have a switch, as illustrated. As an example, a switch 1 is connected to two PAs of 2/3/4/5G FR1 and four antennas among antennas A-H, and a switch 2 has a structure connected to 4 antennas among antennas A-H using for the remaining two PAs of 2/3/4/5G FR1, and a switch 3 has a structure connected to two 5G RF ports and ports 2-1 to 2-4 for FR2. The switch is a logic element that may be constituted with a separate element or that may be constituted with a single element and an RF. A function of the switch is to connect an input RF signal to one output terminal.

In such a UE structure, the base station should measure a channel between each RF path and an antenna element, and for this, the base station may support the following SRS resource structure. The resource structure may be constituted based on maximum four resource sets as follows, and be constituted based on some of them.

Figure 17B:
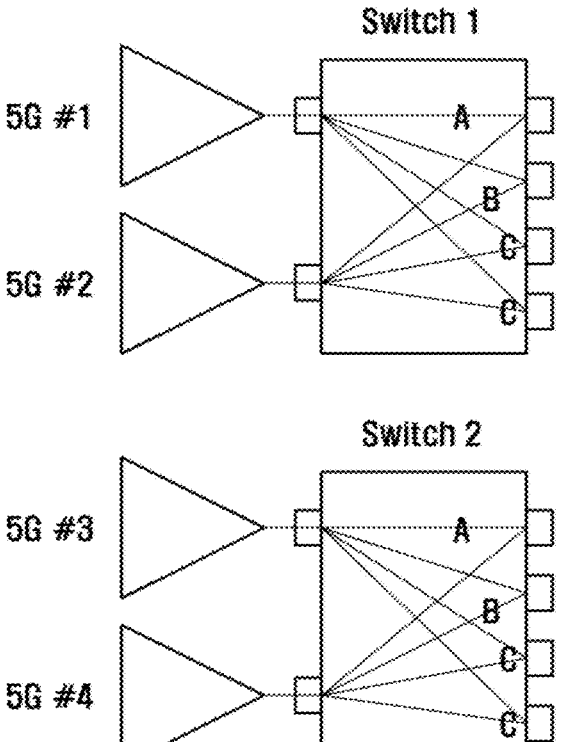

1 set (A), 1SRS resource with 4 port - main A1, A2, B1, B2
1 set (B), 1SRS resource with 4 port
1 set (C), 2 SRS resources with 2 port or 1 sets (D), 1 SRS resources with 4 port FIG. 17B is a diagram illustrating a resource constitution method according to an embodiment of the disclosure.

With reference to FIG. 17B, the base station may constitute two sets so as to transmit an SRS for 2/3/4/5G FR1. For example, a set A may be constituted to transmit an SRS through four antennas including a main antenna of 2/3/3/4/5G FR1, and a set B may be configured to transmit an SRS through the remaining four antennas. A set C or D may be constituted with two resources of two ports or one resource of 4 ports so as to support 5G FR2 to transmit an SRS. Here, in the set C or D, each resource may be constituted to transmit in different symbol of one slot or in different slots.

Based on the above resource configuration, for example, in case of using 8×4 MIMO, an SRS may be transmitted using the set A or B. In case that MIMO is constituted for FR2, and in case that 8×8 MIMO is constituted, a set of B and D may be used, and the resource may be constituted as in the following table for 6, 4, and 2. The UE may transmit information on a constitution (1T8R, 1T6R, 1T4R, 1T2R, 2T1R-2T8R or 4TIR-4T8R) in which an antenna structure thereof may be operated to the base station with a combination with each band, and the base station may measure a channel for multiple antenna transmission using an SRS resource constitution method according to a method proposed by the disclosure based on the information.

TABLE

| Case 12 | | | | |
|---|---|---|---|---|
| Resource sets | 4T8R | 4T6R | 4T4R | 4T2R | 4T1R |
| 28G | DB | BC | B | C | NA |
| 3.5G | NA | NA | A | NA | NA |

<Method 13> Case 13: 4T6(8)R Antenna Structure (4 Main,
6 Sub for Under 6, 6(8) Main for Over 6)

The proposal method 13 is a method for an antenna structure in which an antenna using FR1 uses structures of 4T6R and 4T4R, and in which an antenna using FR2 uses a structure of 4T2/46/8R. The proposal method 13 may be used in a UE having various antenna structures. According to an embodiment, the proposal method 13 may be used in a UE having an antenna structure illustrated in FIG. 17A.

With reference to FIG. 17A, an antenna for FR1 has antenna patches of A, B, C, D, E, F, G, and H, and an antenna for FR2 may be used for a structure having an antenna module of ports 2-1, 2-2, 2-3, and 2-4. Here, in case that only ports 2-1, 2-2, and 2-30 exist, it is assumed that a structure of 4T6R is supported, and in case that ports 2-1, 2-2, 2-3, and 2-4 exist, it is assumed that a structure of 4T8R is supported. Further, each antenna module has the L number of ports, and FIG. 17A illustrates a representative example having two ports. In order to operate the antenna structure illustrated in FIG. 17A, the UE may have a switch, as illustrated. As an example, a switch 1 is connected to two PAs of 2/3/4/5G FR1 and four antennas of antennas A-H, a switch 2 has a structure connected to four antennas of the antennas A-H using in the remaining two PA of 2/3/4/5G FR1, and a switch 3 has a structure connected to two 5G RFs and ports 2-1 to 2-4 for FR2. The switch is a logical element that may be constituted with a separate element or that may be constituted with a single element and an RF. A function of the switch is to connect an input RF signal to one output terminal.

In such a UE structure, the base station should measure a channel between each RF path and the antenna element, and for this, the base station may support the following 1 set (A1), 1 SRS resource with 4 port - main pA1, pA2, pB1, pB2
1 set (A2), 2 SRS resource with 1 port - R × D2
1 sets (B), 1 SRS resources with 4 port
1 set (C), 1 SRS resources with 2 port
Or
1 sets (D), 1 SRS resources with 4 port SRS resource structure. The resource structure may be constituted based on maximum 4-5 resource sets as follows, and be constituted based on some of them.

Figure 17C:
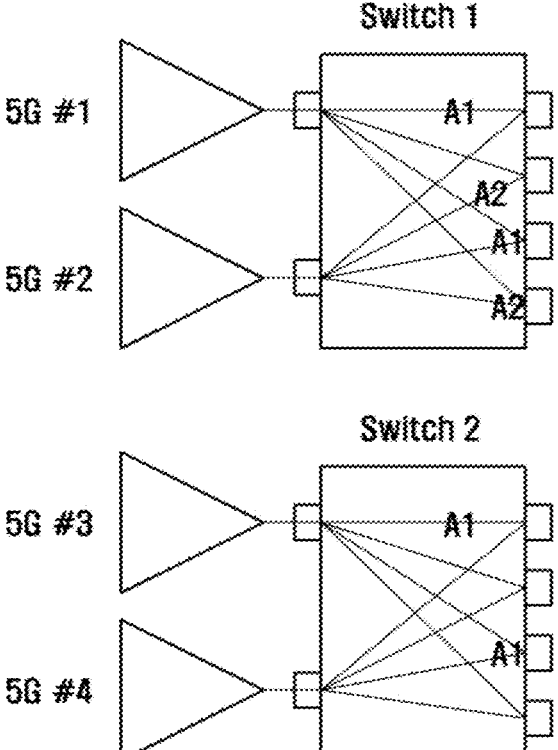

FIG. 17C is a diagram illustrating a resource constitution method according to an embodiment of the disclosure.

With reference to FIG. 17C, the base station may constitute each of sets A1, A2, and B so as to transmit an SRS for 2/3/4/5G FR1. For example, the sets A1 and A2 may be constituted to transmit an SRS through 4 antennas including a main antenna of 2/3/4/5G FR1, and the set B may be constituted to transmit an SRS through the remaining two antennas. A set C or D may be constituted with two resources of two ports or one resource of 4 ports so as to support 5G FR2 to transmit an SRS. Here, in the set C or D, each resource may be constituted to transmit in different symbols of one slot or in different slots.

Based on the above resource constitution, for example, in the case of using 8×6 MIMO, an SRS may be transmitted using sets A1 and A2. In the case that MIMO is constituted for FR2, and in the case that 8×8 MIMO is constituted, a set of B and D may be used, and resources may be constituted for 8×6, 8×4, and 8×2, as illustrated in the table below (case 13). The UE may transmit information on a constitution (1T8R, 1T6R, 1T4R, 1T2R or 2T1R-2T8R or 4T1R-4T8R) in which an antenna structure thereof may be operated to the base station in combination with each band, and the base station may measure a channel for multi-antenna transmission using the SRS resource constitution method according to the method proposed by the disclosure based on the information.

TABLE

| | | Case 13 | | | |
| --- | --- | --- | --- | --- | --- |
| Resource sets | 4T8R | 4T6R | 4T4R | 4T2R | 4T1R |
| 286 | DB | BC | B | C | NA |
| 3.5G | NA | A1, A2A | A1 | NA | NA |

[Fifth Embodiment] Method of Triggering SRS Antenna Switching

<Method 1> Per TX cyclic: Method 1 is a method of cyclically processing antennas connected to one PA in order through one resource with one triggering. According to the method 1, in case that one triggering signal (higher level signaling or PDCCH or MAC CE) triggers SRS transmission, an SRS may be transmitted by turning on a first PA and sequentially changing the switch connected to the PA, and then the SRS may be transmitted by turning on a second PA and sequentially changing the switch connected to the PA. According to the method 1, power consumption may be reduced by reducing the on/off number of the PA.

<Method 2> Per path cyclic: Method 2 is a method of cyclically processing PAs connected to one antenna in order through one resource with one triggering. According to the method 2, in case that one triggering signal (higher level signaling or PDCCH or MAC CE) triggers SRS transmission, the method 2 is a method of transmitting an SRS while sequentially changing connectable PAs through a switch connected to a first antenna, and then transmitting an SRS while sequentially changing connectable PAs through a switch connected to a second antenna. According to method 2, it is possible to quickly obtain channel information through multiple PAs for one antenna.

Figure 18:
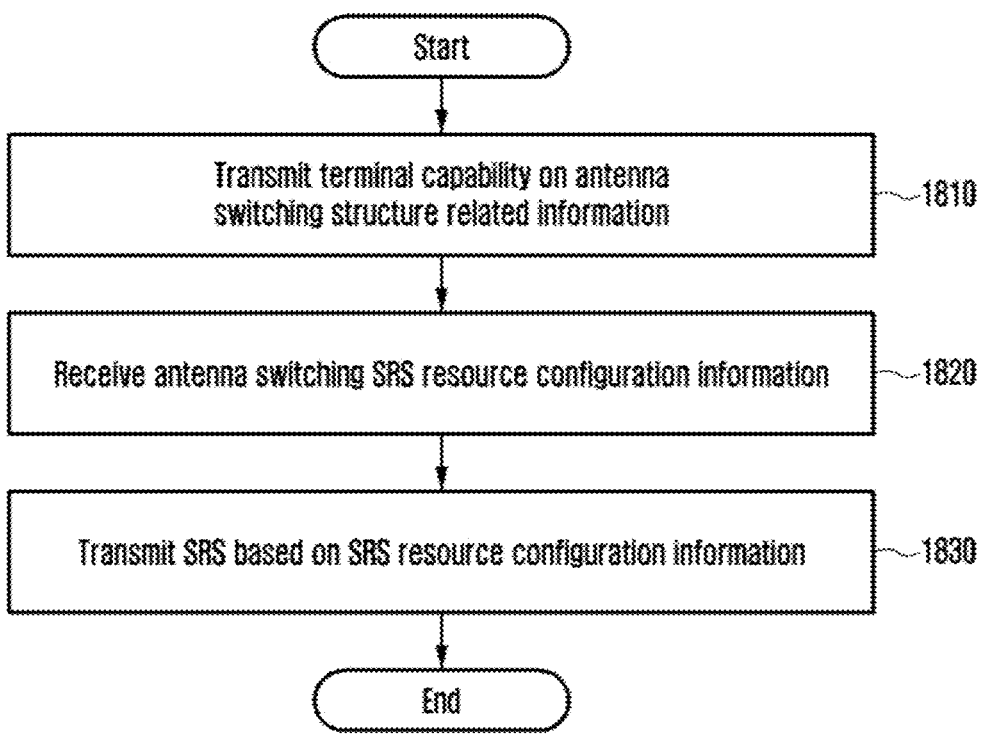
FIG. 18 is a flowchart illustrating an operation of a terminal according to an embodiment of the disclosure.

FIG. 18 is a flowchart illustrating an operation of a UE according to an embodiment of the disclosure.

With reference to FIG. 18, the UE may transmit information on an available antenna switching structure and at least one of channel, band, and FR pair information that can use the corresponding structure to the base station (1810). According to an embodiment, the antenna switching structure related information may be transmitted to the base station through UE capability signaling according to methods 1 to 3 of the first embodiment. The base station may configure SRS resources according to the methods described through the second to fourth embodiments based on the received antenna switching structure related information, and the UE may receive antenna switching SRS resource configuration information from the base station (1820). The UE may transmit an SRS to the base station based on the switching SRS resource configuration information received from the base station (1830).

Figure 19:
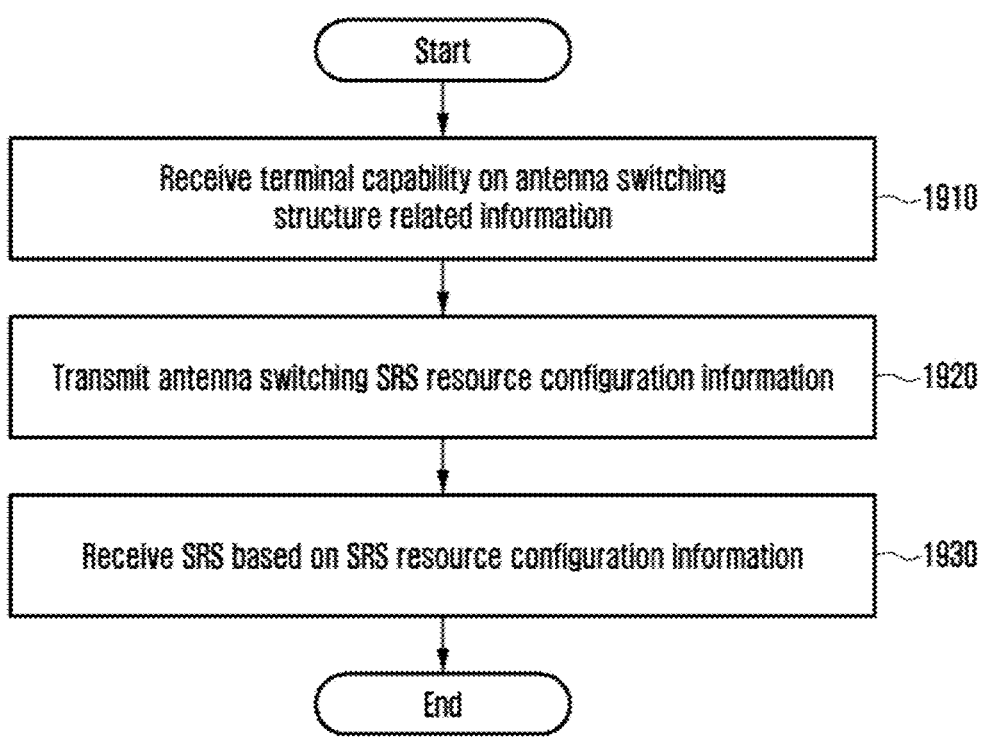
FIG. 19 is a flowchart illustrating an operation of a base station according to an embodiment of the disclosure.

FIG. 19 is a flowchart illustrating an operation of a base station according to an embodiment of the disclosure.

With reference to FIG. 19, the base station may receive, from the UE, information on an available antenna switching structure and at least one of channel, band, or FR pair information that can use the corresponding structure (1910). According to an embodiment, the antenna switching structure related information may be transmitted to the base station through UE capability signaling according to methods 1 to 3 of the first embodiment. The base station may configure an SRS resource according to the method described in the second to fourth embodiments based on the received antenna switching structure related information, and transmit the antenna switching SRS resource configuration information to the UE (1920). The base station may transmit an SRS from the UE based on the switching SRS resource configuration information received by the UE (1930).

Figure 20:
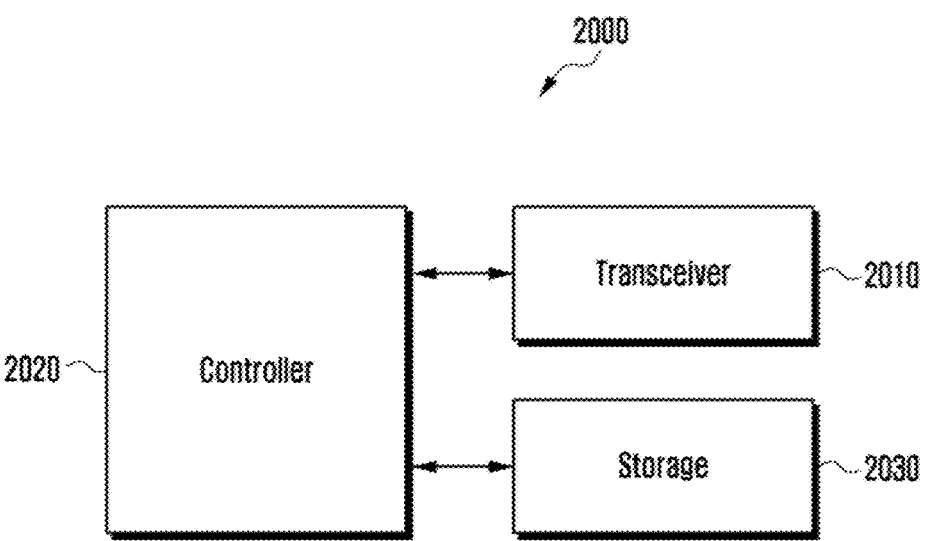
FIG. 20 is a block diagram illustrating a configuration of a terminal according to an embodiment of the disclosure.

FIG. 20 is a block diagram illustrating a constitution of a UE according to an embodiment of the disclosure.

With reference to FIG. 20, a UE 2000 may include a transceiver 2010, a controller 2020, and a storage 2030. According to an efficient channel and signal transmission and reception method in a 5G communication system corresponding to the above-described embodiment, the transceiver 2010, the controller 2020, and the storage 2030 of the UE 2000 may operate. However, the components of the UE 2000 according to an embodiment are not limited to the above-described examples. According to another embodiment, the UE 2000 may include more components or less components than the above-described components. Further, in a specific case, the transceiver 2010, the controller 2020, and the storage 2030 may be implemented in the form of a chip.

According to another embodiment, the transceiver 2010 may be constituted with a transmitter and a receiver. The transceiver 2010 may transmit and receive a signal to and from the base station. The signal may include control information and data. To this end, the transceiver 2010 may include an RF transmitter for up-converting and amplifying a frequency of a signal to be transmitted, and an RF receiver for low-noise amplifying a received signal and down-converting a frequency thereof. Further, the transceiver 2010 may receive a signal through a wireless channel and output the signal to the controller 2020, and transmit the signal output from the controller 2020 through the wireless channel.

The controller 2020 may control a series of processes in which the UE 2000 may operate according to the above-described embodiment of the disclosure. For example, the controller 2020 may perform at least one of a method of transmitting an uplink channel/signal according to the embodiment of the disclosure or a method of receiving a downlink channel/signal. The storage 2030 may store control information or data such as uplink-downlink constitution information, and guard band configuration information included in the signal acquired from the UE 2000, and data necessary for the control of the controller 2020 and have an area for storing data necessary for the control of the controller 2020 and data generated upon controlling by the controller 2020.

Figure 21:
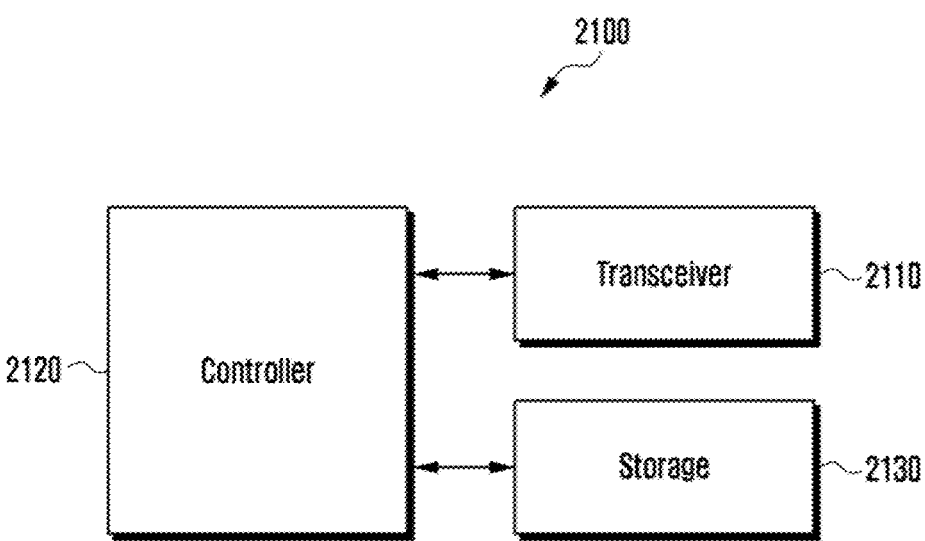
FIG. 21 is a block diagram illustrating a configuration of a base station according to an embodiment of the disclosure.

FIG. 21 is a block diagram illustrating a constitution of a base station according to an embodiment of the disclosure.

With reference to FIG. 21, a base station 2100 may include a transceiver 2110, a controller 2120, and a storage 2130. According to an efficient channel and signal transmission and reception method in a 5G communication system corresponding to the above-described embodiments, the transceiver 2110, the controller 2120, and the storage 2130 of the base station 2100 may operate. However, the components of the base station 2100 according to an embodiment are not limited to the above-described examples. According to another embodiment, the base station 2100 may include more components or less components than the above-described components. Further, in a specific case, the transceiver 2110, the controller 2120, and the storage 2130 may be implemented in the form of a single chip. The transceiver 2110 may be constituted with a transmitter and a receiver according to another embodiment. The transceiver 2110 may transmit and receive a signal to and from the UE. The signal may include control information and data. To this end, the transceiver 2110 may include an RF transmitter for up-converting and amplifying a frequency of a signal to be transmitted, and an RF receiver for low-noise amplifying a received signal and down-converting a frequency thereof. Further, the transceiver 2110 may receive a signal through a wireless channel and output the signal to the controller 2120, and transmit the signal output from the controller 2120 through the wireless channel.

The controller 2120 may control a series of processes so that the base station 2100 may operate according to the above embodiment of the disclosure. For example, the controller 2120 may perform at least one of a method for a base station to receive an uplink channel/signal or a method for a base station to transmit a downlink channel/signal according to an embodiment of the disclosure.

The storage 2130 may store control information such as uplink-downlink constitution information and guard band configuration information, and data or control information received from the UE determined by the base station 2100, and have an area for storing data required for the control by the controller 2120 and data generated upon controlling by the controller 2120.

Embodiments disclosed in this specification and drawings merely present specific examples to easily describe the technical content of the disclosure and help the understanding of the disclosure, and are not intended to limit the scope of the disclosure. That is, it will be apparent to those of ordinary skill in the art to which the disclosure pertains that other modifications based on the technical spirit of the disclosure may be implemented. Further, each of the above embodiments may be operated in combination with each other, as needed.

The invention claimed is:

1. A method of operating a terminal of a communication system, the method comprising:
    transmitting, to a base station, capability information indicating a sounding reference signal (SRS) antenna port switching pattern supported by the terminal;

receiving, from the base station, SRS resource configuration information including one or more SRS resource sets depending on the SRS antenna port switching pattern; and
    transmitting, to the base station, an SRS based on the SRS resource configuration information,
    wherein, in case that the SRS antenna port switching pattern corresponds to 2T6R and the SRS resource configuration information includes three SRS resource sets, a total of three SRS resources are transmitted, and
    wherein, in case that the SRS antenna port switching pattern corresponds to 2T8R and the SRS resource configuration information includes four SRS resource sets, a total of four SRS resources are transmitted.

2. The method of claim 1, wherein, in case that the SRS antenna port switching pattern corresponds to 1T6R and the SRS resource configuration information includes three resource sets,
    a total of six SRS resources are transmitted and each SRS resource in the three SRS resource sets is associated with a different antenna port.

3. The method of claim 1, wherein, in case that the SRS antenna port switching pattern corresponds to 1T8R and the SRS resource configuration information includes four SRS resource sets
    a total of eight SRS resources are transmitted and each SRS resource in the four SRS resource sets is associated with a different antenna port.

4. The method of claim 1, wherein, in case that the SRS antenna port switching pattern corresponds to 2T6R and the SRS resource configuration information includes three SRS resource sets, the total of three SRS resources are transmitted and each SRS resource in the three SRS resource sets is associated with a different antenna port pair.

5. The method of claim 1, wherein, in case that the SRS antenna port switching pattern corresponds to 2T8R and the SRS resource configuration information includes four SRS resource sets, the total of four SRS resources are transmitted and each SRS resource in the four SRS resource sets is associated with a different antenna port pair.

6. The method of claim 1, wherein, in case that the SRS antenna port switching pattern corresponds to 4T8R and the SRS resource configuration information includes two SRS resource sets,
    a total of two SRS resources are transmitted and each SRS resource in the two SRS resource sets is associated with a different antenna port.

7. A method of operating a base station of a communication system, the method comprising:
    receiving, from a terminal, capability information indicating a sounding reference signal (SRS) antenna port switching pattern supported by the terminal;
    transmitting, to the terminal, SRS resource configuration information including one or more SRS resource sets depending on the SRS antenna port switching pattern; and
    receiving, from the terminal, an SRS based on the SRS resource configuration information,
    wherein, in case that the SRS antenna port switching pattern corresponds to 2T6R and the SRS resource configuration information includes three SRS resource sets, a total of three SRS resources are received, and
    wherein, in case that the SRS antenna port switching pattern corresponds to 2T8R and the SRS resource configuration information includes four SRS resource sets, a total of four SRS resources are received.

8. The method of claim 7, wherein, in case that the SRS antenna port switching pattern corresponds to 1T6R and the SRS resource configuration information includes three resource sets a total of six SRS resources are received and each SRS resource in the three SRS resource sets is associated with a different antenna port.

9. The method of claim 7, wherein, in case that the SRS antenna port switching pattern corresponds to 1T8R and the SRS resource configuration information includes four SRS resource sets, a total of eight SRS resources are received and each SRS resource in the four SRS resource sets is associated with a different antenna port.

10. The method of claim 7, wherein in case that the SRS antenna port switching pattern corresponds to 2T6R and the SRS resource configuration information includes three SRS resource sets, the total of three SRS resources are received and each SRS resource in the three SRS resource sets is associated with a different antenna port pair.

11. The method of claim 7, wherein, in case that the SRS antenna port switching pattern corresponds to 2T8R and the SRS resource configuration information includes four SRS resource sets, the total of four SRS resources are received and each SRS resource in the four SRS resource sets is associated with a different antenna port pair.

12. The method of claim 7, wherein, in case that the SRS antenna port switching pattern corresponds to 4T8R and the SRS resource configuration information includes two SRS resource sets, a total of two SRS resources are received and each SRS resource in the two SRS resource sets is associated with a different antenna port.

13. A terminal of a communication system, the terminal comprising:

a transceiver; and a controller configured to:

transmit, to a base station, capability information indicating a sounding reference signal (SRS) antenna port switching pattern supported by the terminal, receive, from the base station, SRS resource configuration information including one or more SRS resource sets depending on the SRS antenna port switching pattern, and transmit, to the base station, an SRS based on the SRS resource configuration information, wherein, in case that the SRS antenna port switching pattern corresponds to 2T6R and the SRS resource configuration information includes three SRS resource sets, a total of three SRS resources are transmitted, and wherein, in case that the SRS antenna port switching pattern corresponds to 2T8R and the SRS resource configuration information includes four SRS resource sets, a total of four SRS resources are transmitted.

14. A base station of a communication system, the base station comprising:

a transceiver; and a controller configured to:

receive, from a terminal, capability information indicating a sounding reference signal (SRS) antenna port switching pattern supported by the terminal, transmit, to the terminal, SRS resource configuration information including one or more SRS resource sets depending on SRS antenna port switching pattern, and receive, from the terminal, an SRS based on the SRS resource configuration information, wherein, in case that the SRS antenna port switching pattern corresponds to 2T6R and the SRS resource configuration information includes three SRS resource sets, a total of three SRS resources are received, and wherein, in case that the SRS antenna port switching pattern corresponds to 2T8R and the SRS resource configuration information includes four SRS resource sets, a total of four SRS resources are received.

* * * * *